US012636790B2

(12) United States Patent
Tawara

(10) Patent No.: US 12,636,790 B2
(45) Date of Patent: May 26, 2026

(54) IMAGE PROCESSING DEVICE

(71) Applicant: Keyence Corporation, Osaka (JP)

(72) Inventor: Kyosuke Tawara, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 979 days.

(21) Appl. No.: 17/346,311

(22) Filed: Jun. 14, 2021

(65) Prior Publication Data

US 2022/0016784 A1 Jan. 20, 2022

(30) Foreign Application Priority Data

Jul. 14, 2020 (JP) ................................. 2020-120452

(51) Int. Cl.
*B25J 9/16* (2006.01)

(52) U.S. Cl.
CPC .................................. *B25J 9/1697* (2013.01)

(58) Field of Classification Search
CPC ...... B25J 9/1697; B25J 9/1664; B25J 19/021; B25J 19/022; B25J 19/023; B25J 9/00; B25J 9/16; B25J 9/1694; G05B 2219/40053; G05B 2219/45063; G05B 2219/40583; G05B 2219/37567; G05B 2219/40519; G05B 2219/37555; G05B 2219/40564; G05B 2219/00; G05B 2219/30; G05B 2219/37; G05B 2219/37526; G05B 2219/40

See application file for complete search history.

(56) References Cited

U.S. PATENT DOCUMENTS

| | | | |
|---|---|---|---|
| 2012/0197464 A1* | 8/2012 | Wang ................... | G06F 3/04842 |
| | | | 701/28 |
| 2016/0184997 A1* | 6/2016 | Uchiyama .............. | B25J 9/1697 |
| | | | 700/259 |
| 2018/0250813 A1* | 9/2018 | Shimodaira ............ | B25J 9/1605 |
| 2018/0290307 A1* | 10/2018 | Watanabe ................ | G06T 7/97 |
| 2019/0299400 A1* | 10/2019 | Nagashima .............. | B25J 9/161 |
| 2019/0321969 A1* | 10/2019 | Tan ....................... | B25J 15/0608 |
| 2019/0385329 A1* | 12/2019 | Fujii ...................... | B25J 9/1671 |
| 2020/0086485 A1* | 3/2020 | Johnson ................. | B25J 9/1687 |
| 2021/0178584 A1 | 6/2021 | Tawara et al. | |

FOREIGN PATENT DOCUMENTS

| | | |
|---|---|---|
| JP | 2018144159 A | 9/2018 |
| JP | 2019214100 A | 12/2019 |

* cited by examiner

*Primary Examiner* — Khoi H Tran
*Assistant Examiner* — Sarah A Tran
(74) *Attorney, Agent, or Firm* — Kilyk & Bowersox, P.L.L.C.

(57) ABSTRACT

The present invention allows a user to make trigger settings without editing a robot program and to automatically issue a trigger at optimum timing among the settings. A processor determines, based on timing at which a hand moves out of a capture range of a sensor on a path, timing of issuing a trigger that causes the sensor to capture the next image to dynamically change capture timing of the sensor for each cycle of a picking motion.

10 Claims, 41 Drawing Sheets

START

MAKE SETTINGS — SA1

EXECUTE CALIBRATION — SA2

CAPTURE IMAGE OF HAND — SA3

ACQUIRE COORDINATE OF ROBOT DURING IMAGE CAPTURING — SA4

REGISTER SEARCH MODEL — SA5

DETERMINE POSITION AND ORIENTATION OF HAND — SA6

CALCULATE ATTACHMENT POSITION OF HAND — SA7

END

START

INPUT CAD DATA OF WORKPIECE MODEL — SB1

CONFIRM AND REGISTER WORKPIECE MODEL — SB2

END

FIG. 14

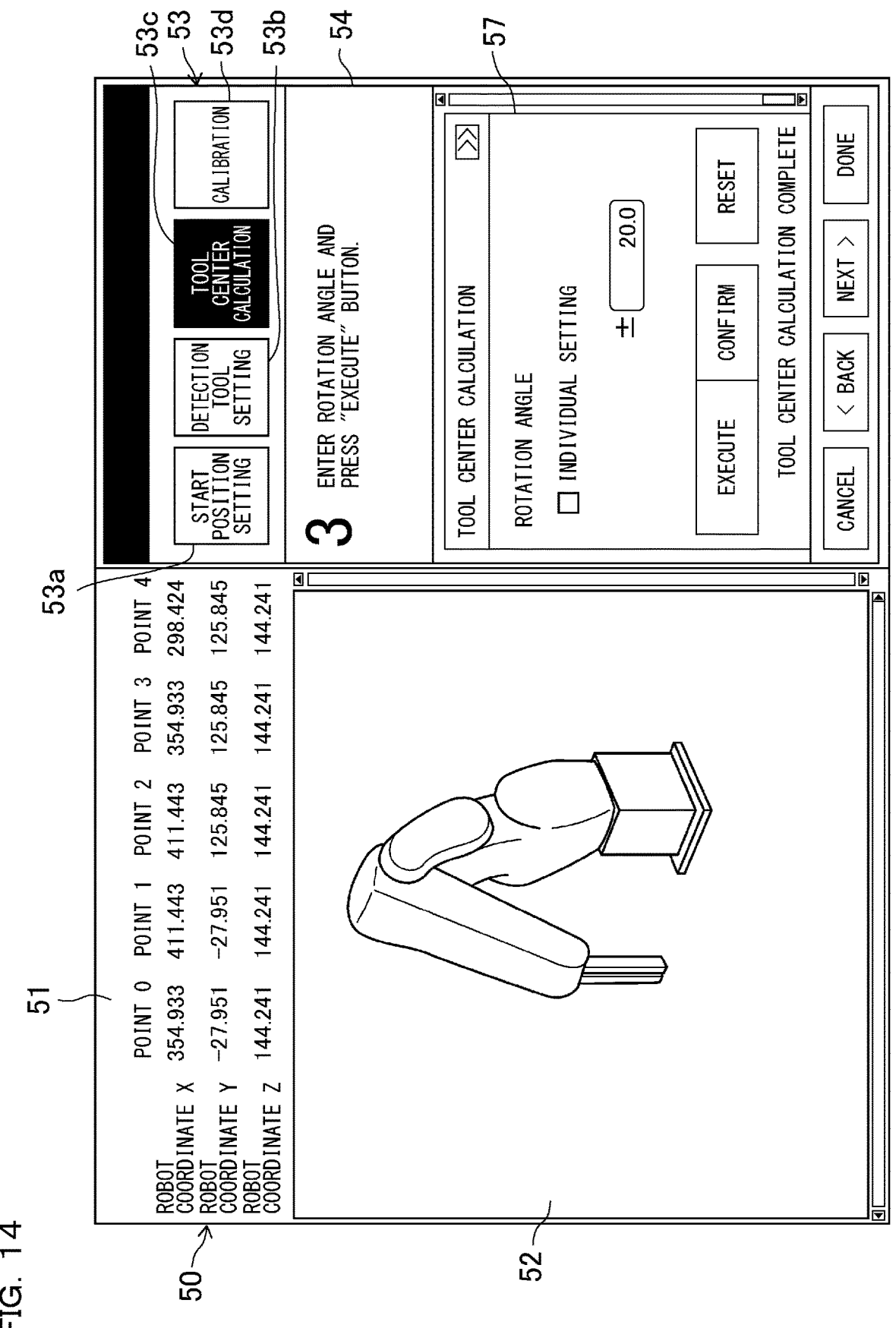

50

51

ROBOT COORDINATE X
ROBOT COORDINATE Y
ROBOT COORDINATE Z

|  | POINT 0 | POINT 1 | POINT 2 | POINT 3 | POINT 4 |
|---|---|---|---|---|---|
| X | 354.933 | 411.443 | 411.443 | 354.933 | 298.424 |
| Y | -27.951 | -27.951 | 125.845 | 125.845 | 125.845 |
| Z | 144.241 | 144.241 | 144.241 | 144.241 | 144.241 |

52

53a 53c
53
53d
53b
54

START POSITION SETTING
DETECTION TOOL SETTING
TOOL CENTER CALCULATION
CALIBRATION

3 ENTER ROTATION ANGLE AND PRESS "EXECUTE" BUTTON.

57

TOOL CENTER CALCULATION

ROTATION ANGLE

☐ INDIVIDUAL SETTING

± 20.0

EXECUTE     CONFIRM     RESET

TOOL CENTER CALCULATION COMPLETE

CANCEL     < BACK     NEXT >     DONE

```
EXAMPLE OF MAIN PROGRAM

1    ISSUE TRIGGER TO CAMERA
2    IF NO MEASUREMENT RESULT
3        TERMINATE PROGRAM
4    ENDIF
5
6    RECEIVE RESULT OF PATH CREATION
7
8    FOR NUMBER OF FIXED VIA POINTS

9        FOR NUMBER OF INTERMEDIATE VIA POINTS BETWEEN FIXED VIA POINTS
10               ISSUE Move COMMAND TO ROBOT
11       ENDFOR
12       DETERMINE ATTRIBUTE OF CURRENT FIXED VIA POINT
13       ISSUE ACTION IN ACCORDANCE WITH ATTRIBUTE (CALL ANOTHER PROGRAM)

14   ENDFOR
15
```

```
EXAMPLE OF ACTION PROGRAM: Action Grasp

1    Hand open
2
```

```
EXAMPLE OF MAIN PROGRAM

1    ISSUE TRIGGER TO CAMERA
 2    IF NO MEASUREMENT RESULT
 3            TERMINATE PROGRAM
 4    ENDIF
 5
 6    RECEIVE RESULT OF PATH CREATION
 7
 8    FOR NUMBER OF VIA POINTS BETWEEN FIXED VIA POINT 0 AND FIXED VIA POINT 1
 9            ISSUE Move COMMAND TO ROBOT
10    ENDFOR
11    ISSUE ACTION AT FIXED VIA POINT 1 (HOLDING POSITION)

12
13    FOR NUMBER OF VIA POINTS BETWEEN FIXED VIA POINT 1 AND FIXED VIA POINT 2
14            ISSUE Move COMMAND TO ROBOT
15    ENDFOR
16    ISSUE ACTION AT FIXED VIA POINT 2
17
18    FOR NUMBER OF VIA POINTS BETWEEN FIXED VIA POINT 2 AND FIXED VIA POINT 3
19            ISSUE Move COMMAND TO ROBOT
20    ENDFOR
21    ISSUE ACTION AT FIXED VIA POINT 3
22
23    FOR NUMBER OF VIA POINTS BETWEEN FIXED VIA POINT 3 AND FIXED VIA POINT 4
24            ISSUE Move COMMAND TO ROBOT
25    ENDFOR
26    ISSUE ACTION AT FIXED VIA POINT 4
27
28    FOR NUMBER OF VIA POINTS BETWEEN FIXED VIA POINT 4 AND FIXED VIA POINT 5
29            ISSUE Move COMMAND TO ROBOT
30    ENDFOR
31    ISSUE ACTION AT FIXED VIA POINT 5
32
```

```
EXAMPLE OF MAIN PROGRAM
  1    ISSUE TRIGGER TO CAMERA
  2    IF NO MEASUREMENT RESULT
  3              TERMINATE PROGRAM
  4    ENDIF
  5
  6    RECEIVE RESULT OF PATH CREATION
  7
  8    FOR NUMBER OF VIA POINTS BETWEEN FIXED VIA POINT 0 AND FIXED VIA POINT 1
  9              ISSUE Move COMMAND TO ROBOT
 10    ENDFOR
 11    ISSUE ACTION AT FIXED VIA POINT 1 (HOLDING POSITION)

12
 13    FOR NUMBER OF VIA POINTS BETWEEN FIXED VIA POINT 1 AND FIXED VIA POINT 2
 14              ISSUE Move COMMAND TO ROBOT
 15    ENDFOR
 16    ISSUE ACTION AT FIXED VIA POINT 2

17
 18    FOR NUMBER OF VIA POINTS BETWEEN FIXED VIA POINT 2 AND FIXED VIA POINT 3
 19              ISSUE Move COMMAND TO ROBOT
 20    ENDFOR
 21    ISSUE ACTION AT FIXED VIA POINT 3
 22
 23    FOR NUMBER OF VIA POINTS BETWEEN FIXED VIA POINT 3 AND FIXED VIA POINT 4
 24              ISSUE Move COMMAND TO ROBOT
 25    ENDFOR
 26    ISSUE ACTION AT FIXED VIA POINT 4
 27
 28    FOR NUMBER OF VIA POINTS BETWEEN FIXED VIA POINT 4 AND FIXED VIA POINT 5
 29              ISSUE Move COMMAND TO ROBOT
 30    ENDFOR
 31    ISSUE ACTION AT FIXED VIA POINT 5
 32
 33

| ATTRIBUTE INFORMATION ARRAY | 0 | 1 | 2 | 3 | 4 | 5 | 6 | 7 | 8 |
|---|---|---|---|---|---|---|---|---|---|
| VIA POINT ARRAY | DESIGNATED POSITION | DESIGNATED POSITION | APPROACH POSITION | HOLDING POSITION | RETREAT POSITION | DESIGNATED POSITION | DESIGNATED POSITION | PLACE POSITION | DESIGNATED POSITION |
| | POSITION INFORMATION | POSITION INFORMATION | POSITION INFORMATION | POSITION INFORMATION | POSITION INFORMATION | POSITION INFORMATION | POSITION INFORMATION | POSITION INFORMATION | POSITION INFORMATION |

FIG. 35

| | 0 | 1 | 2 | 3 | 4 | 5 |
|---|---|---|---|---|---|---|
| COMMAND ARRAY | VIA POINT | VIA POINT | VIA POINT | HAND | VIA POINT | HAND |
| VIA POINT ARRAY | POSITION INFORMATION | POSITION INFORMATION | POSITION INFORMATION | POSITION INFORMATION | POSITION INFORMATION | POSITION INFORMATION |

| 7 | 8 | 9 | 10 | 11 | 12 |
|---|---|---|---|---|---|
| HAND | VIA POINT | VIA POINT | VIA POINT | HAND | VIA POINT |
| POSITION INFORMATION | POSITION INFORMATION | | | | |

VIA POINT ··· REQUEST TO TRACE VIA POINT

HAND ··· REQUEST TO OPEN HAND AND CLOSE HAND

```
EXAMPLE OF MAIN PROGRAM
   1    ISSUE TRIGGER TO CAMERA
   2    IF NO MEASUREMENT RESULT
   3       TERMINATE PROGRAM
   4    ENDIF
   5
   6    RECEIVE RESULT OF PATH CREATION
   7
   8    FOR LENGTH OF COMMAND ARRAY
   9           SWITCH EACH ELEMENT OF COMMAND ARRAY
  10                   CASE VIA POINT MOVEMENT COMMAND
  11                          ISSUE Move COMMAND TO ROBOT 12                   CASE HAND OPERATION COMMAND
  13                          ISSUE HAND ACTION
  14           END SWITCH
  15    ENDFOR
```

FIG. 37

| COMMAND ARRAY | 0 | 1 | 2 | 3 | 4 | 5 | 6 |
|---|---|---|---|---|---|---|---|
| | VIA POINT | POSITION INFORMATION | VIA POINT | POSITION INFORMATION | VIA POINT | POSITION INFORMATION | HAND |

| | 7 | 8 | 9 | 10 | 11 | 12 | 13 |
|---|---|---|---|---|---|---|---|
| | NA | VIA POINT | POSITION INFORMATION | HAND | NA | VIA POINT | POSITION INFORMATION |

| | 14 | 15 | 16 | 17 | 18 | 19 |
|---|---|---|---|---|---|---|
| | VIA POINT | POSITION INFORMATION | VIA POINT | POSITION INFORMATION | VIA POINT | POSITION INFORMATION |

IMAGE PROCESSING DEVICE

CROSS-REFERENCE TO RELATED APPLICATIONS

The present application claims foreign priority based on Japanese Patent Application No. 2020-120452, filed Jul. 14, 2020, the contents of which are incorporated herein by reference.

BACKGROUND OF THE INVENTION

1. Field of the Invention

The present invention relates to an image processing device used for controlling a robot that performs a picking motion.

2. Description of Related Art

In the related art, a three-dimensional measuring device is known, for example, as disclosed in JP 2018-144159 A, the three-dimensional measuring device being configured to make motion settings of a robot so as to measure a three-dimensional shape of a workpiece placed in a work space, control a robot hand attached to a robot to hold the workpiece, and place the workpiece held by the hand at a placing position.

The three-dimensional measuring device disclosed in JP 2018-144159 A is provided separately from a robot controller, and is capable of making a high-precision three-dimensional measurement that is difficult for the robot controller, and outputting, to the robot controller, points through which the hand needs to pass such as an approach position where the robot hand holds the workpiece and a holding execution position held by the hand so as to enable various functions based on a result of the measurement.

That is, the three-dimensional measuring device acquires three-dimensional data that results from capturing an image of the workpiece and an area around the workpiece by, for example, an imaging part, and then searches the three-dimensional data thus acquired for the workpiece to determine a holding orientation and the like. Then, coordinates of the holding execution position where the workpiece is held are calculated, and the coordinates thus calculated are output to the robot controller.

Upon receipt of the coordinates, the robot controller puts the hand into operation to cause the hand to hold the workpiece, convey the workpiece to a predetermined placing position, and place the workpiece at the placing position.

As described above, in a case where the workpiece is picked by the robot, when the workpiece in the work space is held and conveyed, the condition of the work space changes, which requires that an image of the work space be captured by a camera and new three-dimensional data be acquired each time the workpiece is conveyed.

Specifically, first, when the robot is in a position where the robot waits for the camera to capture an image (capture standby position), the robot issues a capture trigger to capture an image of workpieces in the work space. A position of a workpiece that can be held is identified in the image thus acquired, and a target holding execution position is calculated. Subsequently, the robot is moved to the target holding execution position via a position over a container and the like, and then a holding motion is performed by the hand. Finally, the robot is moved to the place position, a place motion is performed by the hand at the place position, the robot is returned to the capture standby position, and then the capture trigger is issued again. This is a typical bulk picking procedure.

However, when the trigger is issued at the capture standby position as described above, the robot needs to be stopped and wait at the capture standby position for a time required for the camera to capture an image, a time required to calculate the position of the workpiece, a time required to calculate the holding execution position, and the like, and thus this waiting time becomes a problem in bulk picking having strict tact requirements.

There is a possible measure such as issuing the next capture trigger at the moment when the robot reaches the place position. Taking such a measure allows the possibility that the robot overlaps the container for the workpieces to inhibit the capturing to be reduced and allows the capturing of an image or the calculation to be finished before the robot returns to the capture standby position, so that it becomes possible to meet the strict tact requirements.

However, this method also has some problems. That is, the position at which the capture trigger is issued is usually required to be timing having a margin with respect to an ideal trigger position, so that the robot movement time from the place position to the capture standby position is not long enough to perform various processes, and there are cases where loss time eventually occurs. When the timing of issuing the capture trigger is set earlier so as to make the robot movement time long enough to perform various processes, the robot overlaps the container, and the possibility that the image cannot be captured properly is increased, which makes it difficult to adjust the trigger issue position. Moreover, in bulk picking, the movement path of the hand varies for each cycle, which also makes it difficult to adjust the trigger issue position.

Further, in the related art, the trigger position is determined using the robot program, and the path creation by the image processing device and the setting of the trigger position by the robot program are individually made. Therefore, when a via point is added on the image processing device side, the trigger position is adjusted through modification made on the robot program side. For example, in order to issue the trigger at the place position, it is necessary to directly edit the robot program, which makes the program less versatile. That is, it is not easy for the user to adjust the trigger position.

SUMMARY OF THE INVENTION

The present invention has been made in view of such circumstances, and it is an object of the present invention to allow a user to make trigger settings without editing a robot program and to automatically issue a trigger at optimum timing among the settings.

In order to achieve the above object, a first disclosure is based on an image processing device used for controlling a robot that performs, in cycles, a picking motion of holding and taking out a predetermined workpiece one by one from among a plurality of works stowed in a work space.

The image processing device includes an imaging part that captures an image of the work space where the plurality of workpieces are stowed in accordance with a trigger command and outputs image data, and a processor that determines, based on the image data output from the imaging part, a workpiece to be held from among the workpieces stowed in the work space and sets a path of a hand extending from where the hand holds the workpiece to where the hand places the workpiece at a predetermined placing position.

The processor can determine, based on timing at which the hand moves out of a capture range of the imaging part on the path, timing of issuing a trigger that causes the imaging part to capture the next image to dynamically change capture timing of the imaging part for each cycle of the picking motion.

According to this structure, when the imaging part captures an image of the work space in accordance with the trigger command, the image data including the workpiece is output from the imaging part to the processor. The processor determines a workpiece to be held based on the image data output from the imaging part and creates the path of the hand extending from where the hand holds the workpiece to where the hand places the workpiece at the predetermined placing position. When the hand has moved on this path, one cycle of the picking motion is done.

In general, the hand moves out of the capture range of the imaging part on the path. The processor determines the timing of issuing the trigger that causes the imaging part to capture the next image based on the timing at which the hand moves out of the capture range. Since the imaging part captures an image of the work space in accordance with the trigger command issued at the issue timing thus determined, the hand does not overlap any workpiece, and an image of workpieces in the capture range can be captured.

In the next cycle, the state of the workpieces in the work space is different from the state in the previous cycle because the number of workpiece has decreased. Accordingly, the path of the hand is also different from the path in the previous cycle, and the timing at which the hand moves out of the capture range of the imaging part is also different from the timing in the previous cycle. According to the present disclosure, the capture timing of the imaging part can be dynamically changed for each cycle of the picking motion, so that the trigger can be automatically issued at optimum timing. This eliminates the need for the user to adjust a trigger position, thereby increasing convenience.

According to a second disclosure, the processor can output coordinates on the path to a robot controller that controls a robot.

For example, in a case of a robot system including a robot controller that controls a robot, the processor may be provided separately from the robot controller, and in this case, the processor outputs the coordinates to the robot controller, and the robot controller controls the robot to move to the coordinates on the path output from the processor, thereby enabling the picking motion.

Note that the present disclosure may include an aspect where the processor is incorporated in the robot controller, in addition to an aspect where the processor and the robot controller are separately provided. In this case, the path is created in the robot controller, and the robot controller controls the robot to move the robot on the path thus created.

According to a third disclosure, the processor can output, to the robot controller, coordinates on the path where the trigger needs to be issued, and trigger issue information on the trigger that needs to be issued at the coordinates.

According to this structure, the processor outputs not only the coordinate on the path but also the trigger issue information that causes an image to be captured at the coordinates, so that it is possible for the user to follow the trigger position that changes for each cycle without editing the robot program.

According to a fourth disclosure, the processor can create information including coordinates of a plurality of via points successively provided on the path as information on the path and outputs the information on the path to the robot controller.

The path varies for each cycle as described above. On the path created by the processor, points to be passed by the hand (passing points) such as points at which the holding motion needs to be performed and points at which the placing motion needs to be performed are provided. Outputting such a plurality of via points to the robot controller allows the robot controller to control the hand so as to pass through the plurality of via points.

According to a fifth disclosure, the processor can output, to the robot controller, coordinates of a fixed via point having any single attribute among an approach position of the hand, a holding execution position of the hand, and a retreat position after holding of the hand, and attribute information showing the attribute of the fixed via point.

According to this structure, since the coordinates of the fixed via point and the attribute information showing the attribute of the fixed via point are output to the robot controller, the user only needs to edit path settings of the hand without consideration of a correspondence with the robot controller and to verify the motion of the hand without concern for the motion of the robot itself. In other words, the user can create the robot program simply by describing the motion of the hand in accordance with each attribute information.

According to a sixth disclosure, the image processing further includes a workpiece model input part that receives a workpiece model and information on a holding position on the workpiece model held by the hand, a measurement part that makes a three-dimensional measurement on the work space where the workpieces exist, and a search part that searches for a holding position of a corresponding one of the workpieces stowed in the work space based on a result of the three-dimensional measurement made by the measurement part and the workpiece model input by the workpiece model input part. The interference determination part can determine whether or not the hand interferes with a surrounding object when holding the holding position of the workpiece searched for by the search part and determine an orientation of the hand that avoids interference with the surrounding object.

According to this structure, when there is a workpiece that can be held in the work space where the workpieces are stowed, it can be determined, based on the information on a holding position, whether or not the hand interferes with the surrounding object when holding the workpiece that can be held. When the hand interferes with the surrounding object, the picking motion cannot be actually performed even if the search part determines that holding is possible, and thus changing the orientation of the hand to allow the picking motion allows the interference determination part to determine the orientation of the hand that avoids interference. Note that there may be no orientation of the hand that avoids interference. It is also possible to input a plurality of holding positions on the workpiece model held by the hand.

According to a seventh disclosure, the processor can determine a plurality of via points that allow the hand to avoid interference with the surrounding object based on a result of the determination made by the interference determination part and create a path of the hand to connect the via points.

According to this structure, it is possible to cause the robot to perform the picking motion on the path along which the hand does not interfere with any surrounding object.

According to an eighth disclosure, the processor can set a virtual solid figure having an outer shape along an edge of the capture range of the imaging part to determine whether or not the hand interferes with the solid figure, and determine that timing at which the hand does not interfere with the solid figure is timing at which the hand moves out of the capture range of the imaging part.

According to this structure, it is possible to obtain, by using an algorithm for determining interference between the virtual solid figure and the hand, the timing at which the hand does not interfere with the solid figure. Since the outer shape of the solid figure corresponds to the edge of the capture range, the fact that the hand does not interfere with the solid figure means that the hand is located out of the capture range of the imaging part. Therefore, it is possible to easily obtain the timing at which the hand moves out of the capture range of the imaging part.

According to a ninth disclosure, the processor can receive a frame surrounding, in plan view, an area where the workpieces are stowed, and set the solid figure that has a lower surface identical in shape to the frame and extends toward a light receiving surface of the imaging part.

For example, when the workpieces are stored in the container, the area where the workpieces are stowed is limited to the inside of the container. In this case, when the user inputs the frame having a shape surrounding the inner space of the container in plan view, the shape of the frame becomes the shape of the lower surface of the virtual solid figure. Then, setting the solid figure extending from the lower surface toward the light receiving surface of the image part allows the capture range of the imaging part to be set in a suitable shape that reflects the area where the workpieces are stowed. The shape of the frame is not limited to a specific shape, and may be, for example, a rectangular shape or a circular shape.

According to a tenth disclosure, the processor can set, when determining whether or not the hand interferes with the solid figure, a dividing via point that divides a section between adjacent via points among the plurality of via points and use the dividing via point.

According to this structure, it is possible to finely obtain the timing at which the hand moves out of the capture range of the imaging part.

According to an eleventh disclosure, the processor can determine timing of issuing the trigger between the holding execution position of the hand and the placing position of the workpiece and output a robot position corresponding to the timing as a trigger position.

According to a twelfth disclosure, the image processing device further includes an edit screen creation part that creates an edit screen that shows, when a plurality of via points are provided on the path, a passing order of the plurality of via points and allows individual editing of the plurality of via points, and a display part that displays the edit screen created by the edit screen creation part.

As described above, according to the present disclosure, the processor can determine, based on the timing at which the hand moves out of the capture range, timing of issuing the next capture trigger to dynamically change capture timing for each cycle of the picking motion. As a result, the user can make trigger settings without editing the robot program, and the trigger can be automatically issued at the optimum timing among the settings.

BRIEF DESCRIPTION OF THE DRAWINGS

FIG. 14 is a diagram showing an example of a user interface screen displayed when a tool center is calculated;

FIG. 30A shows an example of a main program displayed on a display part when the attribute information can be associated and registered on a user interface;

FIG. 30B shows an example of an action program displayed on the display part when the attribute information can be associated and registered on a user interface;

FIG. 31 shows an example of the main program displayed on the display part when the attribute information cannot be associated and registered on a user interface;

FIG. 33 is a diagram corresponding to FIG. 30A when a fixed via point is added;

FIG. 34 is a diagram showing data arrays of via points and attribute information when the attribute information is processed by the robot controller;

FIG. 35 is a diagram showing data arrays of via points and attribute information when the attribute information is processed by the image processing device;

FIG. 36 is a diagram corresponding to FIG. 30A when the attribute information is processed by the image processing device;

FIG. 37 is a diagram corresponding to FIG. 35 when via point data is included in a command array;

DETAILED DESCRIPTION OF PREFERRED EMBODIMENTS

Hereinafter, embodiments of the present invention will be described in detail with reference to the drawings. Note that the following description of the preferred embodiments is merely an example in essence, and is not intended to limit the present invention, an application of the present invention, and a use of the present invention.

Figure 1:
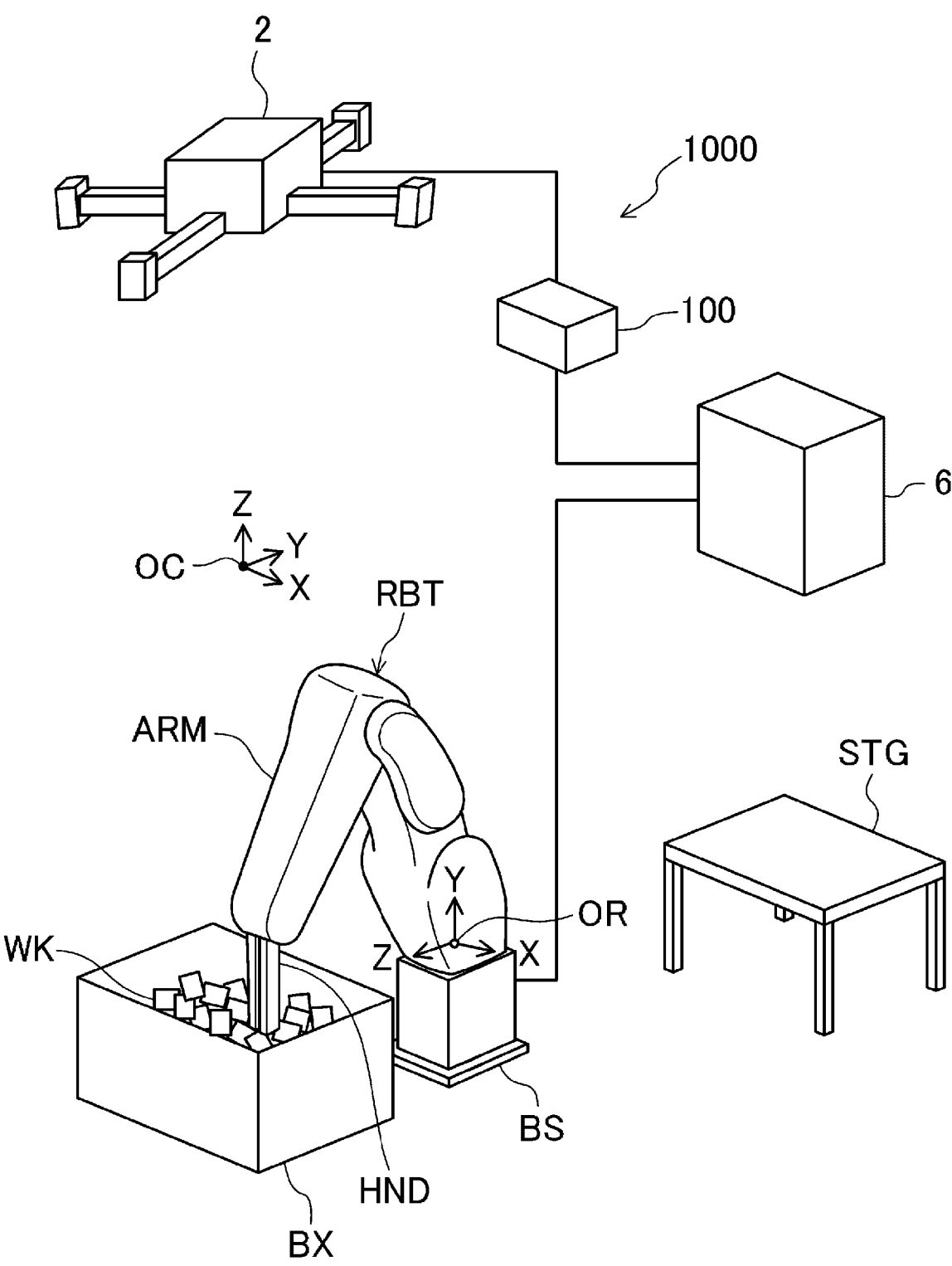
FIG. 1 is a schematic diagram showing how a bulk picking motion is performed using a robot system.

FIG. 1 is a schematic diagram showing a structure example of a robot system 1000 according to an embodiment of the present invention. FIG. 1 shows an example of how a bulk picking motion is performed where a predetermined holdable workpiece WK among a plurality of workpieces WK stowed in a work space in a manufacturing factory for various products is taken out by a robot RBT one by one, conveyed to a stage STG installed at a predetermined location, and placed on the STG. This bulk picking motion is repeatedly performed until no holdable workpiece WK is left. In other words, when the motion of holding the predetermined holdable workpiece WK, conveying the workpiece WK to a predetermined position, and placing the workpiece WK is considered to be one cycle, this cycle is performed a plurality of times, so that it can be said that the robot RBT is configured to perform, in cycles, the picking motion of holding and taking out the predetermined workpiece one by one.

The robot system 1000 includes the robot RBT and a robot controller 6 that controls the robot RBT. Furthermore, the robot system 1000 shown in FIG. 1 includes a robot setting device 100, a sensor 2, a display part 3, a control panel 4, and a robot operation tool 7 shown in FIG. 5, in addition to the robot RBT and the robot controller 6.

The robot RBT shown in FIG. 1 is a general-purpose industrial robot, and includes a base BS fixed to a floor surface of the factory or the like. The robot RBT is also referred to as, for example, a manipulator, and is configured to be of a 6-axis control type. The robot RBT includes an arm ARM that extends from the base BS and a robot hand HND (hereinafter, simply referred to as "hand") that is provided at an end of the arm ARM and serves as an end effector. The arm ARM may be configured to be of an articulated type including a plurality of joints as movable parts. The hand HND can be moved to a desired position within a motion range through motion of each joint of the arm ARM and rotation of the arm ARM itself.

Figure 2A:
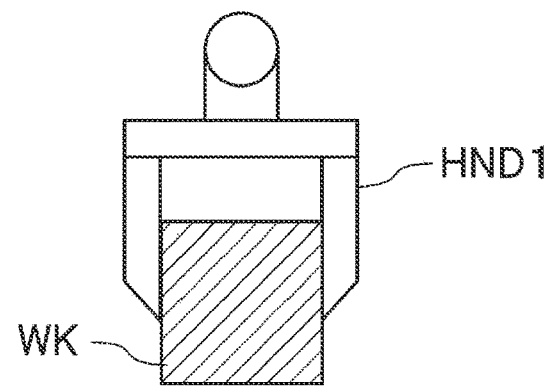
FIG. 2A is a schematic diagram showing an example of how a workpiece is held by a robot hand.
Figure 2B:
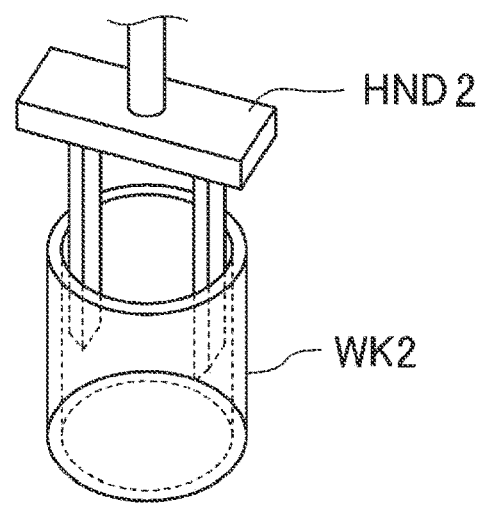
FIG. 2B is a schematic diagram showing an example of how a hollow workpiece is held in contact with an inner surface of the hollow workpiece.
Figure 2C:
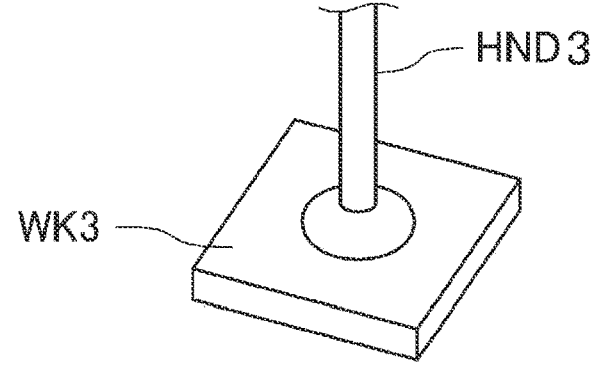
FIG. 2C is a schematic diagram showing an example of how a plate-shaped workpiece is suctioned and held.

The hand HND is capable of holding the workpiece WK. Examples of the hand HND include a hand HND1 structured to hold the workpiece WK with an outer side of the workpiece WK held by the hand HND1 as shown in FIG. 2A, a hand HND2 structured to hold a hollow workpiece WK2 with claws of the hand HND2 inserted into the hollow workpiece WK2 and opened as shown in FIG. 2B, a hand HND3 structured to hold a plate-shaped workpiece WK3 with the plate-shaped workpiece WK3 suctioned by the hand HND3 as shown in FIG. 2C, and the like, and any of the end effectors may be used. Further, herein, "hold" is used as meanings including all examples where the outer side of the workpiece WK is held shown in FIG. 2A; the claws are inserted into and opened in the hollow of the workpiece WK; and the workpiece WK is suctioned.

Figure 3:
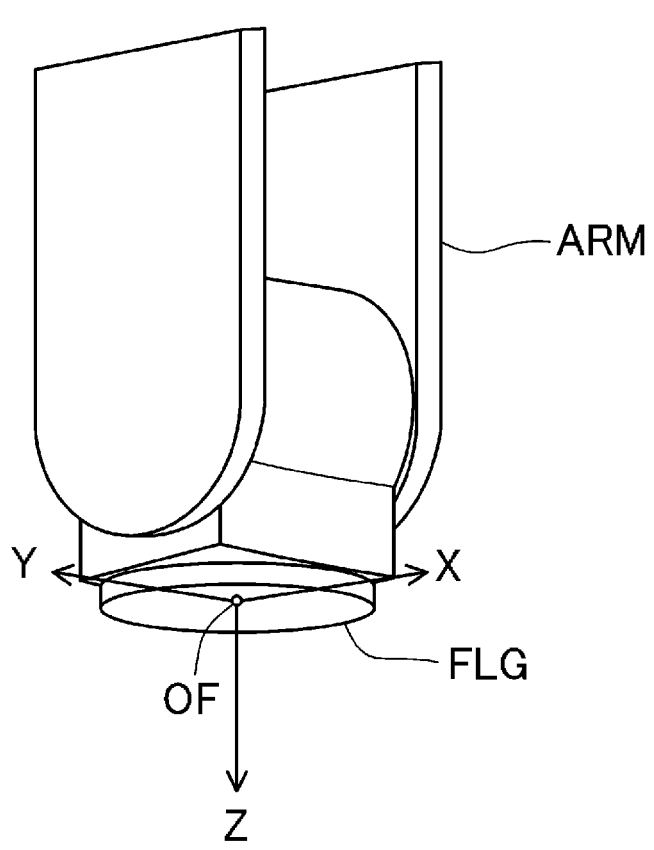
FIG. 3 is a perspective view of an end of an arm.
Figure 4:
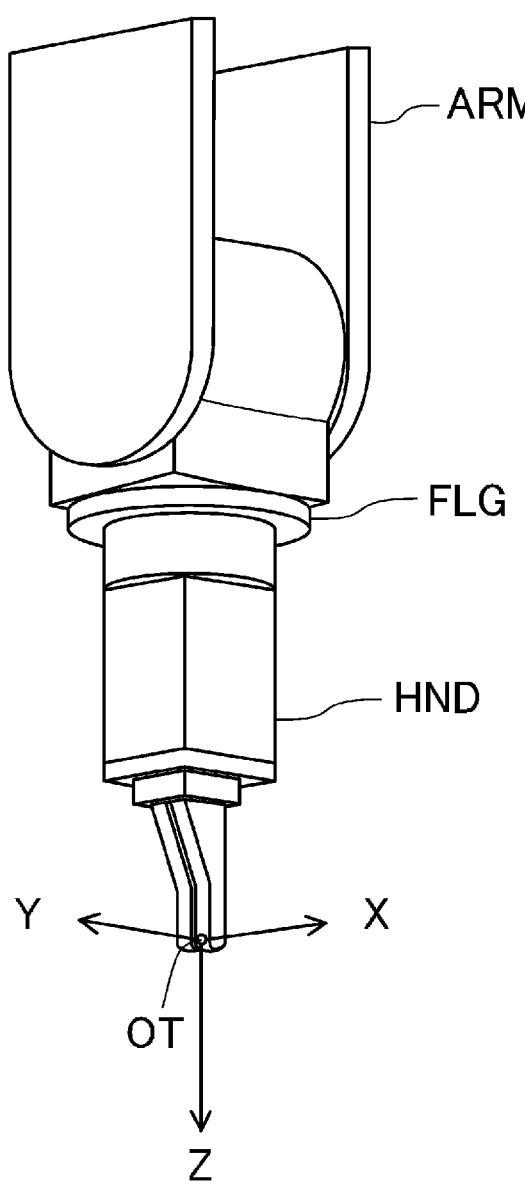
FIG. 4 is a perspective view of the end of the arm to which a hand is attached.

As shown in FIG. 3, a flange FLG is fixed to the end of the hand HND. As described above, there are various types of hands HND, and it is necessary to use a different hand HND in a manner that depends on the workpiece WK, therefore, as shown in FIG. 4, the hand HND is detachably attached to the flange FLG so that the user can freely change the hand HND. The attachment position and orientation of the hand HND relative to the flange FLG are designated as designed. A guide pin (not shown) or the like may be provided such that the attachment position and orientation of the hand HND relative to the flange FLG are made as designed, but even when such a guide pin or the like is provided, the hand HND is not always attached to the flange FLG as designed on site where the picking motion is actually performed, and the attachment position and orientation of the hand HND may deviate from the design value.

(Description of coordinate system) The robot system 1000 according to the present embodiment has a robot coordinate system, a camera coordinate system, a flange coordinate system, and a tool coordinate system. The robot coordinate system is a three-dimensional coordinate system whose origin is a point OR as shown in FIG. 1, and is, for example, a coordinate system when the attachment position of the robot RBT is the origin. The robot coordinate system is a coordinate system that serves as a basis of the position of each part of the robot RBT (the flange FLG, the arm ARM, and the like). Although FIG. 1 shows an example where the origin OR of the robot coordinate system is a center of the base of the robot RBT, the present invention is not limited to this configuration, and a center of an upper surface of the base BS may be the origin OR of the robot coordinate system. Further, in general, the robot coordinates indicate the position of the flange FLG in the robot coordinate system.

According to the present embodiment, although details will be described later, the sensor 2 may include a so-called camera, and is capable of capturing an image within a predetermined capture range. The camera coordinate system (coordinate system of an imaging part) is defined as a coordinate system serving as a basis of each point in an image captured by the sensor 2. As an example of the camera coordinate system, X, Y have a point directly below the sensor 2 as an origin OC, and Z has a center of the measurement range of the sensor 2 as the origin OC, but the present invention is not limited to this configuration.

The flange coordinate system is a three-dimensional coordinate system where a center of an attachment surface of the flange FLG serves as an origin OF, as shown in FIG. 3. Further, the hand HND may be referred to as a tool, and as shown in FIG. 4, the tool coordinate system is a three-dimensional coordinate system where an end of the tool serves as an origin OT. The origin OT of the tool coordinate system is not limited to the end of the tool and may be any position of the tool.

(Robot control) The robot RBT is controlled by the robot controller 6 shown in FIG. 1. The robot controller 6 controls the motion of the arm ARM, the opening and closing motion of the hand HND, and the like. Further, the robot controller 6 acquires information necessary for controlling the robot RBT from the robot setting device 100 shown in FIG. 5. For example, the robot setting device 100 acquires a three-dimensional shape of each of the workpieces WK that are a large number of parts randomly placed in a container BX shown in FIG. 1 using the sensor 2 such as a three-dimensional camera or light to detect the position and orientation of the workpiece WK, and the robot controller 6 acquires the information on the position and orientation of the workpiece WK.

The control panel 4 shown in FIG. 5 makes various settings for interference determination during the picking motion and image processing to be described later. Further, various settings, a confirmation of the motion state of the robot RBT, a confirmation of the motion state of the robot setting device 100, a confirmation of the attachment state of the hand HND, and the like are made on the display part 3. Furthermore, an image processing device 300 (shown in FIG. 6) provided in the robot setting device 100 performs, for example, a three-dimensional search, an interference determination, a holding solution calculation, and the like.

On the other hand, the robot controller 6 is a well-known member configured to control the robot RBT in accordance with a signal output from the robot setting device 100. Further, the robot operation tool 7 makes motion settings of the robot RBT. Note that, in the example shown in FIG. 5, the control panel 4 and the robot operation tool 7 are separate members, but may be integrated into a shared member.

The sensor 2 is a member called a robot vision or the like, and may be referred to as an imaging part that captures an image of an object to be imaged. According to the present embodiment, at least the hand HND and the workpiece WK are objects to be imaged by the sensor 2. When an image of the workpiece WK is captured, the object to be imaged may include the container BX. Further, when an image of the hand HND is captured, the object to be imaged may include the flange FLG or the arm ARM.

The sensor 2 is connected to the robot controller 6 and is capable of receiving a trigger command output from the robot controller 6. The sensor 2 captures an image of the visual field range in accordance with the trigger command output from the robot controller 6, and outputs the image data to a processor 300A. The trigger command may be simply referred to as a trigger or a trigger signal.

It is possible to acquire, from the image captured by the sensor 2, three-dimensional shape data representing the three-dimensional shape of each of the workpieces WK stowed in bulk. It is also possible to acquire three-dimensional shape data representing the three-dimensional shape of the container BX from the image captured by the sensor 2. Similarly, three-dimensional shape data representing the three-dimensional shape of the hand HND, three-dimensional shape data representing the three-dimensional shape of the flange FLG, and the like can be acquired from the image captured by the sensor 2.

Note that examples of the method for acquiring each three-dimensional shape includes a pattern projection method, a stereo method, a shape-from-focus method, a light-section method, an optical radar method, an interferometry method (white interferometry method), a TOF method, and the like, and any of the methods may be used. Since each method is well known, no detailed description will be given. According to the present embodiment, among types of the pattern projection methods, a phase shift method is used in which pattern light having a periodic illuminance distribution is applied to an object to be imaged, and light reflected off a surface of the object to be imaged is received.

The sensor 2 may be referred to as a shape measuring device that measures the shape of the workpiece WK to be measured, and includes a measurement part 2a (shown in FIG. 6) that performs a three-dimensional measurement on the work space where the workpiece WK exists. Therefore, the sensor 2 can measure the shapes of the hand HND, the workpiece WK, and the container BX. The sensor 2 may be a part of the robot setting device 100, or alternatively, may be structured as a separate member. The specific structure of the sensor 2 is determined based on a three-dimensional shape measuring method.

Figure 7:
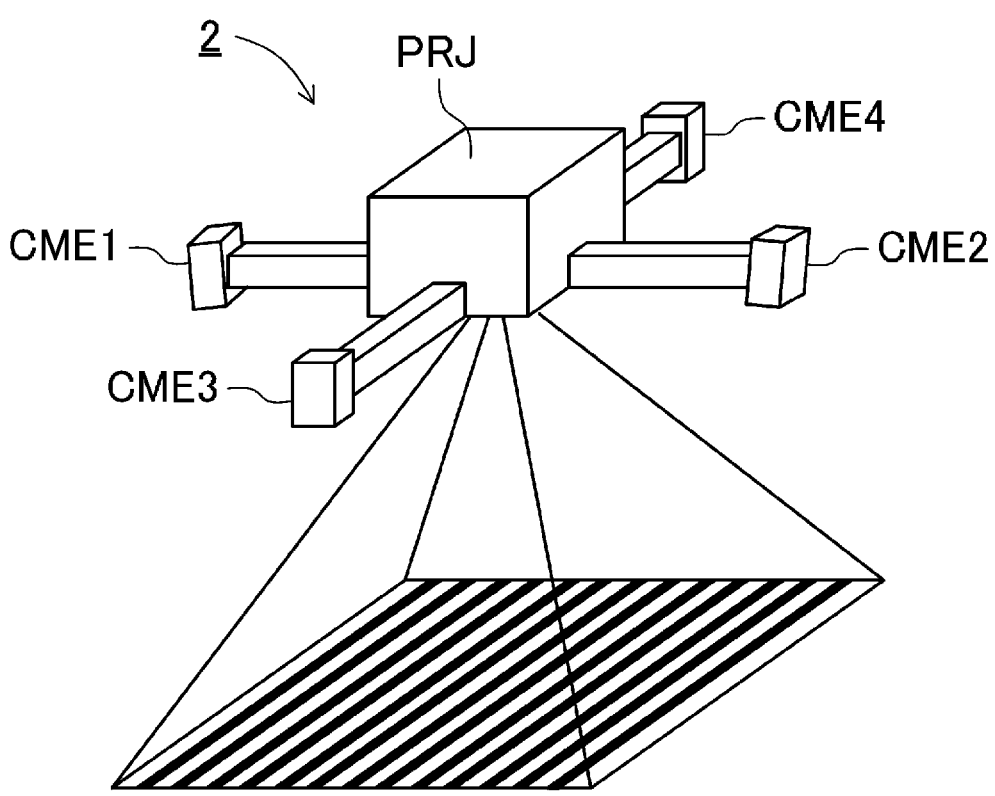
FIG. 7 is a perspective view showing an example of a sensor.

In this example, the sensor 2 includes a camera, a light, a projector, or the like, in addition to the measurement part 2a. For example, in a case where the three-dimensional shape of the workpiece WK is measured by the phase shift method, as shown in FIG. 7, a projector (light projecting part) PRJ, a plurality of cameras (light receiving parts) CME1, CME2, CME3, CME4 are provided as the sensor 2. The projector PRJ is a member that irradiates the object to be imaged with light. The cameras CME1, CME2, CME3, CME4 are members each equipped with an imaging sensor that receives light that is projected by the projector PRJ and reflected off the surface of the object to be imaged. A light source of the light projecting part may be made up of, for example, a plurality of light emitting diodes, a liquid crystal panel, an organic EL panel, a digital micromirror device (DMD), or the like.

The sensor 2 may be made up of a plurality of members such as the cameras CME1, CME2, CME3, CME4 and the projector PRJ, or alternatively, may be made up of one united body of such members. For example, a three-dimensional imaging head that results from integrating the cameras CME1, CME2, CME3, CME4 and the projector PRJ into a head shape may serve as the sensor 2.

Further, the measurement part 2a of the sensor 2 is further capable of creating three-dimensional shape data. In this case, the measurement part 2a needs to be provided with an image processing IC or the like that implements a function of creating three-dimensional shape data. Alternatively, another configuration may be employed in which the creation of the three-dimensional shape data is not performed by the sensor 2, and a raw image captured by the sensor 2 is transferred to the image processing device 300 and image-processed by a measurement part (not shown) of the image processing device 300 to form three-dimensional shape data such as a three-dimensional image. The sensor 2 can output the three-dimensional shape data that is image data to a determination part 305 to be described later or the like.

The robot setting device 100 performs a three-dimensional search, an interference determination, a holding solution calculation, and the like based on the three-dimensional shape data of the workpiece WK obtained by the sensor 2. The robot setting device 100 may be implemented by a general-purpose computer having a special-purpose image processing program installed therein, a purpose-built image processing controller, or special-purpose hardware. Alternatively, the robot setting device 100 may be implemented by a special-purpose computer having an image processing program installed therein and including hardware such as a graphic board specialized in image inspection processing.

Figure 5:
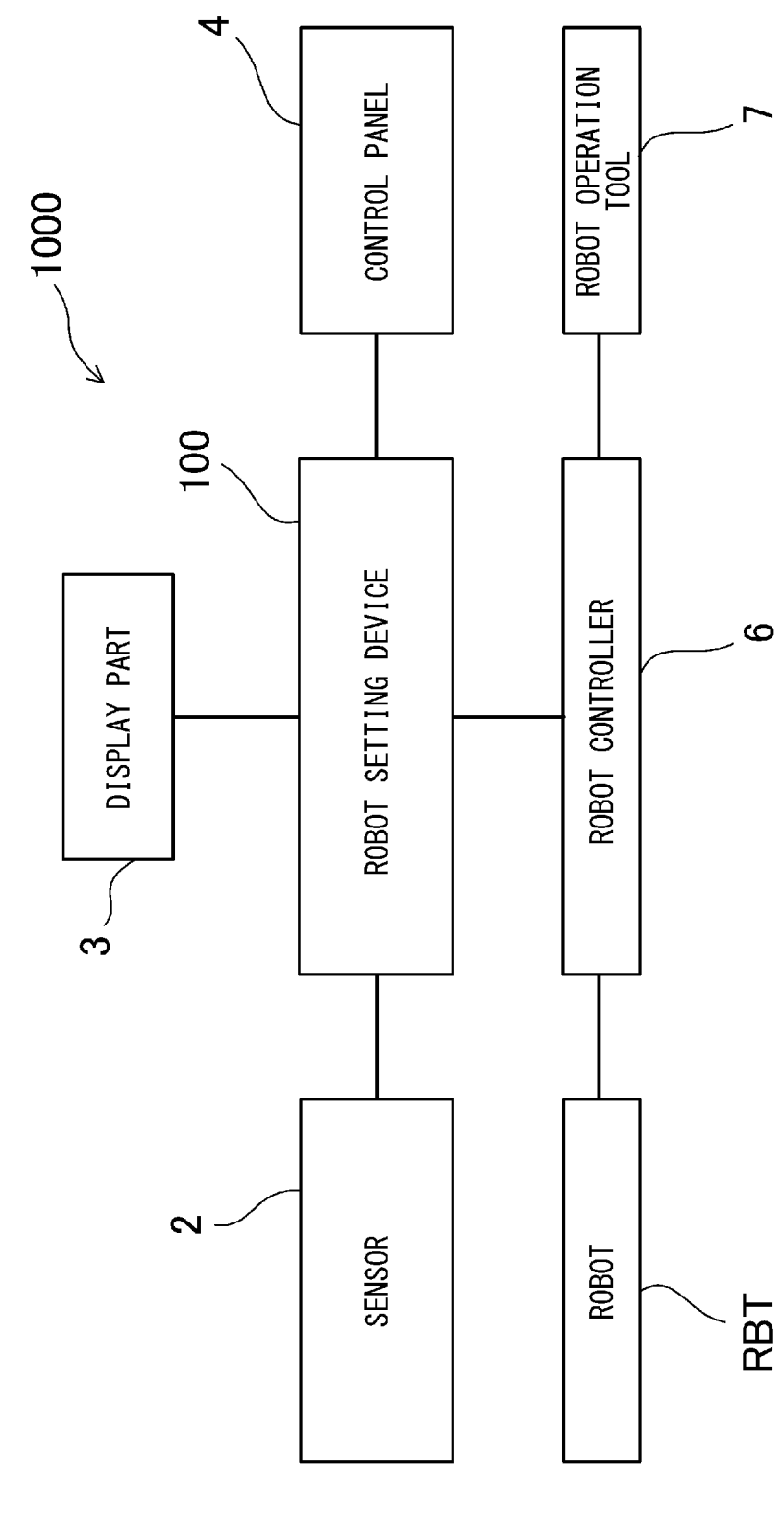
FIG. 5 is a block diagram schematically showing a structure of the robot system.

Note that FIG. 5 shows an example where the sensor 2, the robot controller 6, and the like are members separate from the robot setting device 100, but the present invention is not limited to such a structure, and, for example, the sensor 2 and the image processing device 100 may be integrated into a single entity, or alternatively, the robot controller 6 may be incorporated into the robot setting device 100. As described above, the division of the members shown in FIG. 5 is an example, and a plurality of members may be integrated.

The sensor 2 is separate from the robot RBT. That is, the sensor 2 is not provided on the arm ARM of the robot body 5, which is called an off-hand type. Note that the sensor 2 may be provided on the arm ARM.

The display part 3 may be made up of, for example, a liquid crystal monitor, an organic EL display, a CRT, or the like. Further, the control panel 4 may be made up of various input devices such as a keyboard, a mouse, and a pointing device. Further, the use of the display part 3 with a touch-screen allows the control panel 4 and the display part 3 to be integrated with each other.

For example, when the robot setting device 100 is implemented by a computer having the image processing program installed therein, a graphical user interface (GUI) screen of the image processing program is displayed on the display part 3. Various settings can be made on the GUI displayed on the display part 3, and various images or a processing result such as a result of the interference determination can be displayed on the GUI. In this case, the display part 3 can also be used as a setting part for making various settings, and the setting part may include the control panel 4.

The robot controller 6 controls the motion of the robot based on, for example, information captured by the sensor 2. The robot operation tool 7 is a member for making motion settings of the robot RBT, and a pendant or the like may be used as the robot operation tool 7.

As shown in FIG. 1, a plurality of workpieces WK are randomly stored in the container BX. The sensor 2 is disposed above such a work space. The robot controller 6 determines a workpiece WK to be held from among the plurality of workpieces WK based on the three-dimensional shape of the workpiece WK obtained by the sensor 2, determines a possible holding position, and controls the robot RBT to hold the possible holding position of the workpiece WK to be held. Then, while holding the workpiece WK, the arm ARM is moved to a predetermined placing position, for example, onto the stage STG, to place the workpiece WK in a predetermined orientation. In other words, the robot controller 6 controls the motion of the robot RBT to cause the hand HND to hold a workpiece WK to be picked that has been identified by the sensor 2 and the robot setting device 100, place the workpiece WK thus held onto a placing location (stage STG) in a predetermined reference orientation, and then open the hand HND. Examples of the stage STG may include a conveyor belt and a pallet.

Herein, bulk picking means not only that the workpieces WK randomly stowed in the container BX are each held by the robot RBT and placed at a predetermined position, but also an example where the workpieces WK stowed in a predetermined area without the use of the container BX are each held and placed, or an example where the workpieces WK arranged and stowed in a predetermined orientation are sequentially held and placed. Further, it is not always necessary that the workpieces WK are stowed, and a state where the workpieces WK are randomly placed on a plane without overlapping each other is also referred to as stowed in bulk herein (this is because sequential picking is performed, and even when the workpieces WK do not overlap each other at the final stage of picking, the state is still referred to as bulk picking). Note that the present invention is not necessarily limited to bulk picking, and is also be applicable to a case where the workpieces WK that have not been stowed in bulk are held and conveyed.

Further, in the example shown in FIG. 1, the sensor 2 is fixed above the work space, but the fixed position of the sensor 2 may be any position where the sensor 2 can capture an image of the work space; therefore, the sensor 2 may be disposed at any position such as a position obliquely above the work space, a position on a side of the work space, a position below the work space, or a position obliquely below the work space. Further, the numbers of cameras and lights included in the sensor 2 are not limited to one, and may be plural. Furthermore, the connection with the sensor 2, the robot RBT, and the robot controller 6 is not limited to a wired connection, and may be a known wireless connection.

When the bulk picking motion is performed by the robot system 1000, it is possible to perform teaching including settings for performing the bulk picking motion in advance. Specifically, which part of the workpiece WK is held by the hand HND, which orientation the hand HND holds the workpiece WK in, a holding position, an orientation, and the like are registered. Such settings may be made by the robot operation tool 7 such as a pendant. Further, as will be described later, the settings may be made on a vision space without operation of the actual robot.

The display part 3 three-dimensionally displays a workpiece model that virtually represents the three-dimensional shape of the workpiece WK or an end effector model made up of three-dimensional CAD data that virtually represents the three-dimensional shape of the hand HND in a virtual three-dimensional space. The display part 3 can further display a basic direction image of the work model as six orthogonal views. This allows the setting work of the holding position to be made with each orientation of the work model displayed in the form of six orthogonal views, which facilitates the setting work of the holding position that is a difficult work in the related art.

Figure 6:
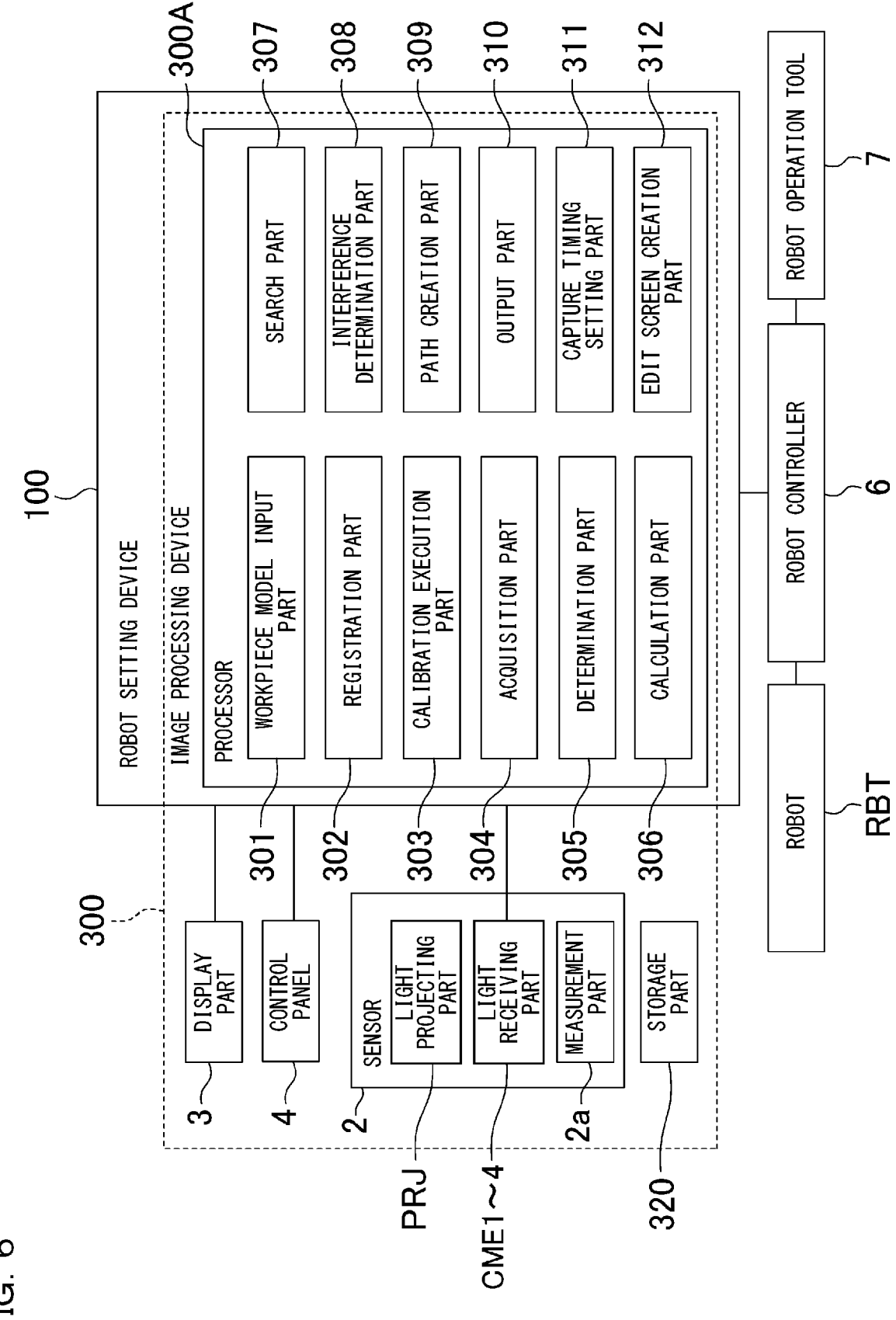
FIG. 6 is a block diagram detailing the structure of the robot system.

(Structure of image processing device 300) As shown in FIG. 6, the robot setting device 100 includes the image processing device 300. The image processing device 300 may include the sensor 2, the control panel 4, and the display part 3. The image processing device 300 further includes the processor 300A including a microcomputer and the like. The processor 300A includes a workpiece model input part 301 to which a workpiece model is input and a registration part 302 that registers a hand model. The processor 300A further includes a calibration execution part 303, an acquisition part 304 that acquires the coordinates of the robot RBT, a determination part 305 that determines the position and orientation of the hand HND attached to the flange FLG of the robot RBT, and a calculation part 306 that calculates the attachment position of the hand HND. The processor 300A further includes a search part 307 that searches for a holding position of the workpiece WK, an interference determination part 308 that determines whether or not the hand HND interferes with a surrounding object, a path creation part 309, and an output part 310 that outputs coordinate information and the like to the robot controller 6. A detailed description will be given below of a process executed by each part of the processor 300A.

Figure 8:
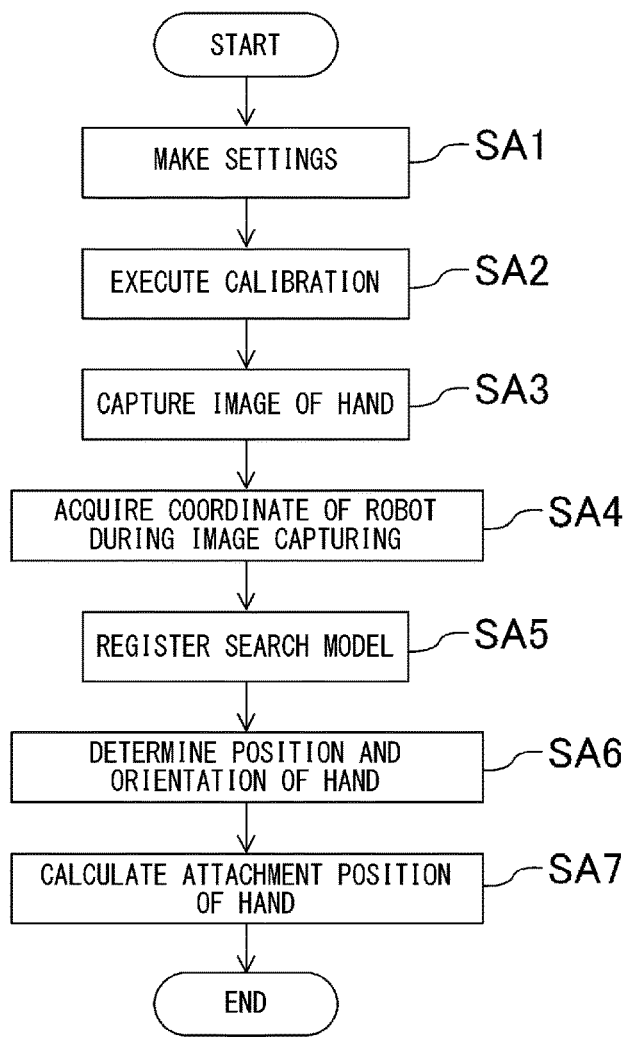
FIG. 8 is a flowchart showing an example of a procedure of a hand attachment position calculation process executed by an image processing device.
Figure 9:
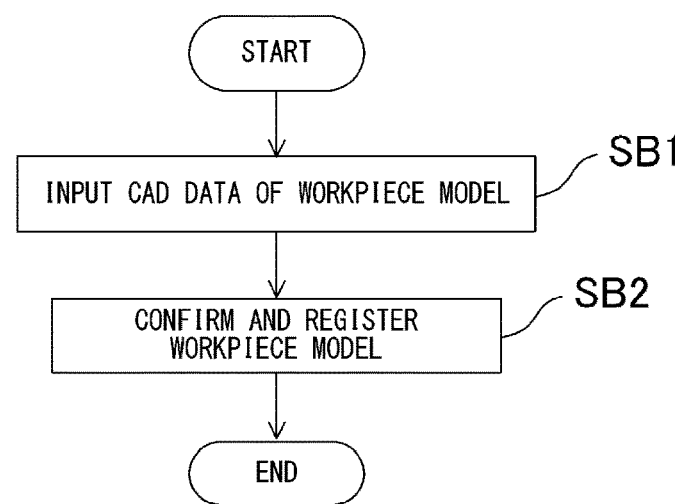
FIG. 9 is a flowchart showing an example of a procedure for registering a workpiece model.

FIG. 8 is a flowchart showing an example of a procedure of interference determination performed by the processor 300A. Step SA1 is a step of setting an environment for performing the interference determination. The main procedure of this setting is as shown in the flowchart showing the procedure for registering the workpiece model shown in FIG. 9 and the flowchart showing the procedure for registering the hand model and the holding position shown in FIG. 10. Either of the workpiece model registration and the hand model and holding position registration may be made first.

(Structure of workpiece model input part 301) The workpiece model input part 301 shown in FIG. 6 is a part that receives the workpiece model and information on a holding position on the workpiece model held by the hand HND. Specifically, the workpiece model and information on a holding position can be input and registered in accordance with the flowchart shown in FIG. 9.

Step SB1 after the start is a step of inputting the workpiece model. The workpiece model is a model that represents the shape of the workpiece WK and is used when a search process to be described later is performed on the workpieces WK, and may be referred to as a search model. When the workpiece model is input in step SB1, three-dimensional CAD data (CAD model) of the workpiece WK can be read and temporarily stored in a storage part 320 (shown in FIG. 6) of the image processing device 300. As the three-dimensional CAD data, for example, data in a format that is commonly used in the related art may be used, and may be read and used at any timing.

According to the present embodiment, the STL format that is the simplest among three-dimensional CAD data formats is used. The STL format is data made up of only a list of pieces of triangular polygon information (coordinates of three points and a normal vector of the surface). Alternatively, the workpiece model may be made up of point cloud data containing three-dimensional information. Alternatively, the workpiece model may be made up of image data containing height information, for example, a height image or a distance image.

After inputting the workpiece model in step SB1, the process proceeds to step SB2 in which the workpiece model is confirmed and registered. For example, displaying the CAD data of the workpiece model thus input on the display part 3 allows the user of the image processing device 300 to confirm whether or not the workpiece model is a desired workpiece model. When the result shows that the workpiece model is the desired workpiece mode, the workpiece model is registered in an image processing device 200. When the result of the confirmation shows that the workpiece model is not the desired workpiece model, another three-dimensional CAD data is selected and input, and the confirmation is performed again.

Further, six surfaces of the three-dimensional CAD model read in step SB1, that is, the height image of the three-dimensional CAD model viewed from each direction of "top", "bottom", "left", "right", "front", and "rear" is created in step SB2. First, six pieces of height image data are created, the six pieces of height image data corresponding to a plan view, bottom view, left side view, right side view, front view, and rear view of the CAD model. The height image is obtained from this height image data. The "top" corresponds to a height image viewed from a positive direction of the Z axis (plus side), the "bottom" corresponds to a height image viewed from a negative direction of the Z axis (minus side), the "left" corresponds to a height image viewed from a negative direction of the X axis, the "right" corresponds to a height image viewed from a positive direction of the X axis, the "front" corresponds to a height image viewed from a negative direction of the Y axis, and the "rear" corresponds to a height image viewed from a positive direction of the Y axis. However, these are merely examples, and a different coordinate system may be used, and, based on a coordinate system orthogonal to an axis corresponding to a straight line of X=Y in the XY plane, height images viewed from the positive and negative directions of each axis may be used. Further, when the height image is created from the three-dimensional CAD data, the height image needs not necessarily be a height image viewed from a direction ("top", "bottom", "left", "right", "front", "rear") orthogonal to each axis of the CAD data, and, for example, with the orientation (viewpoint) of the workpiece model changed as desired, the height image may be created based on the changed viewpoint.

Further, since the CAD model is made up of three-dimensional CAD data, the three-dimensional CAD data is converted into height images viewed from the plus direction and minus direction of each of the X, Y, and Z coordinates of the CAD model, thereby generating height images of the six surfaces of the CAD model.

It is also possible to delete a height image that has the same appearance among the six height images created as described above. The appearance matching/mismatching is determined based on whether height images, created based the height image data, of six surfaces viewed from the top and bottom of the workpiece (positive and negative directions of the Z axis), the front and rear (positive and negative directions of the Y axis), and the left and right (positive and negative directions of the X axis) match each other. Herein, the workpiece is rotated by 90° each time for matching determination, and a surface that appears to match any other surface is excluded from registration targets of the search model. Such exclusion may be performed manually by the user of the image processing device 300, may be performed automatically by the image processing device 300, or these methods may be combined to each other.

With reference to a description of a specific example, for example, when the workpiece WK is cuboid in shape, the height image of the three-dimensional CAD model viewed from the top and the height image viewed from the bottom are the same, and in this case, either of the height images is deleted. Since the height image of the three-dimensional CAD model viewed from the left and the height image viewed from the right are the same, either of the height images is deleted. Further, since the height image of the three-dimensional CAD model viewed from the front and the height image viewed from the rear are the same, either of the height images is deleted. Even when the workpiece WK has a complicated shape, the height image viewed from one direction may be the same as the height image viewed from the other direction, and, in this case as well, either of the height images can be deleted. When the workpiece WK is cuboid in shape, five surfaces of the six surfaces can be deleted.

As a result of deleting either of the same images, the remaining height image data is stored. Information showing whether the height image data to be stored corresponds to an image viewed from the top, bottom, left, right, front, or rear of the three-dimensional CAD model, that is, information on the direction, is added to the height image data, and the information on the direction and the height image data are stored in the storage part 320 of the image processing device 300 in association with each other. This allows each height image to be stored together with relation information on each of top, bottom, left, right, front, and rear surfaces, so that a plurality of pieces of height image data of one workpiece model viewed from different directions can be registered in the image processing device 300 in association with each other.

Therefore, when the height image data is read from the storage part 320, for example, the height images viewed from the six directions of the three-dimensional CAD model can be obtained in association with each other. As described above, it is possible to register a plurality of pieces of height image data obtained by viewing the workpiece model from different directions as the search model of the workpiece WK. A plurality of types of search models of the workpiece WK may be registered. Note that only the height image data may be stored without storing the relation information on each surface.

The above-described method is applicable to a case where the three-dimensional CAD data of the workpiece WK exists, but when there is no three-dimensional CAD data of the workpiece WK, a plurality of pieces of height image data of the workpiece model viewed from different directions may be registered as the search model. That is, the workpiece WK with the surface to be registered facing upward is placed on a plane, and a three-dimensional measurement is performed. This three-dimensional measurement may be performed using the sensor 2 of the robot system 1000. The measurement data obtained by the sensor 2 is output, and the height image data of the surface of the workpiece WK to be registered can be obtained based on the measurement data.

After the height image is obtained based on the height image data thus obtained, the height image is registered as the search model of the workpiece WK. After the registration, a determination is made as to whether height images necessary for search have been registered. This determination may be made by the user, or alternatively, may be made by the image processing device 300. That is, when the shapes of the workpiece WK viewed from each direction of top, bottom, left, right, front, and rear are different from each other, it is preferable to obtain height images of all of the six surfaces, but as in a case of the rectangle described above, when there are surfaces having the same shape, it is not necessary to obtain height images of all the six surfaces. When height images necessary for search have been registered, the process is brought to an end.

Figure 10:
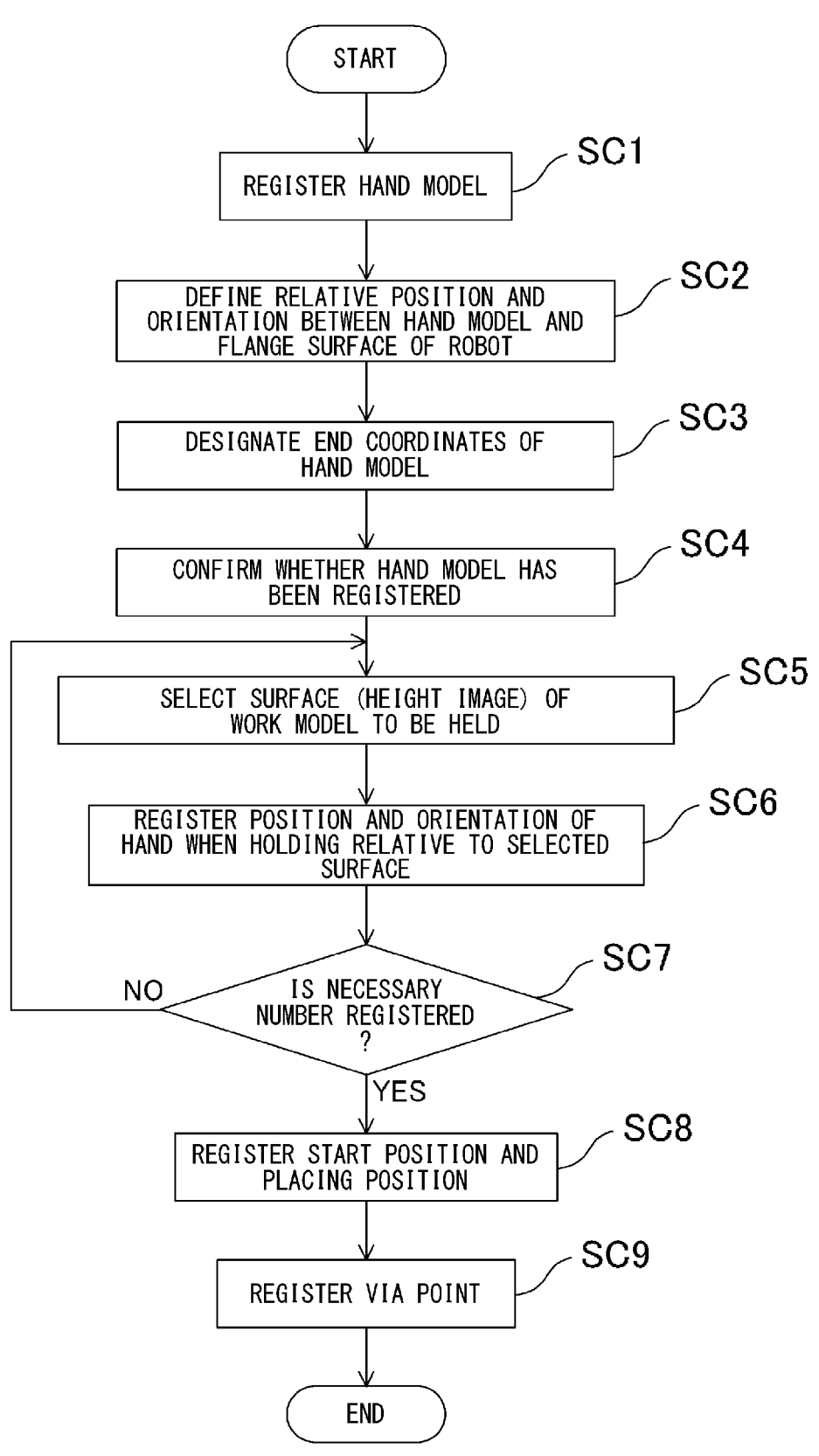
FIG. 10 is a flowchart showing an example of a procedure for registering a hand model and a holding position.

(Structure of registration part 302) As shown in FIG. 6, the registration part 302 is a part that registers the hand model representing the shape of the hand HND attached to the flange FLG of the robot RBT. A procedure for registering the hand model by the registration part 302 is as shown in the flowchart of FIG. 10. Step SC1 after the start is a step of registering the hand model of the robot RBT. The hand model of the robot RBT is a model representing the shape of the hand HND. When the hand model of the robot RBT is registered, polygon data (three-dimensional CAD data) of the hand HND is received. In step SC1, inputting the polygon data of the hand HND causes the model represented by the three-dimensional CAD data thus input to be registered as the hand model. When the three-dimensional CAD data of the hand HND is input, origin position information on the three-dimensional CAD data is also received. The input of the origin position information is concomitant with the three-dimensional CAD data, which eliminates the need of input work by the user, and allows the input of the origin position information to be made concurrently with the input of the three-dimensional CAD data of the hand HND.

For hand model registration, a hand model may be created by combining three-dimensional parts such as a cuboid and a cylinder in addition to the three-dimensional CAD data, and the created hand model may be registered. Further, a cable that is not included in the three-dimensional CAD data, or the like may be created and registered.

In step SC2, a relative position and orientation between the hand model registered in step SC1 and the flange FLG of the robot RBT to which the hand model is attached are defined. Specifically, a positional relation between the two is defined such that the attachment surface of the hand model and the flange FLG of the robot RBT match. At this time, the position and orientation of the hand HND based on the coordinates of the flange FLG can be received.

In step SC3 after step SC2, end coordinates of the hand model attached to the flange FLG of the robot RBT are designated. The end coordinates can be obtained from the robot controller 6 or set by the user. Then, in step SC4, whether the hand model has been registered is confirmed.

After the hand model of the robot RBT is registered as described above, the process proceeds to step SC5. In step SC5, the surface of the workpiece model to be held by the hand HND of the robot RBT is selected. The surface of the workpiece model can be represented by the height image registered in the flowchart shown in FIG. 9, and the user selects a height image corresponding to a surface that can be held by the hand HND of the robot RBT from among the plurality of height images registered. The user can operate the control panel 4 to select the corresponding height image from height images displayed on the display part 3.

After the height image is selected in step SC5, the process proceeds to step SC6, and the position and orientation of the hand HND when holding the surface selected in step SC5 are registered. For example, it is possible to input X-axis coordinates, Y-axis coordinates, Z-axis coordinates, a rotation angle about the X axis, a rotation angle about the Y axis, a rotation angle about the Z axis individually, and move the hand model in accordance with the values thus input to be placed at a desired position in the height image. This makes it possible to set which part of the workpiece model is held by the hand model and which orientation the hand model holds the workpiece model in, that is, the holding position and orientation, while adjusting the position of the hand model. The holding position and orientation may be set by not only inputting numerical values, but also directly operating the hand model with a mouse of the control panel 4, for example.

The holding position thus set is a possible holding position held by the robot RBT. A plurality of possible holding positions held by the robot RBT can be each set in association with a corresponding search model of the workpiece WK pre-registered. For example, two possible holding positions can be set in association with one search model, and four possible holding positions can be set in association with another search model. The set possible holding position can be stored in the storage part 320 in association with the search model.

In general, a plurality of possible holding positions are often registered for one workpiece WK. This is because if a plurality of possible holding positions are registered, the optimum solution can be selected from among a plurality of holding solutions, and if a possible holding solution tentatively obtained cannot be the final solution due to, for example, interference of the hand HND with another object and there is another possible holding solution, the possibility of determination that holding is possible is increased. In a configuration where a plurality of such possible holding positions are registered one by one from the beginning, a lot of time and effort is required to register similar possible holding positions, which makes the work time-consuming. Therefore, copying already registered possible holding position information and changing some position parameters set for this possible holding position to allow the possible holding position information to be saved as a new possible holding position makes it possible to register, without time and effort, a plurality of possible holding positions in a simplified manner. Further, similarly, it is possible to read out an existing possible holding position, appropriately modify the position parameter, and save the change.

When the possible holding position is registered, a position and orientation of the hand HND at the time of holding the workpiece WK relative to the origin of the search model are registered. On the other hand, when the workpiece WK is held by the actual hand HND, it is required that coordinates of the three-dimensional space (vision space) where the image of the workpiece is captured by the sensor 2 be converted into robot coordinates to be used when the robot controller 6 actually puts the robot RBT into motion.

Specifically, the position and orientation of the workpiece model are obtained from a position (X, Y, Z) and orientation (Rx, Ry, Rz) in the vision space (the orientation (Rx, Ry, Rz) represents an orientation expressed by ZYX Euler angles). Further, the orientation of the hand HND that holds the same is also obtained as the position (X, Y, Z) and orientation (Rx, Ry, Rz) in the virtual three-dimensional space of the image processing device 300. Based on the position and orientation in such a vision space, in order for the robot controller 6 to put the robot RBT into motion, the position and orientation need to be converted into a position (X', Y', Z') and orientation (Rx', Ry', Rz') in these robot spaces. A process of obtaining a conversion expression for converting the position and orientation calculated in the displayed coordinate system into the position and orientation in the coordinate system in which the robot controller 6 puts the hand HND into motion is called calibration. This calibration will be described later.

In step SC7 of the flowchart shown in FIG. 10, a determination is made as to whether the necessary number of possible holding positions have been successfully registered. When there are a large number of parts that can be held by the hand HND, the number of possible holding positions to be registered will increase, but this is a matter for the user to determine, so that the determination in step SC7 is made by the user. When it is determined to be NO in step SC7, the necessary number of possible holding positions have yet to be registered, and there are other possible holding positions to be registered left, the process proceeds to step SC6 via step SC5, and the other possible holding positions are set and registered. On the other hand, when it is determined to be YES in step SC7, and the necessary number of possible holding positions have been registered, the process proceeds to step SC8.

In step SC8, the start position and the placing position are registered. The placing position is a position where the workpiece WK is placed by the robot hand HND, and can be set, for example, to a position on the stage STG shown in FIG. 1. The start position and the placing position can be set by a method in which coordinates and the like are input numerically, or alternatively, can be set by, for example, direct operation of the robot hand model with a mouse or the like of the control panel 4.

Upon completion of step SC8, the process proceeds to step SC9. In step SC9, a via point through which the workpiece WK passes when moving from the holding execution position to the placing position is registered. One via point may be registered, or two or more via points may be registered. The via point may be registered for a plurality of places, and in this case, the via points may be named as a via point 1, a via point 2, or the like and then stored in the storage part 320. In this example, a description will be given of a configuration where the via point is registered by the user, but the present invention is not limited to such a configuration, and the image processing device 300 may be configured to automatically calculate the via point and present the via point to the user. In this case, step SC9 will be skipped.

The via point registered in step SC9 is a point through which the robot hand HND or the workpiece WK passes until the workpiece WK is placed at the placing position after the robot hand HND holds the workpiece WK. The via point may be set by a method in which coordinates, or the like are input numerically, or alternatively, may be set by, for example, direct operation of the robot hand model with a mouse or the like of the control panel 4. When the via point is set, the motion of the robot hand HND is set such that a part of the robot hand HND, a part of the workpiece WK, or a fixedly set point relative to the robot hand HND passes through the via point while the workpiece WK held by the robot hand HND is being conveyed from the start position to the placing position. The point fixedly set relative to the robot hand HND may be, for example, the origin of the flange coordinate system.

Further, it is possible to set a standby position of the robot hand HND and set a via point on a forward path through which the robot hand HND passes until the robot hand HND located at the standby position holds the workpiece WK in the container BX. The standby position of the robot hand HND and the via point on the forward path may be set by a method in which coordinates and the like are input numerically, or alternatively, may be set by, for example, direct operation of the robot hand model with a mouse or the like of the control panel 4.

Note that the via point may be given as robot coordinates (X, Y, Z, Rx, Ry, Rz), but the via point may be given as a joint angle of the arm ARM. When the via point is given as a joint angle of the arm ARM, the arm position of the robot to be subjected to the interference determination is uniquely determined.

The joint angle can be obtained from the robot coordinates such as the holding position in the processor 300A and transmitted to the robot controller 6. The designated position can be designated on the user interface as either the robot coordinates or the joint angle. The mechanism for obtaining the joint angle from the robot coordinates is referred to as "inverse kinematics", and is applied to the path creation as with the interference determination. After the above processes, the flow shown in FIG. 10 is brought to an end. All the above processes are executed, bringing step SA1 of the flowchart shown in FIG. 8 to an end.

(Execution step of calibration) After step SA1 of the flowchart shown in FIG. 8, the process proceeds to step SA2, and the calibration execution part 303 shown in FIG. 6 executes the calibration. As described above, for example, the position and orientation of the workpiece WK detected by the sensor 2 are calculated based on the camera coordinates, but when the workpiece WK is actually held by the robot RBT, the position and orientation based on the robot coordinates are required. Information for use in converting the position and orientation based on the camera coordinates into the position and orientation based on the robot coordinates may be referred to as calibration data.

As an example, the calibration data is expressed as a conversion matrix between two coordinate systems. In order to create the conversion matrix, a combination of arrays of position and orientation values based on the respective coordinates for the same position and orientation is required. With such arrays, the conversion matrix between the two coordinate systems can be estimated by solving the optimization problem using the conversion matrix as a variable.

Examples of the method for creating the combination of arrays include a method in which the robot RBT holds the object to be detected, moves the object by a predetermined movement amount in the X, Y, Z directions, and the robot coordinates at each point and the detected position are registered. Since the coordinate conversion matrix is calculated within this set range, it is desirable that the range set here be as large as possible to cover the entire range in which the object to be detected may exist during operation of the robot RBT. This is because if the coordinate conversion is performed outside the calculated range, the deviation may increase.

However, when the set range is increased, problems may occur such as that the set range is outside the motion range of the robot RBT, that the robot RBT interferes with an obstacle, that the object to be detected is behind the robot RBT to prevent the sensor 2 from detecting the object to be detected. In the first place, unless the positional relation between the robot RBT and the sensor 2 is at least roughly known, it is not possible to determine either whether or not the range for calibration is appropriate, or whether or not the hand HND interferes with an obstacle.

Further, although it is possible to check in advance whether the set range is outside the motion range of the robot RBT or whether the robot RBT interferes with an obstacle, unless the positional relation between the robot RBT and the sensor 2 is known, it is not possible to check the problem that the object to be detected is behind the robot RBT.

Therefore, the calibration execution part 303 according to the present embodiment executes the calibration in a narrow range as the first step to calculate the positional relation between the robot RBT and the sensor 2, and, as the second step, uses the information acquired in the first step to check whether a problem occurs when the calibration is executed in a range wider than the range in the first step. Examples of the calibration in a narrow range include an example where calibration in a wide range set by the user is reduced in any desired reduction ratio and the calibration is executed in the range thus reduced.

Data for use in calculation of the tool center may be used for the first calculation of the positional relation between the robot RBT and the sensor 2. The calculation of the tool center corresponds to a calculation of an offset between the detection point detected by the sensor 2 and the tool center point indicating the current position of the robot RBT. Rotating about the tool center and making detection at each point allows the offset to the tool center point to be calculated.

Hereinafter, the calibration according to the present embodiment will be described in detail with reference to the flowchart shown in FIG. 11. In step SD1 after the start, the center robot position is set. Since this center robot position serves as the start position when the calibration operation is started, step SD1 may be referred to as a start position setting step.

Figure 12:
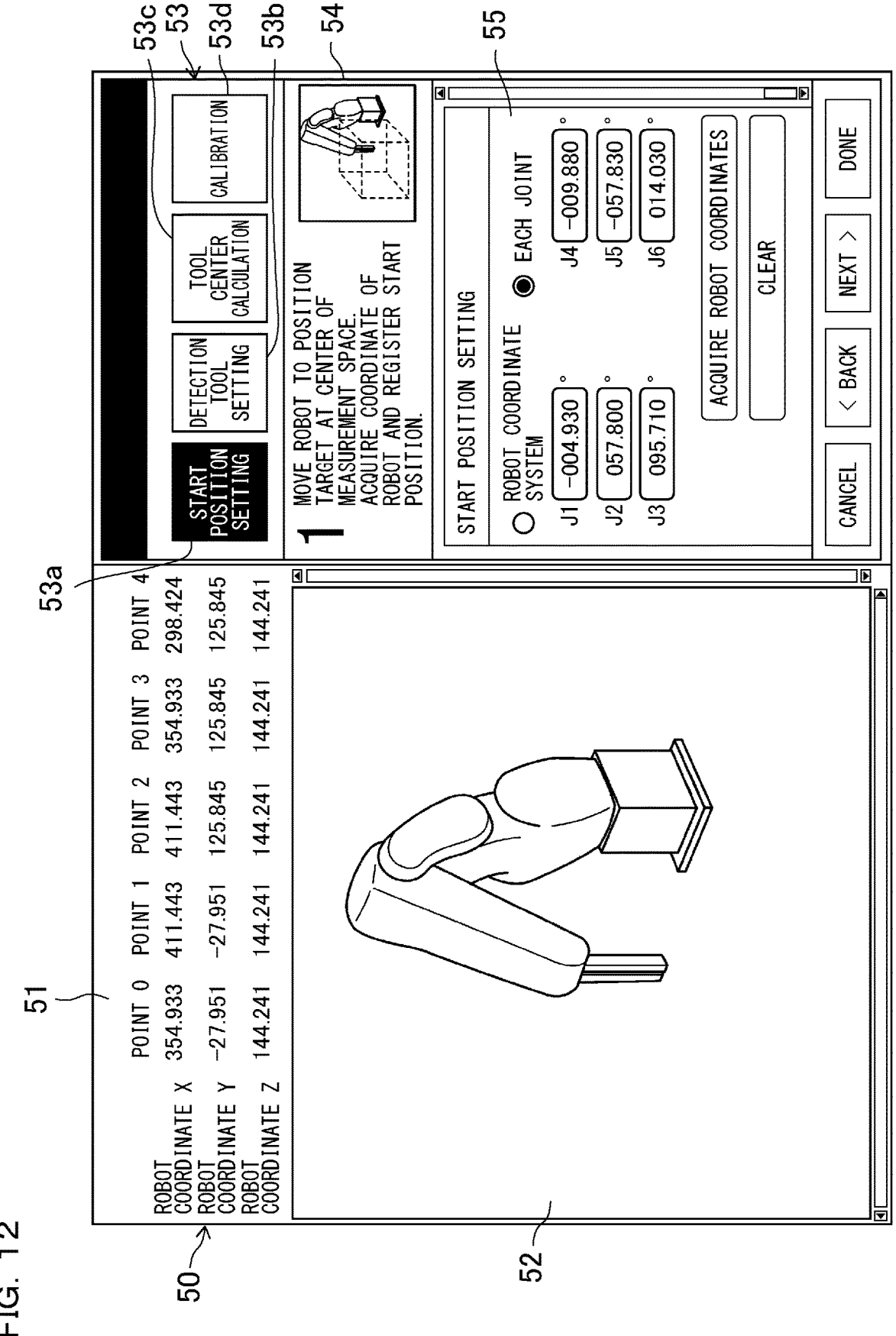
FIG. 12 is a diagram showing an example of a user interface screen displayed when a center robot position is set.

In step SD1, the calibration execution part 303 creates a user interface screen 50 shown in FIG. 12 and displays the user interface screen 50 on the display part 3. The user interface screen 50 includes a coordinate display area 51 where the robot coordinates are displayed, a robot model display area 52 where a robot model is displayed, and a setting window 53. In the coordinate display area 51, the coordinates of each point where the calibration is executed are displayed. In this example, points 0 to 4 are displayed, but the coordinates of all points (27 points in the example to be described later) can be confirmed by switching the display.

In the robot model display area 52, a three-dimensional model of the robot RBT that performs a picking motion can be displayed. Data from which this robot model is created can be acquired by, for example, reading the three-dimensional data of the robot RBT from the outside.

The setting window 53 includes a start position setting button 53*a*, a detection tool setting button 53*b*, a tool center calculation button 53*c*, and a calibration start button 53*d*. The setting window 53 further includes an information display area 54 where a message or an explanatory diagram for describing a process or motion corresponding to an operated button among the buttons 53*a* to 53*d* is displayed.

Figure 11:
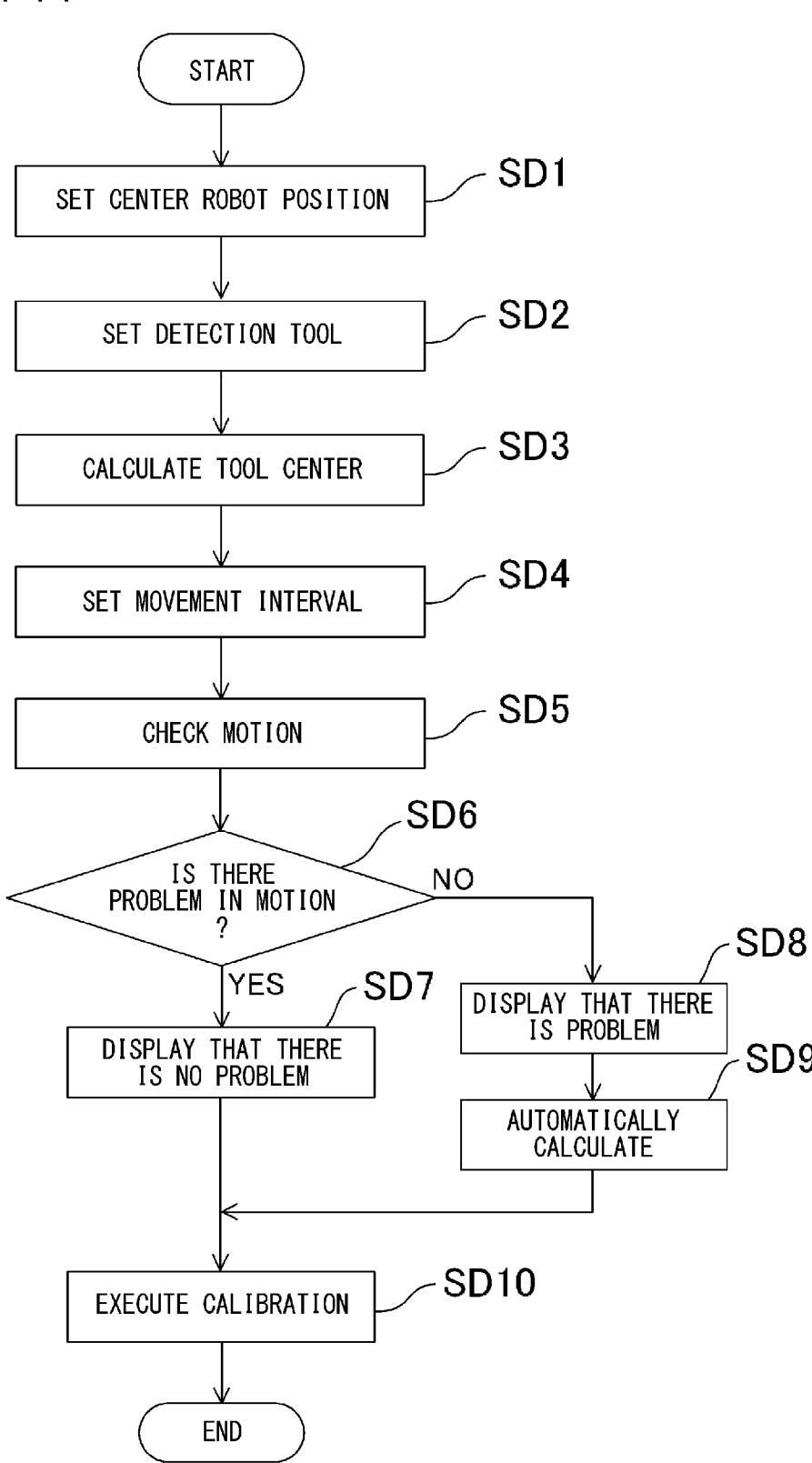
FIG. 11 is a flowchart showing an example of a calibration procedure.

When step SD1 shown in FIG. 11 is executed, the user operates the start position setting button 53*a* of the setting window 53 shown in FIG. 12. Upon detection of the operation of the start position setting button 53*a*, the calibration execution part 303 displays a description of the setting of the start position in the information display area 54 together with a start position setting area 55 in the setting window 53.

In the start position setting area 55, the user can select either "robot coordinate system" or "each joint". When "robot coordinate system" is selected, the coordinates (X, Y, Z, Rx, Ry, Rz) of the current robot RBT (flange FLG) based on the robot coordinates are acquired and registered as the start position. On the other hand, when "each joint" is selected, the angle of each joint portion of the robot arm ARM is acquired, and the coordinates of the flange FLG calculated based on the angle are registered as the start position. The robot RBT is a six-axis robot; therefore, there are six variables J1 to J6. Changing these variables allows the start position to be set.

Subsequently, the process proceeds to step SD2 of the flowchart shown in FIG. 11 in which a detection tool is set. The detection tool is a tool for use in calibration and may be simply referred to as a tool or a workpiece. The detection tool is a tool to be held by the robot RBT and moved as described below, and the detection tool thus set can be detected by pattern matching to create calibration data.

Figure 13:
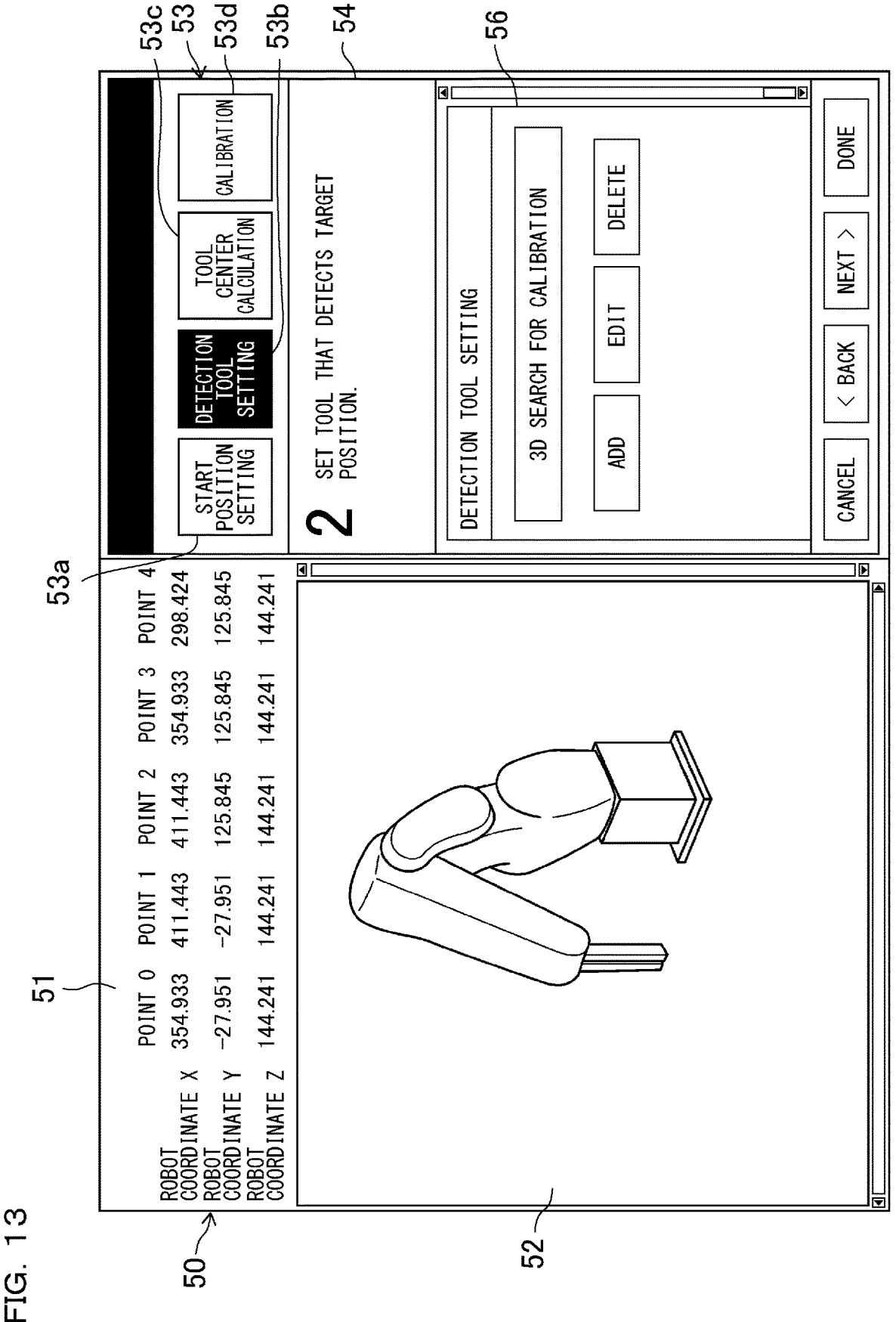
FIG. 13 is a diagram showing an example of a user interface screen displayed when a detection tool is set.

As shown in FIG. 13, upon detection of the operation of the detection tool setting button 53*b*, the calibration execution part 303 displays a description of the setting of the detection tool in the information display area 54 together with a detection tool setting area 56 in the setting window 53. In the detection tool setting area 56, a detection tool can be added or edited.

Subsequently, the process proceeds to step SD3 of the flowchart shown in FIG. 11 in which a tool center calculation step of calculating the center of the detection tool is executed. As shown in FIG. 14, upon detection of the operation of the tool center calculation button 53c, the calibration execution part 303 displays a description of the setting of the calculation of the tool center in the information display area 54 together with a tool center calculation area 57 in the setting window 53. The tool center calculation is a calculation to obtain the offset between the detection point detected by the sensor 2 and the tool center point indicating the current position of the robot RBT, and the center of the detection tool can be used for obtaining the offset between the detection tool detected by pattern matching and the flange FLG of the robot RBT. For example, rotating the detection tool about the center of the detection tool and making detection at each point allows the offset to the tool center point to be calculated. Note that, for the setting of the tool center calculation, the detection tool may be actually moved within a narrow range and then tentatively set.

Figure 15:
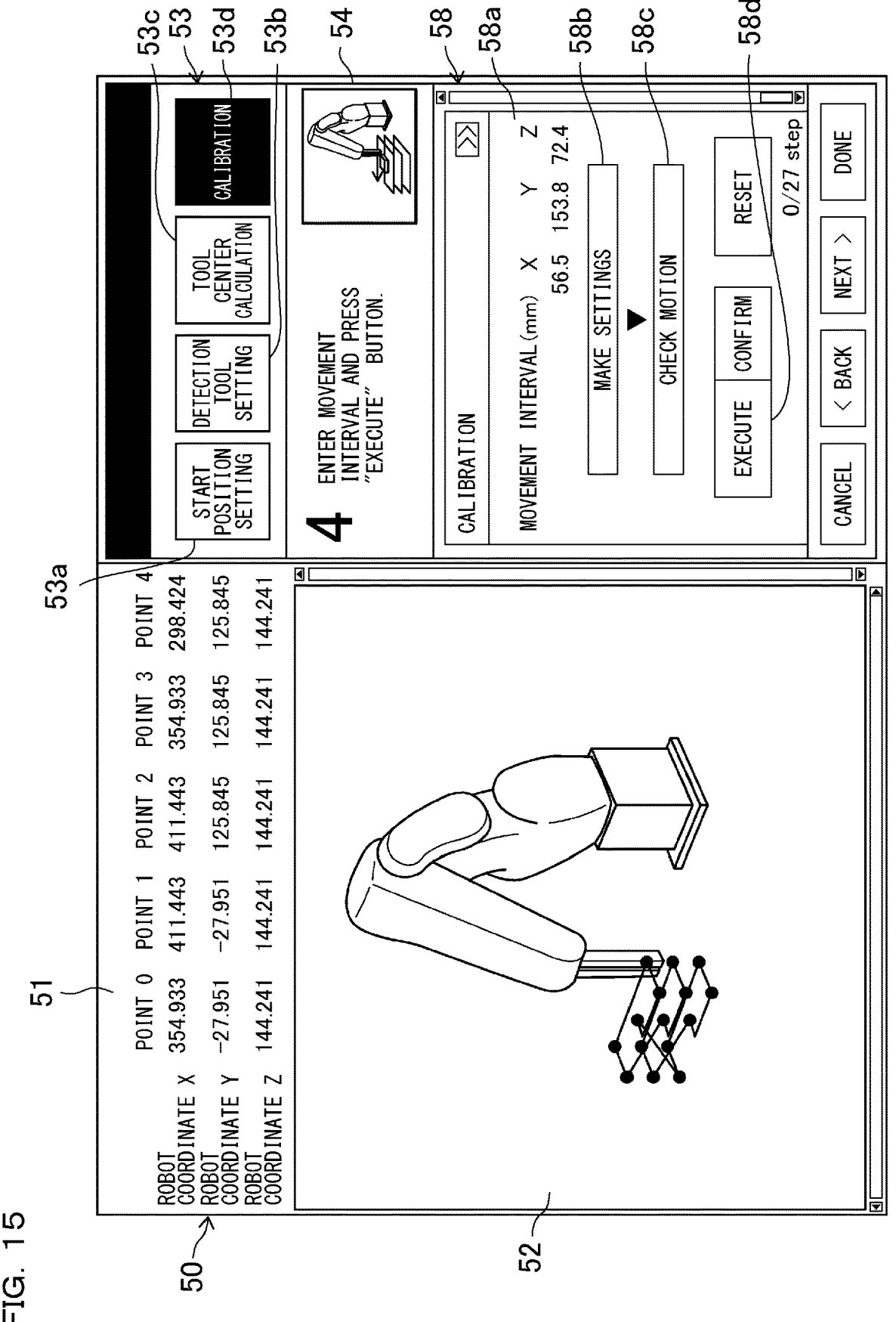
FIG. 15 is a diagram showing an example of a user interface screen displayed when calibration is executed.

In the following step SD4, the movement interval is set. The movement interval is a movement interval of the detection tool during calibration. First, as shown in FIG. 15, upon detection of the operation of the calibration start button 53d, the calibration execution part 303 displays a description of the input of the movement interval in the information display area 54 together with a calibration execution area 58 in the setting window 53.

The calibration execution area 58 includes a movement interval display area 58a where the movement intervals in the X, Y, and Z directions are individually displayed, a setting button 58b, and a motion check button 58c. Upon detection of the operation of the setting button 58b, the calibration execution part 303 displays a movement interval setting window 59 shown in FIG. 16 on the display part 3.

The movement interval setting window 59 includes a setting area 59a where the movement intervals in the X direction, the Y direction, and the Z direction can be individually set. The user can set each movement interval by inputting a numerical value (unit: mm), for example. The movement interval setting window 59 further includes a graphics display area 59b where a plurality of points indicating positions to which the detection tool is moved and a length (movement interval) between two adjacent points are graphically represented.

An initial point (a point denoted by 1 in FIG. 16) is set at the center of the sensor 2. Based on the initial point and the movement interval input by the user, 27 points (9×3) to be measured are determined and displayed in the graphics display area 59b shown in FIG. 16. The movement interval thus set is displayed in the movement interval display area 58a shown in FIG. 15.

Subsequently, the process proceeds to step SD5 of the flowchart shown in FIG. 11 in which the motion check is performed. In the motion check, whether or not the calibration can be correctly executed at the movement interval set in step SD4 is checked based on an approximate positional relation between the sensor 2 and the robot RBT determined by the tool center calculation in step SD3.

Prior to this check, a motion restriction area is set. Upon detection of the operation of the motion check button 58c shown in FIG. 15, the calibration execution part 303 displays a robot motion check window 60 shown in FIG. 17 on the display part 3. The motion restriction is to restrict, when a fence exists around the robot RBT, for example, the motion range of the robot RBT to an area within the fence to prevent the robot RBT from coming into contact with the fence. In the robot motion check window 60, the motion restriction area can be set in each of the X direction, Y direction, and Z direction. The motion restriction area is set by the user and received by the calibration execution part 303.

Figure 17:
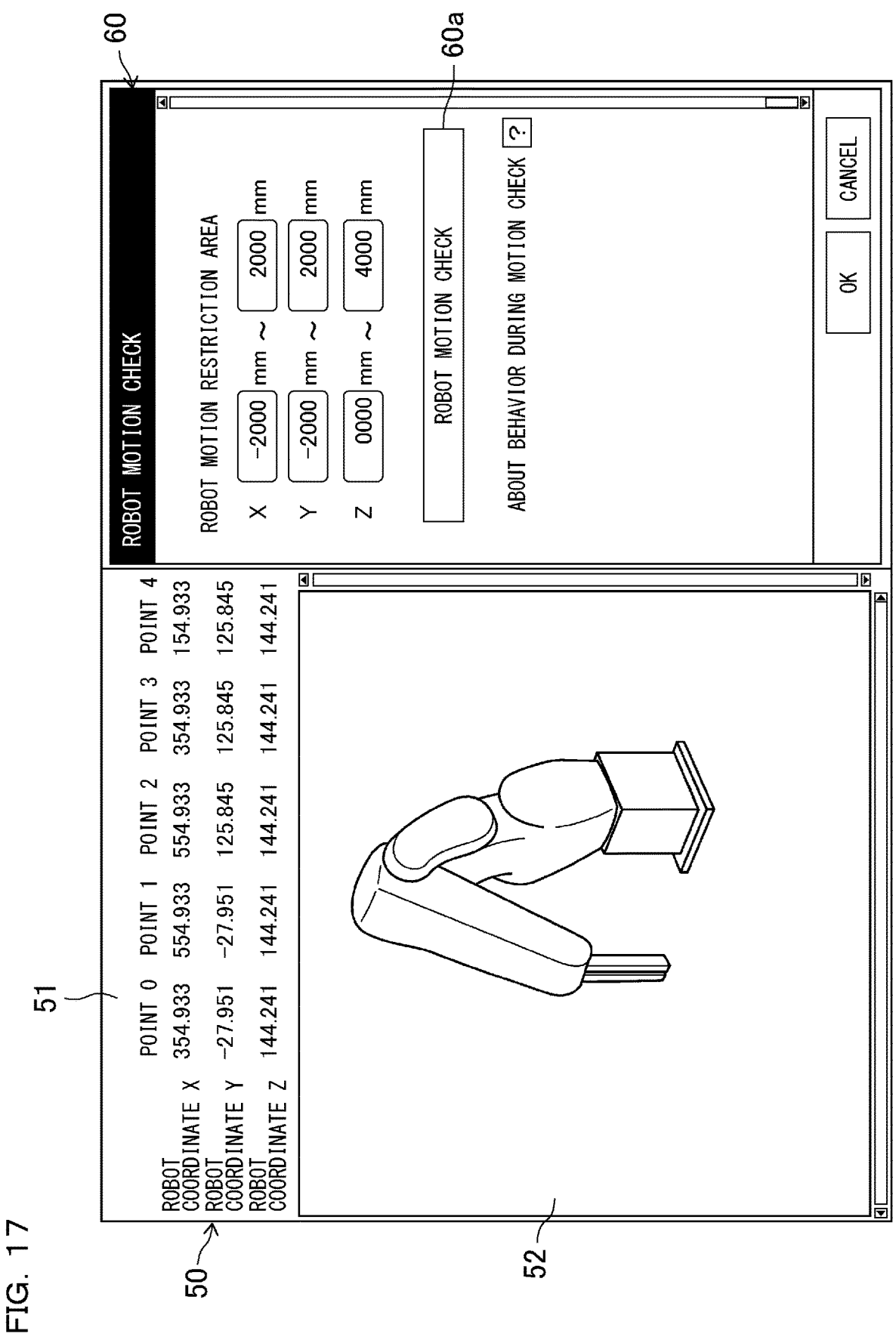
FIG. 17 is a diagram showing an example of a robot motion check window.

Upon completion of the setting of the motion restriction area, the user operates the robot motion check button 60a provided in the robot motion check window 60 shown in FIG. 17. Upon detection of the operation of the robot motion check button 60a, the calibration execution part 303 checks each check item, such as whether the robot RBT interferes, with consideration given to the motion restriction area, with another object within the range of the motion restriction area, whether the detection tool is behind the robot RBT, and whether the detection tool is within the capture range of the sensor 2, based on the approximate positional relation between the sensor 2 and the robot RBT determined by the tool center calculation in step SD3. When no movement restriction area is set, the above check items for 27 points determined based on the set movement interval are checked.

Figure 18:
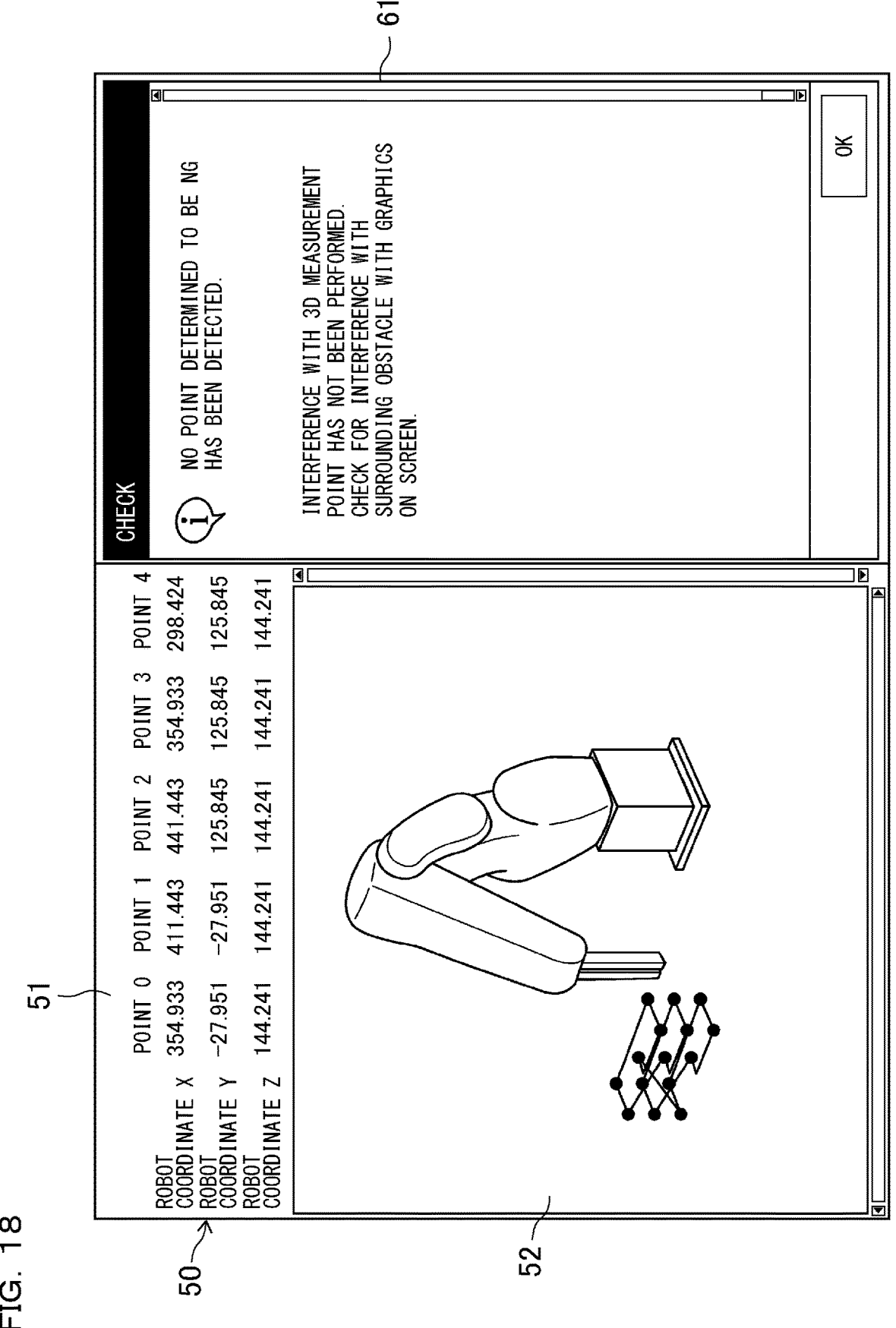
FIG. 18 is a diagram showing an example of a user interface screen displayed when there is no problem after the motion check.

Upon completion of the motion check, the process proceeds to step SD6 shown in FIG. 11 in which a determination as to whether there is a problem in the motion is made. When there is no problem in all of the above check items, it is determined to be YES in step SD6, and the process proceeds to step SD7. In step SD7, a check result display window 61 is displayed as shown in FIG. 18, and the user is notified via the window 61 that there is no problem. Further, in the robot model display area 52, points are displayed together with the robot model. In the robot model display area 52, information on a three-dimensional point cloud captured by the sensor 2 such as the workpiece WK and the container BX can be displayed.

Figure 19:
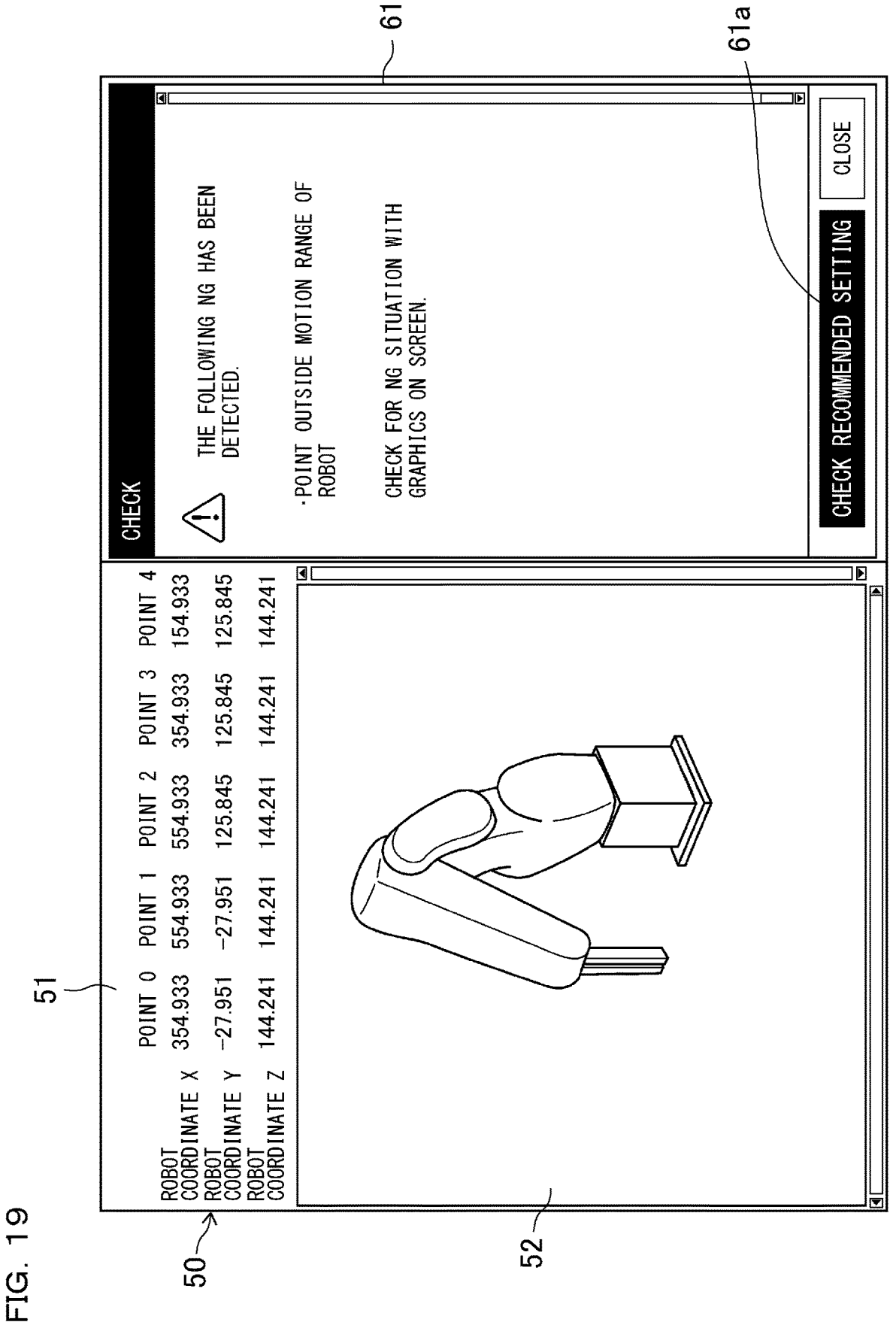
FIG. 19 is a diagram showing an example of a user interface screen displayed when there is a problem after the motion check.

On the other hand, when there is a problem in any one of the above check items, it is determined to be NO in step SD6, and the process proceeds to step SD8. In step SD8, the check result display window 61 is displayed as shown in FIG. 19, and the use is notified via the window 61 that there is a problem. In this case as well, the information on the three-dimensional point cloud captured by the sensor 2 can be displayed in the robot model display area 52. Further, a point having a problem can be displayed in the robot model display area 52 in a form different from a point having no problem. In this case, it is possible to use a display form in which the point having a problem is highlighted.

Further, in step SD9, the calibration execution part 303 automatically calculates the position coordinates of the points so as to avoid the point having a problem. When the user operates a button 61a of "check recommended setting" in the window 61 shown in FIG. 19, this calculation result is displayed in the robot model display area 52 and thus can be checked.

Then, the process proceeds to step SD10 of the flowchart shown in FIG. 11. That is, when the user operates an execute button 58d shown in FIG. 15, the calibration in step SD10 is executed, and in this calibration, an expression for converting between the actual position coordinates of the hand HND and the position coordinates on the image displayed by the image processing device 300 for the position coordinates of the plurality of points is calculated. The method for converting coordinates is not limited to a specific method, and the conversion may be performed by an affine transformation, for example.

[Expression 1]

$$\begin{pmatrix} x' \\ y' \\ 1 \end{pmatrix} = \begin{pmatrix} a & b & c \\ d & e & f \\ 0 & 0 & 1 \end{pmatrix} \times \begin{pmatrix} x \\ y \\ 1 \end{pmatrix}$$ (Expression 1)

$$x' = ax + by + c$$
$$y' = dx + ey + f$$

As shown in (Expression 1), based on the actual position coordinates (x', y') of the hand HND and the position coordinates (x, y) on the image displayed by the image processing device 300, coefficients a, b, c, d, e, f of the conversion expression having six degrees of freedom are obtained. When the number of corresponding position coordinates is greater than six, the least squares method may be used.

Upon detection of the operation of the execute button 58d shown in FIG. 15, the calibration execution part 303 sends, to the robot controller 6, a move command including a move instruction and position coordinates of a destination for the robot RBT so as to cause the detected workpiece to pass through each point. The robot controller 6 moves the hand HND to the position coordinates included in the move command.

The calibration execution part 303 acquires, from the robot controller 6, a coordinate value (x', y') corresponding to each set of position coordinates of the hand HND that has moved in accordance with the move command. It is possible to adjust a positional deviation between the position coordinates of the moved hand HND and the position coordinates on the captured image of the detection tool.

Note that the coordinate value (x', y') acquired by the calibration execution part 303 is a coordinate value acquired from the robot controller 6 at each position where the hand HND has moved in accordance with the move command from the image processing device 300; however, movement target coordinates of the hand HND set in advance by the image processing device 300 may be used as the coordinate value.

The calibration execution part 303 controls the operation of the sensor 2 so as to capture an image of the detection tool at each destination to which the hand HND has moved. Thus, performing control to capture an image of an area corresponding to the position coordinates of the hand HND that is the destination acquired from the robot controller 6 allows the coordinate value (x, y) corresponding to the actual position coordinates of the detection tool to be detected based on the captured image.

The calibration execution part 303 detects the coordinate value (x, y) corresponding to the position coordinates of the detection tool based on the image of the detection tool captured at each destination, and calculates a conversion rule between the two sets of coordinates based on the plurality of coordinate values (x', y') thus acquired and the plurality of coordinate values (x, y) thus detected. Specifically, the coordinate value is substituted into the above (Expression 1) to obtain the coefficients a, b, c, d, e, f.

Figure 16:
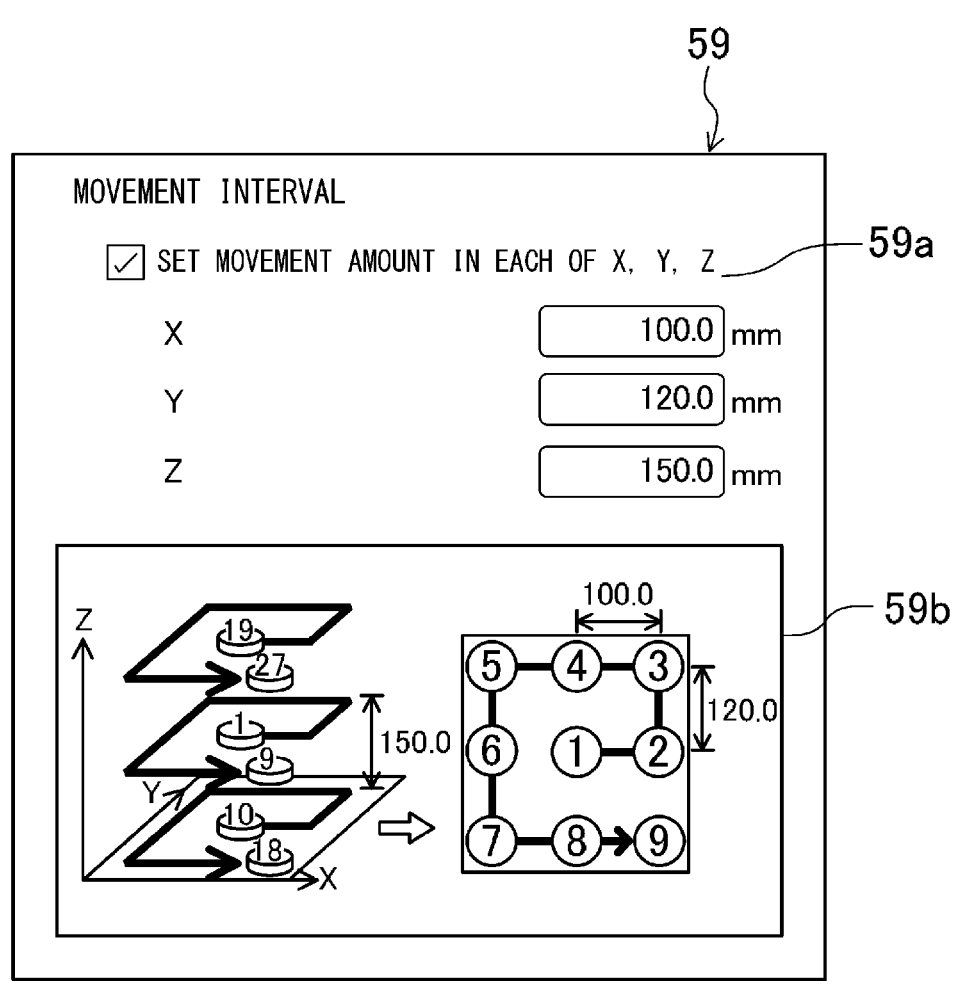
FIG. 16 is a diagram showing an example of a movement interval setting window.

A movement path of the detection tool is not limited to a specific path, but may be an order as displayed in the graphics display area 59b shown in FIG. 16, for example. That is, the detection tool can be moved to pass through a plurality of points in a plane having the same height and then moved to pass through a plurality of points in a plane having a different height in the same manner.

As described above, the calibration execution step in step SA2 of the flowchart shown in FIG. 8 is done. The calibration data may be stored in the storage part 320 or the like.

Figure 20:
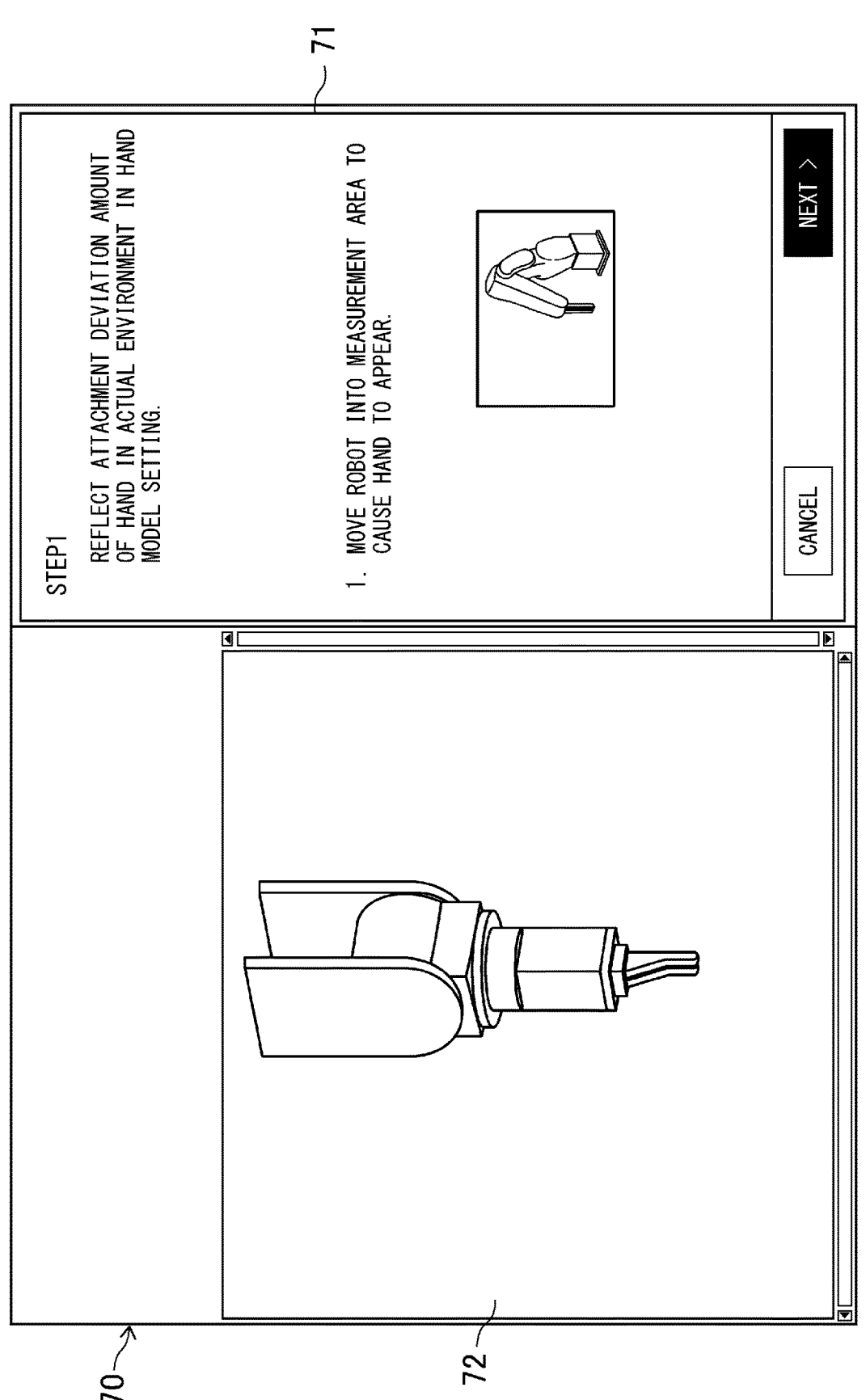
FIG. 20 is a diagram showing an example of a user interface screen displayed when an image of the hand is captured.

(Step of capturing image of hand) In step SA3 of the flowchart shown in FIG. 8, the sensor 2 captures an image of the hand HND attached to the flange FLG of the robot RBT. For example, as shown in FIG. 4, with the hand HND attached to the flange FLG, the robot RBT is controlled to cause the flange FLG and the hand HND to be located within the capture range of the sensor 2. Specifically, the image processing device 300 displays a hand image capturing window 71 on a user interface screen 70 as shown in FIG. 20. In the hand image capturing window 71, a description of the movement of the robot RBT to cause the hand HND to be located within the capture range of the sensor 2 is displayed. Then, when the sensor 2 captures an image, an image including the flange FLG and the hand HND is acquired. The image thus acquired can be temporarily stored in the storage part 320 and can be displayed in an image display area 72 provided on the user interface screen 70.

(Step of acquiring coordinates of robot when image is captured) In step SA4 of the flowchart shown in FIG. 8, the acquisition part 304 shown in FIG. 6 acquires the coordinates of the robot RBT when the sensor 2 captures an image of the hand HND. The acquisition part 304 may acquire the coordinates of the robot RBT only when the image of the hand HND is captured by the sensor 2, or alternatively, may continuously acquire the current position of the robot RBT even when the image of the hand HND is not captured by the sensor 2, and acquire, from the position information, the coordinates of the robot RBT when the image of the hand HND is captured by the sensor 2. The coordinates thus acquired of the robot RBT can be stored in the storage part 320.

(Step of reading hand model) In step SA5 of the flowchart shown in FIG. 8, first, the hand model registered in step SC1 of the flowchart shown in FIG. 10 is read. The hand model thus read is registered as a search model of the hand HND. This step may be executed only in response to a hand model registration request, and may be skipped when, for example, the previously registered data is used as it is.

(Step of determining position and orientation of hand) In step SA6 of the flowchart shown in FIG. 8, the determination part 305 shown in FIG. 6 determines the position and orientation of the hand HND attached to the flange FLG of the robot. First, the determination part 305 reads the hand model registered by the registration part 302 and further reads the image including the hand HND captured by the sensor 2. The determination part 305 reads the hand model and the image including the hand HND, and then performs pattern-matching on the hand model and the image including the hand HND. The pattern matching method is also referred to as, for example, three-dimensional matching or three-dimensional search.

The pattern matching allows a determination as to whether the hand model exists in the image including the actual hand HND actually attached to the flange FLG to be made, and when the actual hand HND is included in the image, it is possible to detect the hand HND to determine the position and orientation of the hand HND.

(Step of calculating hand attachment position) In step SA7 of the flowchart shown in FIG. 8, the calculation part 306 shown in FIG. 6 calculates an attachment position of the hand HND with respect to the flange FLG based on the coordinates of the robot RBT when an image is captured acquired by the acquisition part 304 and the position and orientation of the hand HND determined by the determination part 305. At this time, six variables (X, Y, Z, Rx, Ry, Rz) in the camera coordinate system can be calculated as variables that determine the position and orientation of the hand HND.

Specifically, first, the six variables related to the position and orientation of the hand HND in the camera coordinate system are converted into the six variables related to the position and orientation of the hand HND in the robot coordinate system using the robot-camera calibration data acquired in step SA2. This makes the coordinates of the robot RBT when an image is captured known.

When the coordinates of the robot RBT when an image is captured are known, it is possible to know where the flange FLG of the robot RBT is located when an image is captured. That is, the coordinates of the flange FLG can be acquired as the coordinates of the robot RBT. A difference between the position and orientation of the origin of the flange FLG expected from the coordinates of the robot RBT and the position and orientation of the hand HND in the robot coordinate system is obtained. This difference serves as information showing the position and orientation of the hand HND based on the flange coordinates. This difference can be set as an error in attachment of the hand HND actually attached to the flange FLG. The error in attachment of the hand HND is an error with respect to the design value. That is, when the hand HND is attached to the flange FLG with a deviation from the design value, the deviation can be acquired as, for example, a specific numerical value or the like. The calculation part 306 can convert the position and orientation of the hand HND captured by the sensor 2 into the coordinates in the flange coordinate system by using the calibration data. The error in attachment position of the hand HND attached to the flange FLG can be calculated from the origin position in the flange coordinate system.

Further, the origin position of the hand HND can be calculated from the position and orientation of the hand HND determined by the determination part 305. The origin position of the hand HND can be, for example, the origin position of the three-dimensional CAD data of the hand HND. Further, a position to which the hand HND needs to be attached is defined by the design value, and this position information can be acquired in advance. The difference between the calculated origin position of the hand HND and the coordinates of the robot that indicates the predetermined position to which the hand HND needs to be attached is obtained, and the attachment position of the hand HND attached to the flange FLG can be calculated in accordance with the difference thus obtained.

(Display of error) The calculation part 306 calculates the error for each position and orientation variable of the hand HND. Since there are six variables (X, Y, Z, Rx, Ry, Rz) as described above, the calibration execution part 303 can acquire the respective errors in X, Y, Z, Rx, Ry, Rz.

Figure 21:
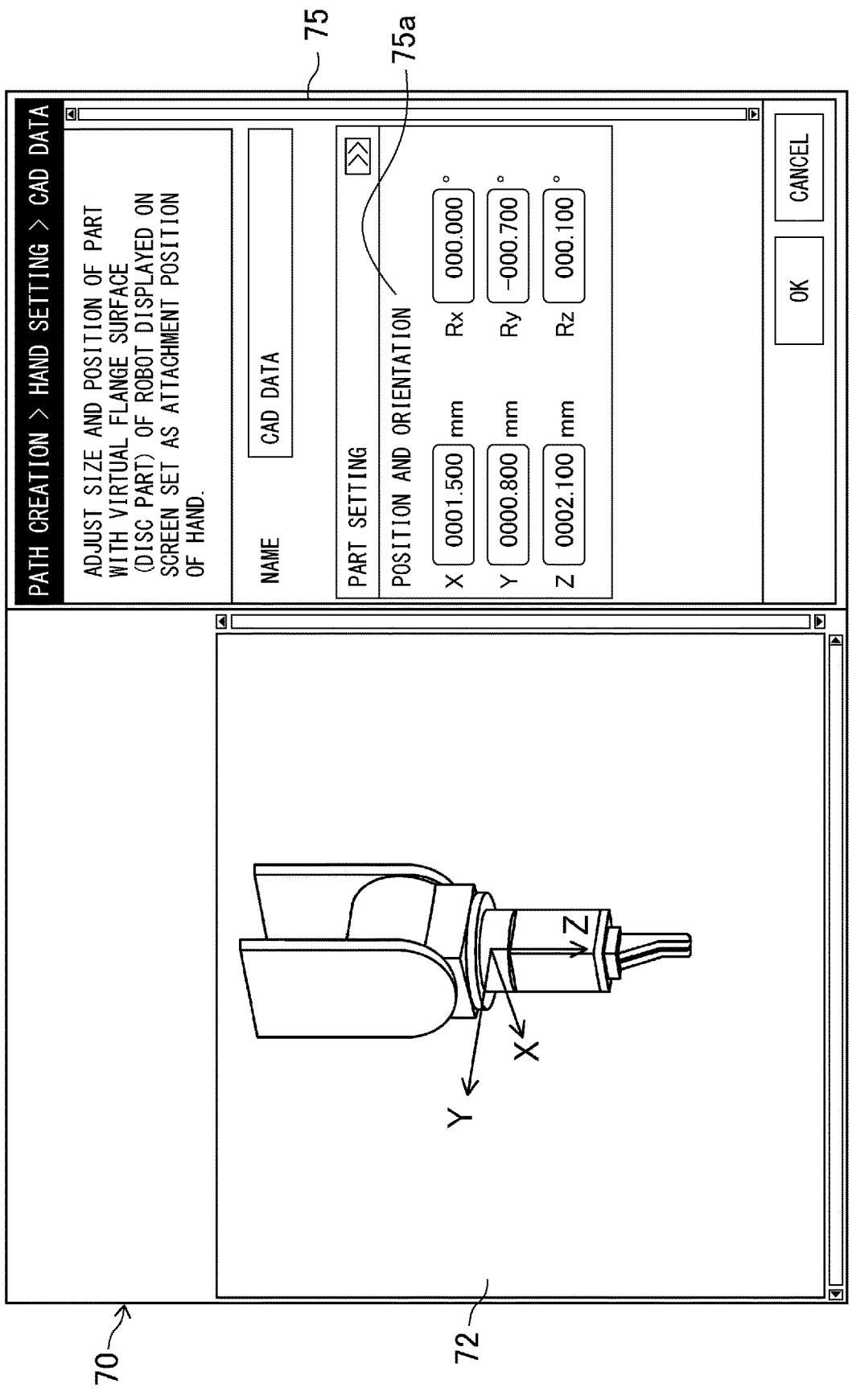
FIG. 21 is a diagram showing an example of an error display window where errors in six variables are individually displayed.

When acquiring the six errors, the calibration execution part 303 displays an error display window 75 as shown in FIG. 21 on the user interface screen 70. The error display window 75 includes an error display area 75a where the errors in X, Y, Z, Rx, Ry, Rz are displayed. X, Y, Z are expressed in mm, and Rx, Ry, Rz are expressed in degrees (°). The six variables can be arranged and displayed vertically or horizontally, for example. That is, since the image processing device 300 includes the display part 3 that displays the error calculated by the calculation part 306 for each variable, the user can grasp the error for each variable.

(Other embodiment) According to the above-described embodiment, the shape of the hand HND is registered by the registration part 302, but the position of the hand HND relative to the robot RBT needs not be registered, and the position of the hand HND is measured based on the image captured by the sensor 2. An embodiment other than the present embodiment also falls within the scope of the present invention That is, the other embodiment is an example where the shape of the hand HND is registered, and the position of the hand HND relative to the robot RBT is also registered. When the hand HND is attached to the robot RBT as designed, the image processing device 300 can grasp in advance the position and orientation of the hand HND to be detected. Only a difference between the position and orientation, and the actually detected position and orientation needs to be reflected.

Figure 22:
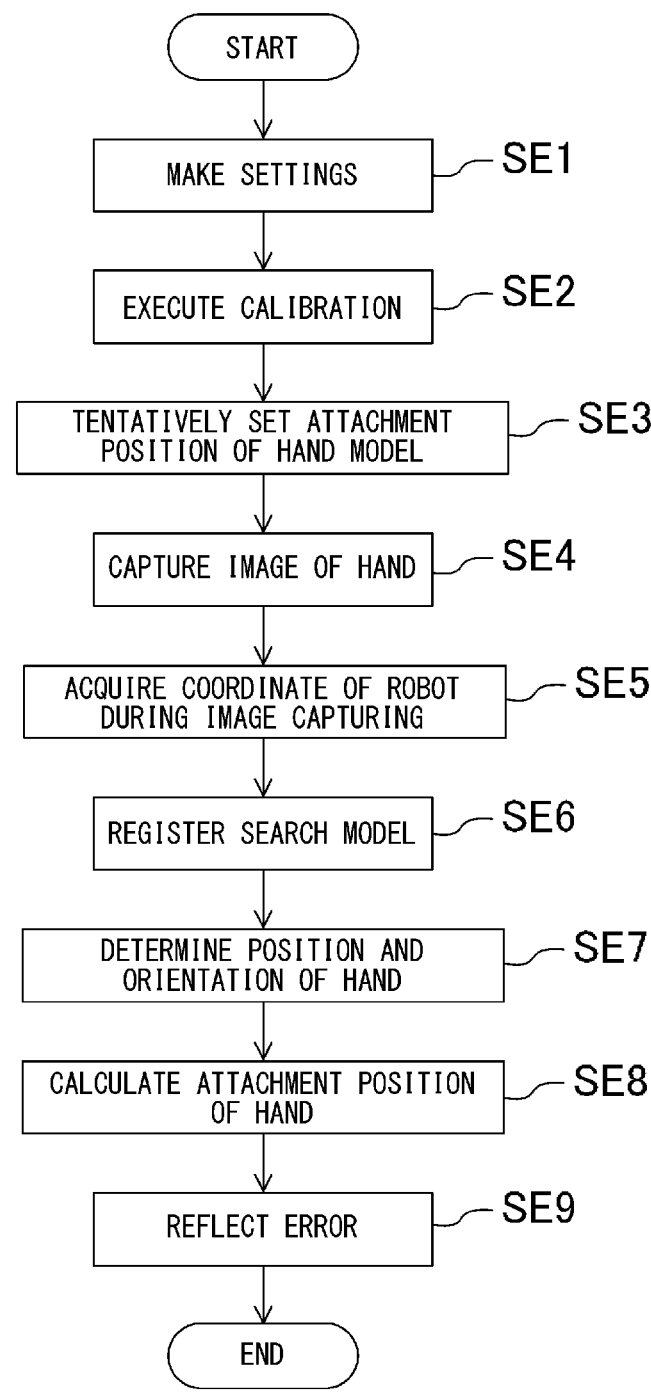
FIG. 22 is a diagram corresponding to FIG. 8 according to another embodiment.

A procedure according to the other embodiment is shown in the flowchart of FIG. 22. In step SE1, a setting step is executed in the same manner as step SA1 of the flowchart shown in FIG. 8. At this time, the registration part 302 also registers the position of the hand HND relative to the robot RBT. The following step SE2 is the same as step SA2 of the flowchart shown in FIG. 8.

In step SE3, the hand model is read, and the attachment position of the hand model to the robot RBT is tentatively set. Subsequent steps SE4, SE5, SE6, SE7 are the same as steps SA3, SA4, SA5, SA6 of the flowchart shown in FIG. 8.

In step SE8, the attachment position of the hand HND to the robot RBT is calculated based on the coordinates of the robot when an image is captured acquired in step SE5 and the position and orientation of the hand HND determined in step SE7. Then, in step SE9, an error with respect to the currently registered attachment position is reflected in the setting.

Figure 23:
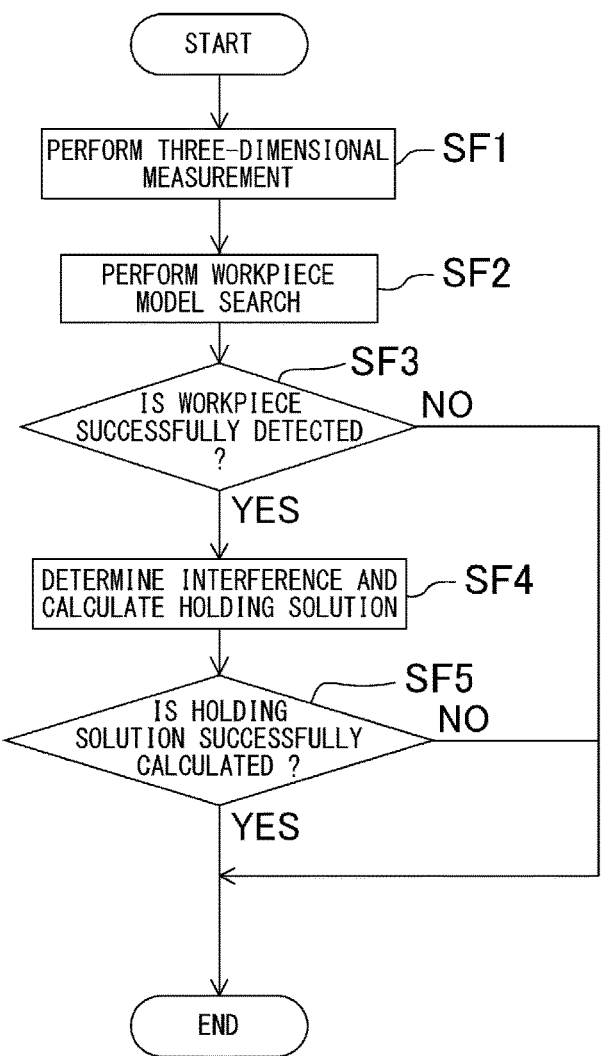
FIG. 23 is a flowchart showing an example of a procedure of interference determination.

(Interference determination) FIG. 23 is a flowchart showing an example of a procedure of interference determination. The interference determination is performed after the process shown in the flowchart of FIG. 8 and the process shown in the flowchart of FIG. 22 are terminated.

In step SF1 of the flowchart shown in FIG. 23, the sensor 2 performs a three-dimensional measurement on the work space where the workpiece WK exists, as described above. The three-dimensional measurement causes height image data representing the height of each part of the area including the container BX and the workpiece WK to be created. A height image can be obtained from the height image data. The height image is an image having height information and is also referred to as a distance image, a three-dimensional image, or the like.

Then, in step SF2, the workpiece WK in the work space is searched for based on the height image that is a result of the three-dimensional measurement acquired in step SF1 and the workpiece model input by the workpiece model input part 301. This is performed by the search part 307 shown in FIG. 6.

Specifically, first, the search part 307 reads the workpiece model stored in the storage part 320. The search part 307 uses the workpiece model thus read to perform a three-dimensional search on the height image to identify the orientation and position of each workpiece model. That is, the height image is searched for the position and orientation (X, Y, Z, Rx, Ry, Rz) where characteristic points of the workpiece model most closely match. Rx, Ry, Rz denote a rotation angle about the X axis, a rotation angle about the Y axis, and a rotation angle about the Z axis, respectively, and although various methods for representing such rotation angles have been proposed, the Z-Y-X Euler angles may be used herein. Further, the number of matching positions and orientations needs not be one for each search model, and a plurality of matching positions and orientations may be detected.

When a result of searching for whether the workpiece WK exists in the height image made by the search part 307 shows that no workpiece WK is detected in the height image, it is determined to be NO in step SF3 shown in FIG. 23, and the process is brought to an end.

On the other hand, when a result of the three-dimensional search in step SF2 shows that the workpiece WK is successfully detected in the height image, the process proceeds to step SF4 in which the interference is determined, and the holding solution is calculated. In step SF4, the search part 307 first searches for the holding position of the workpiece WK. When no holding position is detected, it means that the holding solution cannot be calculated; therefore, it is determined to be NO in the next step SF5, and the process is brought to an end, or an attempt is made to calculate the holding solution for another workpiece WK.

When the holding position is successfully detected in step SF4, the interference determination part 308 shown in FIG. 6 determines whether or not the hand HND interferes with a surrounding object when the robot RBT performs the picking motion. In other words, before the robot RBT performs the picking motion, the determination as to whether or not the hand HND interferes with a surrounding object allows the orientation of the hand HND that avoids interference with the surrounding object to be determined. Examples of the surrounding object include the container BX, the workpiece WK other than an object to be held, and other members that hinder the picking motion.

In the interference determination step in step SF4, a determination is made as to whether or not the three-dimensional point cloud represented by pixel data of each point of the height image interferes with the hand model. Prior to the interference determination, the position where the hand HND needs to be disposed and the orientation of the hand HND relative to the workpiece WK detected by the three-dimensional search are calculated based on the position of the workpiece WK and the holding orientation of the registered workpiece model. At the position thus calculated, a determination is made, using the hand model, as to whether or not the hand HND interferes with a surrounding object.

In this interference determination, it is possible to determine whether or not the three-dimensional point cloud interferes with a section model by using the section model of the hand model. For example, when all the three-dimensional points are away from the section model, it is determined that the three-dimensional point cloud causes no interference, that is, the height image and the hand model do not interfere with each other, while when at least one of the three-dimensional points is located inside the section model, or at least one of the three-dimensional points is in contact with an edge, it is determined that the three-dimensional point cloud causes interference, that is, the height image and the hand model HND interfere with each other. When there is no interference, it shows that the holding solution has been successfully calculated for this workpiece WK, it is determined to be YES in step SF5, and the process is brought to an end. On the other hand, when there is interference between the three-dimensional point cloud and the hand model, it shows that the holding solution has failed to be calculated for this workpiece WK, it is determined to be NO in the next step SF5, and the process is brought to an end, or an attempt is made to calculate the holding solution for another workpiece WK.

Further, even when the holding position is the same, it may be possible to avoid interference with the surrounding object by changing at least either the position or orientation of the hand HND; therefore, when it is determined that there is interference, the interference determination part 308 can perform the interference determination on a case where either the position or orientation of the hand HND is changed, and the same holding position is held. Accordingly, the interference determination part 308 can determine the position and orientation of the hand HND that avoids interference.

In the above procedure, when the holding solution is obtained for any of the workpieces WK, the process of examining the possible holding position is terminated, and the process of holding the workpiece WK at the possible holding position corresponding to the obtained holding solution is performed. However, the present invention is not limited to this method, and for example, after obtaining all possible holding positions that can be held for each workpiece WK, the user may determine which possible holding position to select. Further, with attention given to information on heights at which the workpieces WK are placed, a workpiece WK placed at a high position, in other words, a workpiece WK located at the highest position among a group of the workpieces WK stowed in bulk, can be selected as the possible holding position.

Figure 24:
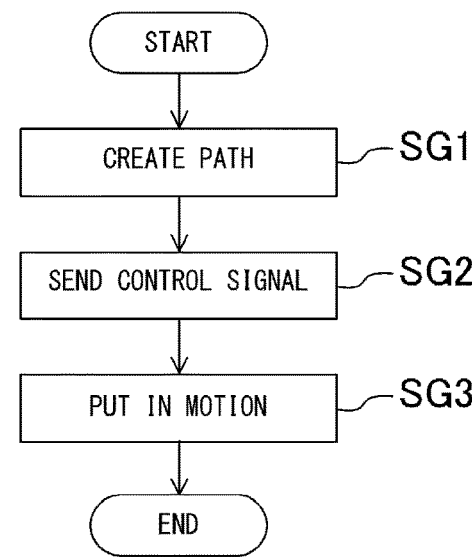
FIG. 24 is a flowchart showing an example of a procedure for putting the robot into motion after the interference determination.

(Flow of path creation, control signal output, robot motion) When the interference determination shown in the flowchart of FIG. 23 is finished, and it is determined that the hand HND does not interfere with any surrounding object, the process proceeds to step SG1 of the flowchart shown in FIG. 24. In step SG1, the path creation part 309 shown in FIG. 6 creates a path for the hand HND.

Specifically, the path creation part 309 determines, based on a result of the determination made by the interference determination part 308, a plurality of via points that allow the hand HND to avoid interference with the surrounding object, and creates a path that connects the via points, and the path extends from the current position of the robot hand HND to the holding position via the approach position and extends from the holding position to the placing position. Examples of the path created in step SG1 may include a path that passes through no via point. Further, the path created by the path creation part 309 may be a path that connects the via points in the shortest distance so as to be made shortest from the current position of the robot hand HND to the placing position.

In step SG2, the output part 310 outputs, to the robot controller 6, the coordinates of the holding execution position, placing position, via point, and the like. The robot controller 6 receives the coordinates of the holding execution position, placing position, via point, and the like output from the output part 310, creates a control signal, and outputs the control signal thus created to the robot RBT. Subsequently, in step SG3, the robot RBT operates in accordance with the control signal to convey the workpiece WK through the predetermined path.

Points output by the output part 310 to the robot controller 6 include a fixed via point (a fixed point set by the user, and the approach position, holding execution position, and retreat position automatically calculated by the path creation part 23) and an intermediate via point for path creation (a point automatically calculated by the path creation part 309). The via point to be output to the robot controller 6 may also be output in the form of either each joint value of the arm ARM or X, Y, Z, Rx, Ry, Rz.

If the path creation part 309 only outputs the approach position, the holding position, or the like, it is necessary to make the program on the robot controller 6 side to avoid an obstacle such as the container BX, which makes the program complicated and makes it difficult for the user to customize the program. On the other hand, as in the present example, causing the path creation part 309 to plan the entire motion of the robot hand HND and outputting some intermediate via points to the robot controller 6 has an advantage that the programming on the robot controller 6 side can be simplified.

However, since the number of via points through which the robot hand HND needs to pass is not determined unless the motion path of the robot RBT is actually created, via points where the robot controller 6 needs to cause the robot hand HND to perform the holding motion or the placing motion cannot be identified.

Further, when the user increases or decreases the number of fixed via points, the number of via points output by the image processing device 300 and the number of via points expected by the program on the robot controller 6 side become different from each other unless reprogramming is made on the robot controller 6 side. Therefore, each time the user increases or decreases the number of fixed via points, it takes time and effort to make reprogramming.

Further, each fixed via point has a unique attribute such as "point where the holding motion needs to be performed" or "point where the placing motion needs to be performed". For example, when the via point is changed on the image processing device 300 side, unless the robot controller 6 follows the change, the holding motion or the like may be performed at an unexpected position, which also makes the program creation difficult.

In order to solve such a problem, in the present example, the path creation part 309 is configured to not only determine, based on a result of the measurement made by the sensor 2 and the holding information, the holding position, held by the robot hand HND, of the workpiece WK placed in the work space, but also determine the coordinates of the fixed via point having any single attribute among the approach position of the robot hand HND for holding the holding position thus determined, the holding position, and the retreat position after holding. Then, the output part 310 outputs, to the robot controller 6 connected to the robot RBT, the coordinates of the fixed via point determined by the path creation part 309 and information containing the attribute information showing the attribute of the fixed via point.

Further, the output part 310 can output, to the robot controller 6, various pieces of information such as a flag indicating whether a trigger can be executed at a specific location, the number of set path sections, a loop behavior control flag of the program (control to cause a path that starts from point A to start from another point B for the second cycle), an attribute of the set sections (for example, the holding section), a robot motion speed in each section, whether a path different from the set normal path is selected, a parameter indicating the optimum trigger position, and the number of via points in each section.

Note that the model of the robot RBT can be input to the image processing device 300. For example, when the model of the robot RBT is input, connection with the robot controller 6 that controls the robot RBT thus input becomes possible, and various pieces of data of the input robot RBT (the motion range of the arm ARM, and the like) can also be automatically read. Further, the communication system can be automatically changed to a system adapted to the manufacturer of the robot RBT. That is, for example, the information on a main robot RBT manufactured by a main manufacturer of the robot RBT and the communication system are prestored in the storage part 320 or the like so as to be read and used by input operation made by the user, which eliminates the need of individually inputting the information on the robot RBT for setting.

Figure 25:
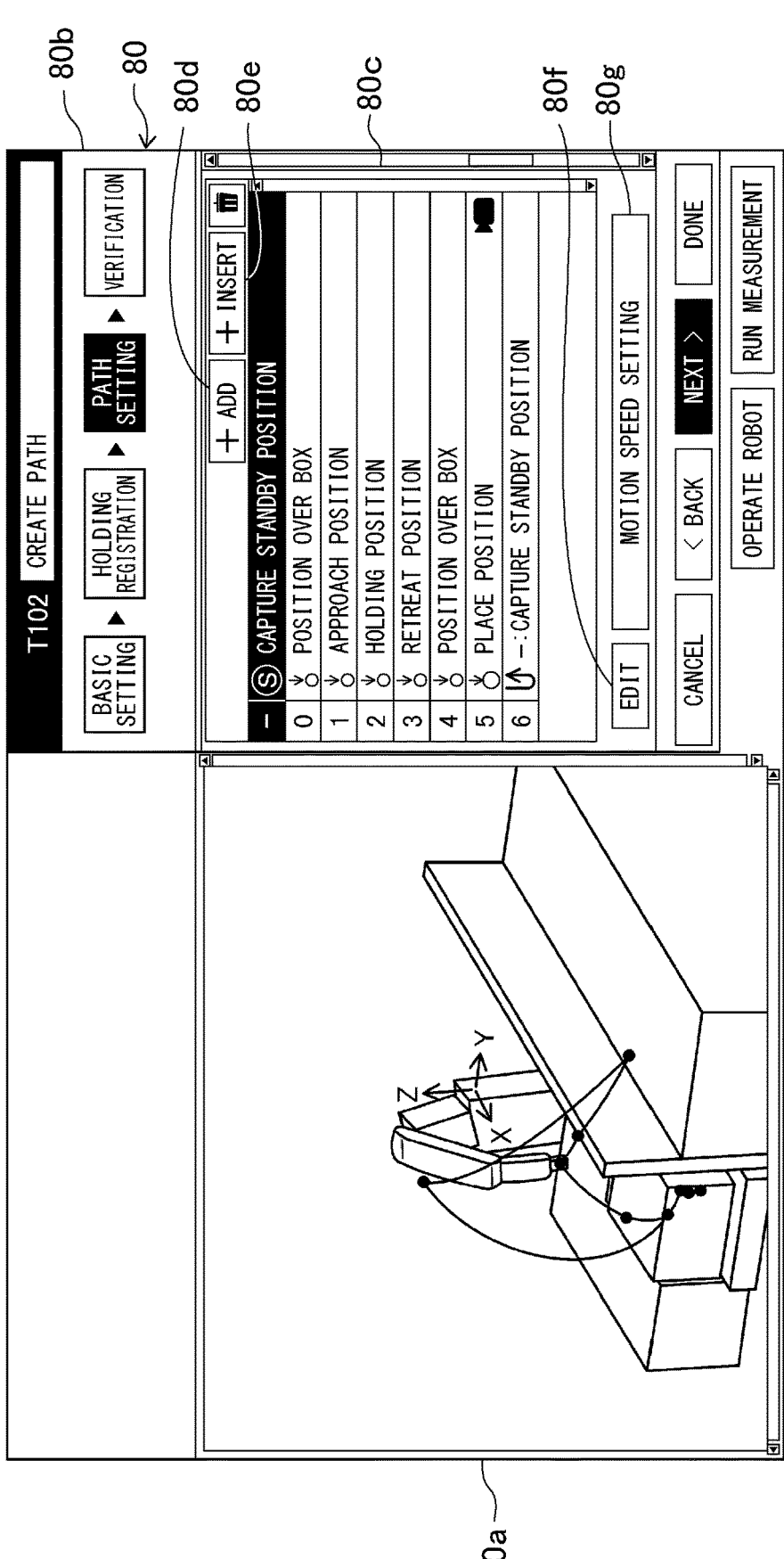
FIG. 25 is a diagram showing an example of a path setting user interface.

(Details of user setting when creating path) FIG. 25 is a diagram showing an example of a path setting user interface 80. The path setting user interface 80 is an edit screen that allows individual editing of the plurality of via points and is created by an edit creation part 312 shown in FIG. 6 and displayed on the display part 3. The path setting user interface 80 includes a robot display area 80a where a three-dimensional image showing the selected robot RBT is displayed, a selection area 80b where a selection is made from various setting operations, and an order display area 80c where a motion order of the robot hand HND is displayed. In the order display area 80c, fixed via points such as the position over the box (container), the approach position, the holding execution position, the retreat position, the place position, and the capture standby position, and intermediate via points automatically calculated by the path creation part 309 are displayed together with their respective names. Names such as "approach position", "retreat position", "holding position", and "designated position" that are easy for the user to understand may be employed. The via points displayed in the order display area 80c are displayed in the robot display area 80a in a state that makes the relative positional relation with the robot RBT identifiable.

The order display area 80c is configured to display a plurality of fixed via points when the plurality of fixed via points are determined and to display a passing order of the fixed via points. That is, in the order display area 80c, the "capture standby position" that is a position where the robot hand HND starts to move is placed at the top, and a plurality of via points are listed below the "start position" in the passing order. A display mode of the fixed via points and intermediate via points (hereinafter, collectively referred to as via points) is not limited to the mode shown in FIG. 10, and may be, for example, a mode where the fixed via points and intermediate via points are arranged in the order in a left-right direction. A curve or a straight line that complements a section between the fixed via points is a set of intermediate via points, and is therefore synonymous with the intermediate via point.

Figure 26:
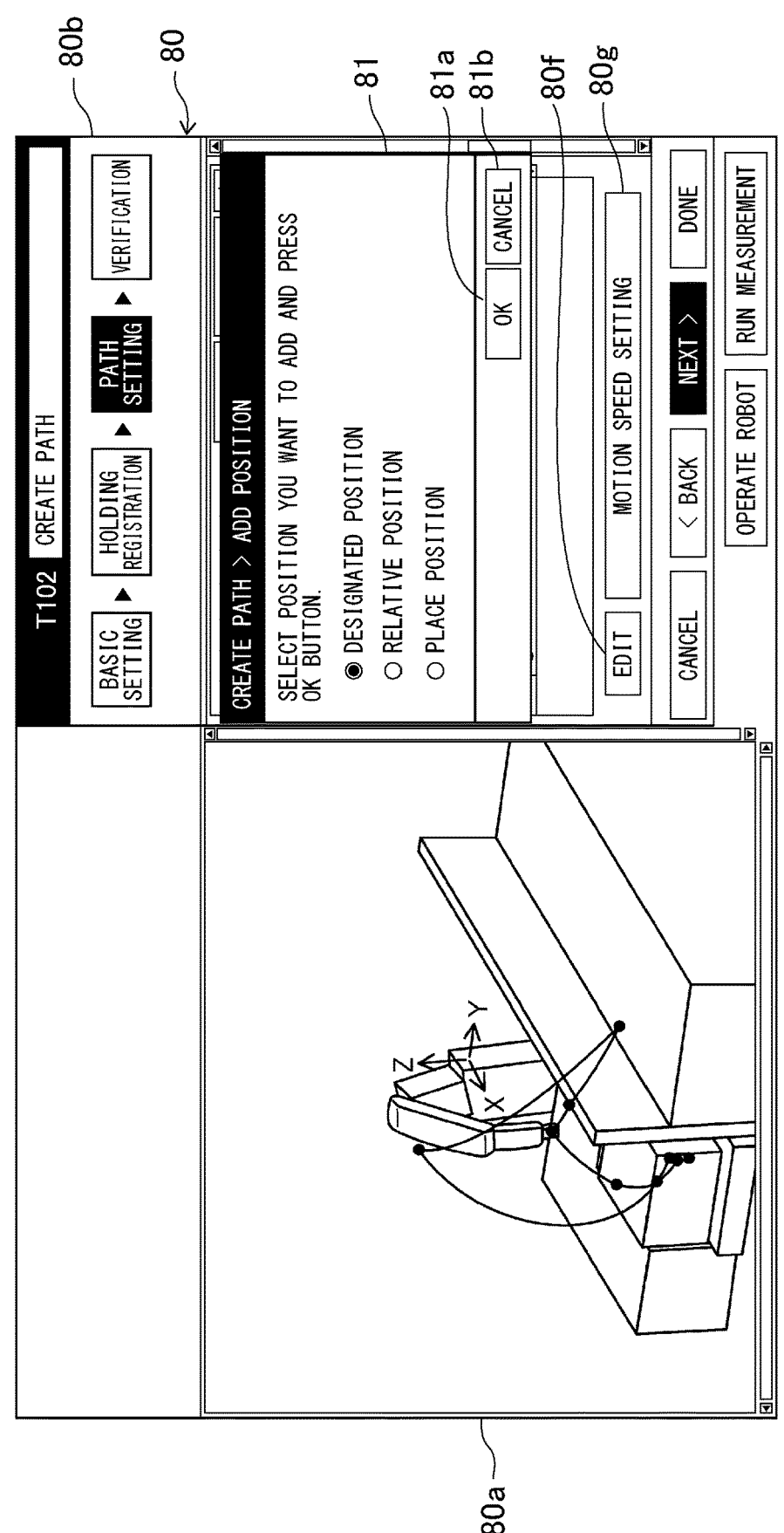
FIG. 26 is a diagram showing an example of an attribute information input window.

The order display area 80c includes an add button 80d to be operated to add a via point and an insert button 80e. The order display area 80c further includes an edit button 80f to be operated to edit a via point and a motion speed setting button 80g to be operated to set a motion speed. When the user operates the add button 80d or the insert button 80e, a via point can be added to or inserted into a desired position. When the via point is added, as shown in FIG. 26, the path creation part 309 creates an attribute information input window 81 where the attribute information on the via point is input and superimposes the attribute information input window 81 on the order display area 80c. This attribute information input window 81 allows individual editing of a plurality of fixed via points. Note that an unnecessary fixed via point can be deleted.

The attribute information includes the approach position, holding execution position, retreat position after holding, place position, relative position, and the like of the robot hand HND. In the attribute information input window 81, any one of the pieces of attribute information is displayed in a selectable manner. That is, one fixed via point can be associated with one piece of attribute information. An input part used to input the attribute information on the via point may be made up of the control panel 4 capable of performing an input operation on the attribute information input window 81.

When an OK button 81a of the attribute information input window 81 is pressed, the selection is applied, and the fixed via point and the attribute information are stored in the storage part 320 in association with each other, and when a cancel button 81b is pressed, the selection is discarded. When either the OK button 81a or the cancel button 81b is pressed, the attribute information input window 81 is closed.

Figure 27:
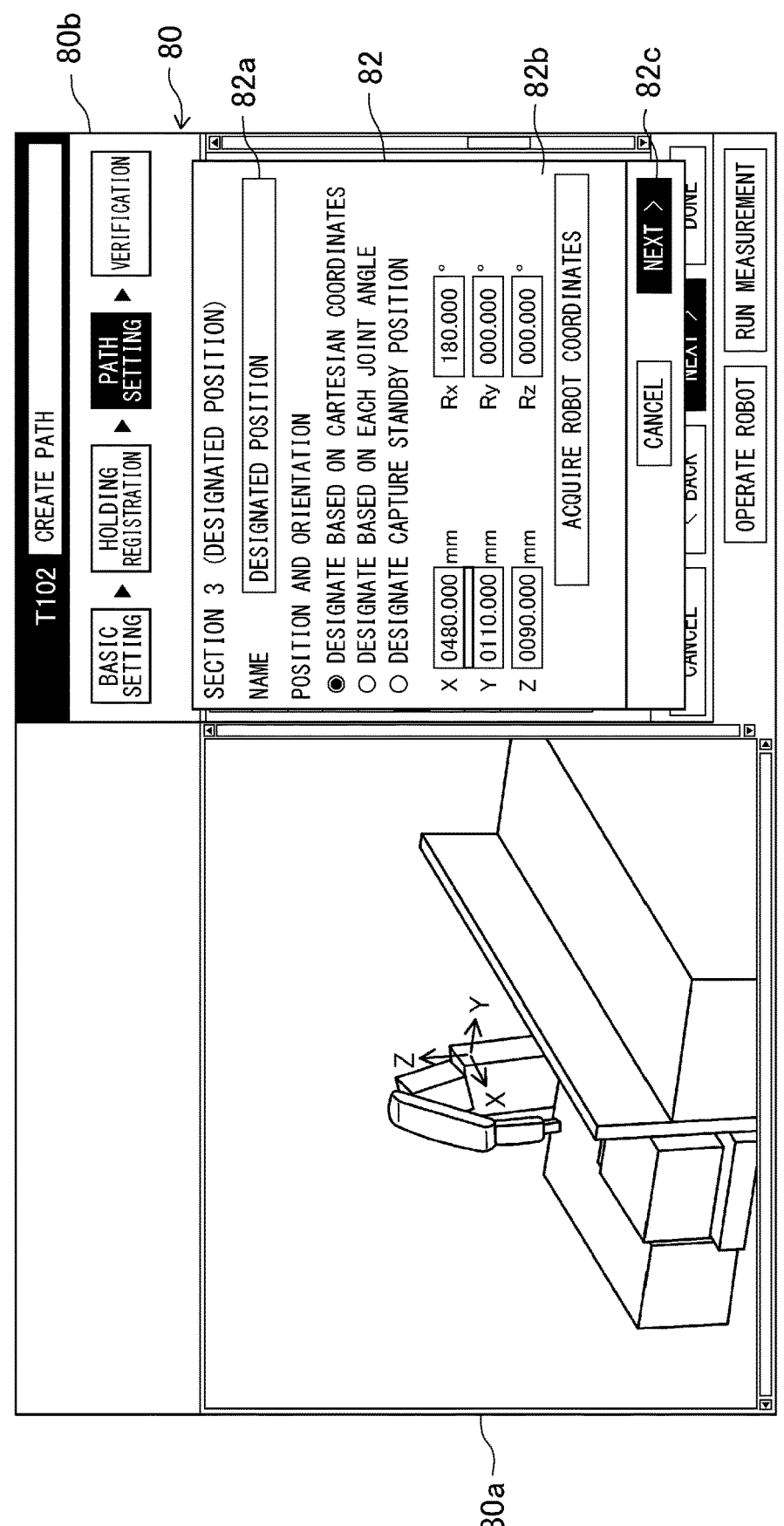
FIG. 27 is a diagram showing an example of a fixed via point position setting window.

When the edit button 80f shown in FIG. 25 is pressed, the path creation part 309 creates a position setting window 82 shown in FIG. 27 and superimposes the position setting window 82 on the path setting user interface 80. The position setting window 82 includes a name display area 82a where a name of a fixed via point to be edited is displayed, and a position and orientation designation area 82b where the position of the fixed via point or the orientation of the robot hand HND at the fixed via point is designated. A name displayed in the name display area 82a can be changed. Further, in the position and orientation designation area 82b, it is possible to select whether to designate the position or orientation in the form of orthogonal coordinates or each joint angle and also to designate a capture standby position. The capture standby position is a position where the robot hand HND can be retreated to a position that falls outside a visual field range of the sensor 2 when the sensor 2 captures an image of the workpiece WK.

Figure 28:
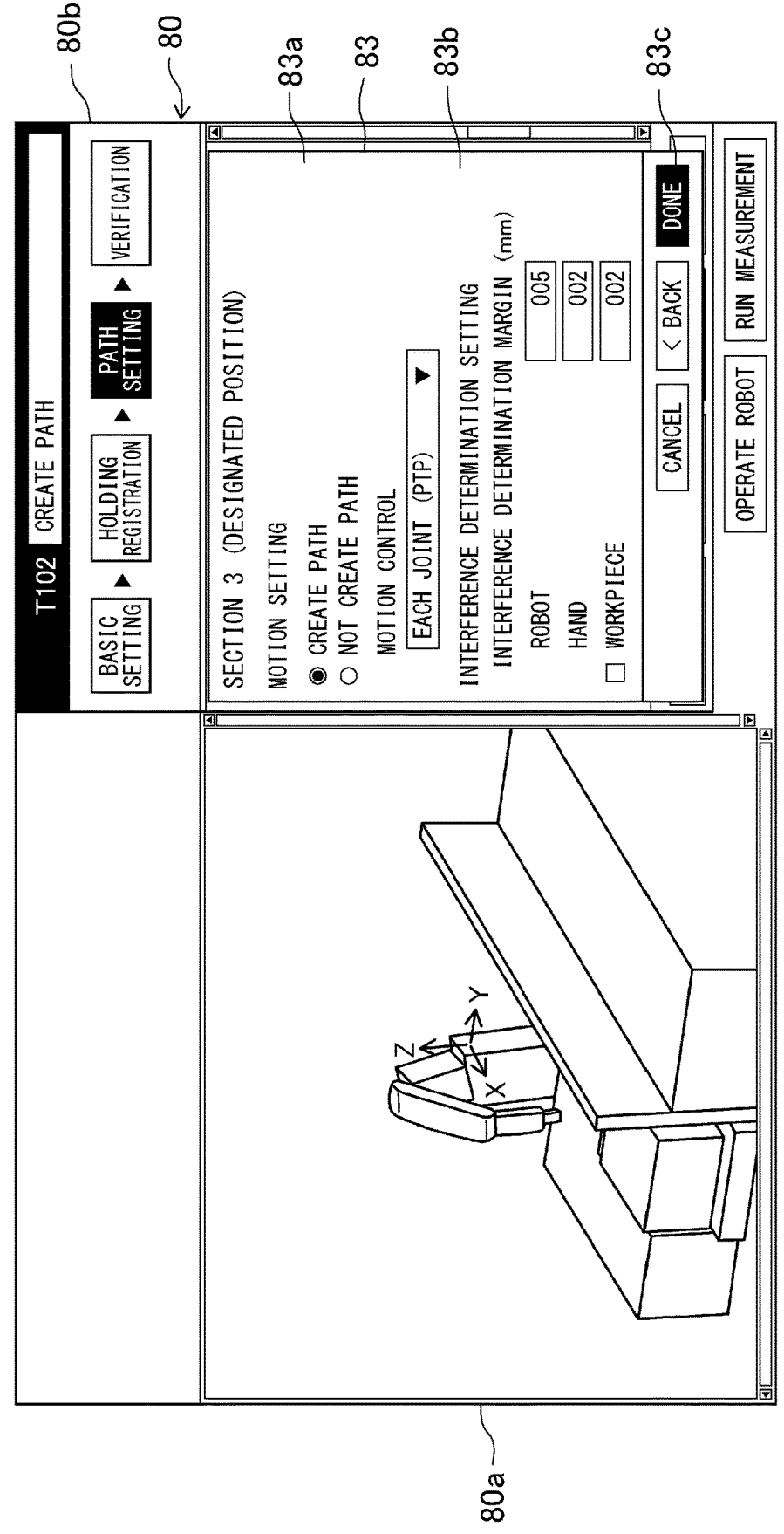
FIG. 28 is a diagram showing an example of a motion/interference determination setting window.

When a next button 82c of the position setting window 82 is operated, the path creation part 309 creates a motion/interference determination setting window 83 shown in FIG. 28 and superimposes the motion/interference determination setting window 83 on the path setting user interface 80. The motion/interference determination setting window 83 includes a motion setting area 83a and an interference determination setting area 83b. In the motion setting area 83a, it is possible to select whether or not to create a path passing through a via point.

When no path is created, it is possible to select movement through a joint interpolated motion or movement through a linearly-interpolated motion. The joint interpolated motion is a linear movement in the joint angle space, but is, in the actual three-dimensional space, a startup in a curved line. The linearly-interpolated motion is opposite to the joint interpolated motion. According to the present embodiment, since all the coordinates are internally managed based on the angle of each joint, the linearly-interpolated motion is achieved, in a strict sense, by a set of joint interpolated motions each corresponding to a small section. In this case, a plurality of via points that can be regarded as a sufficient straight line are created (a section between the via points thus created corresponds to joint interpolated movement). Although this is determined at the time of setting, as in the case where the path is created, a via point that the user does not explicitly set can be created. Note that although the interference determination is made even when no path is created, a path that avoids interference cannot be created, and therefore, if interference occurs on the path, the path creation fails as a whole. For example, when a path is created, the path creation part 309 can automatically create a path passing through a via point and display the path in the robot display area 80a. When the path is automatically created, an intermediate via point is automatically created.

In the interference determination setting area 83b, margin information for use in interference determination can be input numerically (mm). When a distance between the robot hand HND and an obstacle becomes less than the input value, it is determined that the robot hand HND and the obstacle interfere with each other.

Figure 29:
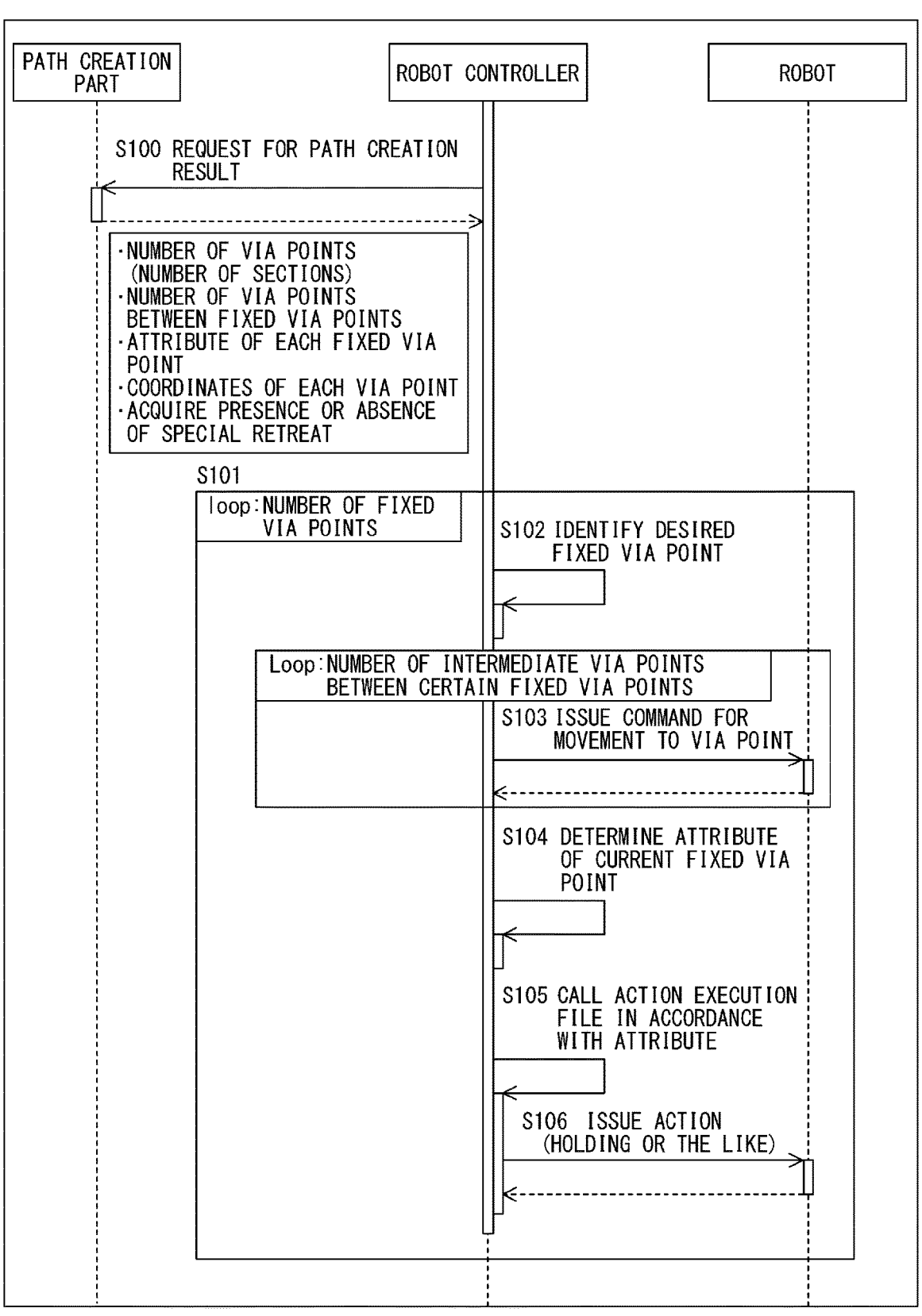
FIG. 29 is a diagram showing a process sequence of the image processing device, the robot controller, and the robot.

FIG. 29 is a diagram showing a process sequence of the path creation part 309, the robot controller 6, and the robot RBT. In S100 in the process sequence diagram, the robot controller 6 issues a request to the path creation part 309 for a path creation result. In response to this request, the path creation part 309 creates a path and causes the output part 310 to output, to the robot controller 6, information such as the number of fixed via points, the number of via points between the fixed via points, the attribute of each fixed via point, the coordinates of each via point, and the presence or absence of special retreat.

Herein, the number of fixed via points can be dynamically changed. For example, as the number of fixed via points on the path setting user interface 80 shown in FIG. 25 increases, the number of fixed via points to be sent to the robot controller 6 increases accordingly, and as the number of fixed via points on the path setting user interface 80 decreases, the number of fixed via points to be sent to the robot controller 6 decreases accordingly. According to the present embodiment, the attribute information on each fixed via point is output, or alternatively, an index of each fixed via point associated with each piece of attribute information may be output.

S101 shown in FIG. 29 is a process that is repeated the number of times equal to the number of fixed via points. In this process, first, in S102, the robot controller 6 identifies a desired fixed via point. Then, in S103, a command for movement to the via point is issued to the robot RBT. In S104, an attribute is determined based on the attribute information associated with the current fixed via point. In S105, an action execution file corresponding to the attribute determined in S104 is called. The action execution file is, for example, holding, place, or the like. Then, in S106, an action is issued to the robot RBT. Then, in S102, another fixed via point is designated. S102 to S106 are repeated the number of times equal to the number of fixed via points, thereby conveying the workpiece WK.

(Robot controller pseudo program) Next, a robot controller pseudo program will be described. The robot controller pseudo program includes a method (first method) in which the image processing device 300 registers the attribute information on the fixed via point in association with the fixed via point and outputs the attribute information, and the robot controller 6 processes the attribute information, and a method (second method) in which the image processing device 300 processes the attribute information on the fixed via point to convert the attribute information into a command for the robot RBT, and the robot controller 6 executes a received command on a one-by-one basis. Hereinafter, specific examples of the first method and the second method will be described.

(Specific example of first method) First, FIG. 30A shows an example of a main program in a case where the attribute information on the fixed via point can be registered in association with the fixed via point on the user interface. In the present example, the sensor 2 makes a measurement, and, if there is no measurement result, the program is terminated. While if there is a measurement result, the subsequent process is performed. For example, upon receipt of a path creation result, the robot hand HND is moved to a fixed via point or an intermediate via point, the attribute of the current fixed via point is determined, and an action corresponding the attribute is issued. Herein, as shown in FIG. 30B, an action program as the other program is called and executed.

Examples of the other program include a program for causing the robot hand HND to hold the workpiece WK, a program for placing the workpiece WK, and a program for causing the sensor 2 to capture an image of the work space. For example, the user may create the program for holding the workpiece WK, the program for placing the workpiece WK, and a trigger issue program for causing the sensor 2 to capture an image of the work space in advance, and the robot controller 6 may determine attribute information associated with the via point and execute a program corresponding to the attribute information. Such a configuration may allow holding timing of the workpiece WK, placing timing of the workpiece WK, trigger issue timing of the sensor 2, and the like to be set from the image processing device 300.

On the other hand, a case where the attribute information cannot be associated and registered on the user interface will be described. When via points are set in the order shown in the order display area 80c of FIG. 25, a main program as shown in an example in FIG. 31 is created. Fixed via points 1 to 5 of the main program shown in FIG. 31 correspond to the "approach position", the "holding position", the "retreat position", and the two "designated positions" in the order display area 80c shown in FIG. 25, respectively, and an action is issued based on the attribute information on each via point.

Figure 32:
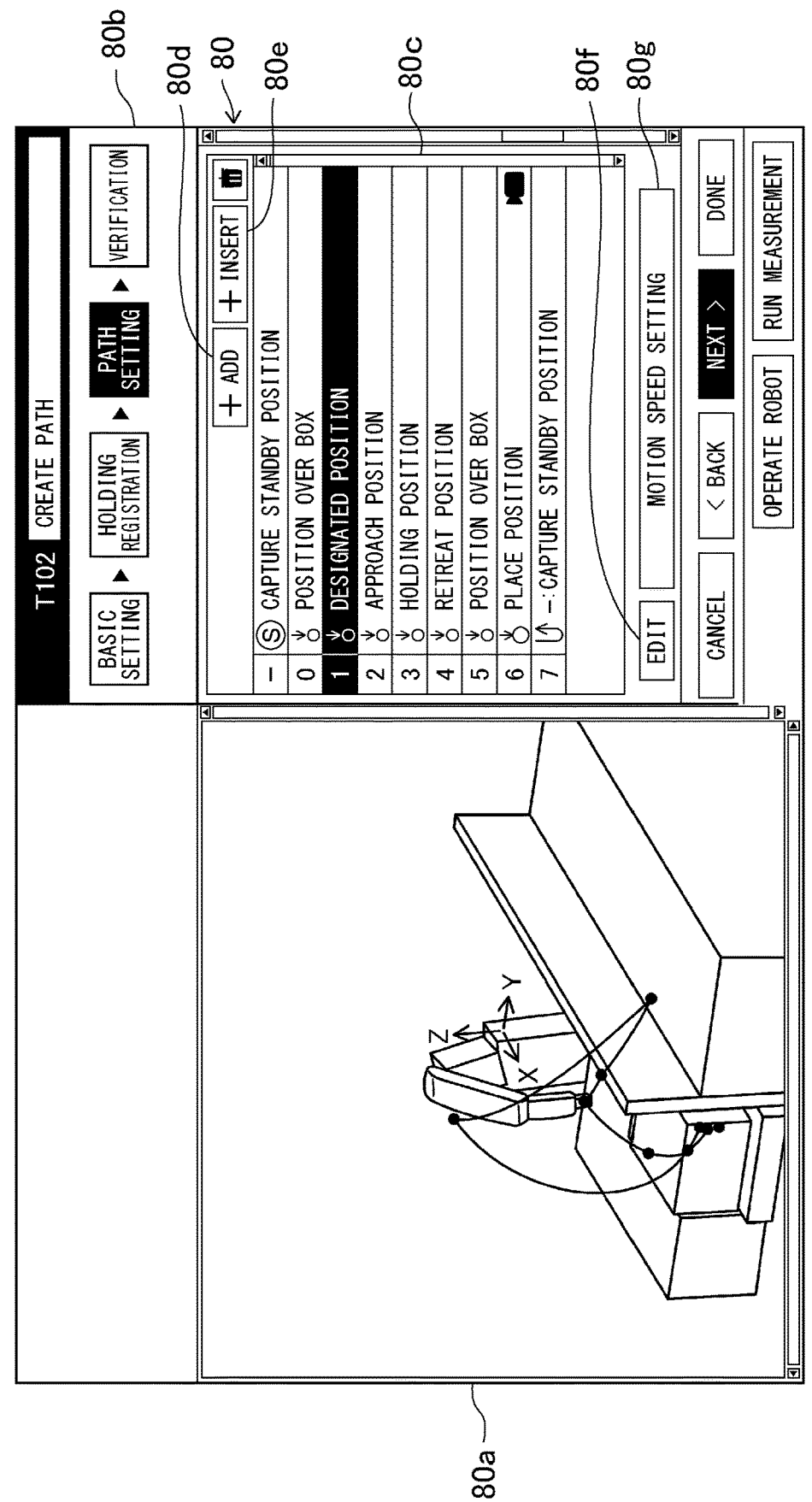
FIG. 32 is a diagram corresponding to FIG. 25 when a fixed via point (designated position) is added before an approach position.

As shown in FIG. 32, a fixed via point (designated position) can be added before the approach position, and in this case, how the main program changes will be described. FIG. 32 shows a case where the "designated position" shown in black is added to the order display area 80c. When the "designated position" is added, the user inputs the attribute information via the attribute information input window 81 shown in FIG. 26, so that the "designated position" thus added has been already associated with the attribute information. In this case, the main program deletes "HAND OPEN" in line 11 and writes "HAND OPEN" in line 16 as shown in FIG. 33. Then, the execution frequency of the process is increased by the number of via points added in line 33. Note that, for the holding position, "HAND CLOSE" is applied.

As described above, in the image processing device 300, the via point and the attribute information can be registered in association with each other and output, and, in the robot controller 6, the attribute information associated with the via point is interpreted and processed. In the present example, providing two arrays of via points and attribute information associated with the via points can make the robot program simple. An example of how to hold data in this case is shown in FIG. 34.

(Specific example of second method) Next, a description will be given of the second method in which the attribute information on the fixed via point is processed and converted into a command in the image processing device 300, and the command is executed in the robot controller 6 on a one-by-one basis. In this case, the image processing device 300 sends command information and position information on the via point to the robot controller 6, thereby causing the robot controller 6 to hold data arrays as shown in FIG. 35. In FIG. 35, "via point" means a request to trace a via point, and "hand" means a request to operate the robot hand HND.

The robot controller 6 can determine what to do next with reference to a command array shown in FIG. 35. The main program in this case is shown in FIG. 36, in which a Move command is issued to the robot RBT in line 11, and then a hand action is issued to the robot hand HND in line 13. Further, as shown in FIG. 37, via point data may be included in the command array.

(Capture timing of sensor) As shown in FIG. 6, the processor 300A includes a capture timing setting part 310. The capture timing setting part 310 determines issue timing of a trigger (capture trigger) that causes the sensor 2 to capture an image, and the output part 310 outputs, to the robot controller 6, the issue timing of the capture trigger such that an image is captured at the determined timing. That is, the capture timing setting part 310 determines the issue timing of the trigger that causes the sensor 2 to capture the next image based on the timing at which the hand HND moves out of the capture range of the sensor 2 on the movement path created by the path creation part 309. The movement path of the hand HND varies for each cycle, and the capture timing of the sensor 2 varies for each cycle accordingly. That is, the capture timing setting part 310 is configured to dynamically change the capture timing of the sensor 2 for each cycle of the picking motion. The path created by the path creation part 309 may be the shortest path, and in this case, the processor 300A can easily determine the issue timing of the trigger.

As described below, the optimum capture trigger position can be calculated, and the calculated optimum capture trigger position is sent to the robot controller 6 to allow a uniform robot program to execute a capture process at the optimum timing while following the varying capture trigger position.

(Calculation of optimum capture trigger position) First, a description will be given of a calculation of the optimum capture trigger position. When calculating the optimum capture trigger position, an interference determination algorithm is used to automatically calculate the earliest timing at which the robot RBT will not overlap the object to be imaged, and the position of the robot RBT at the timing thus calculated is used as a capture trigger issue position. A description will be given in detail below of an example of a method for calculating the optimum capture trigger position with reference to the flowchart shown in FIG. 38.

Figure 39:
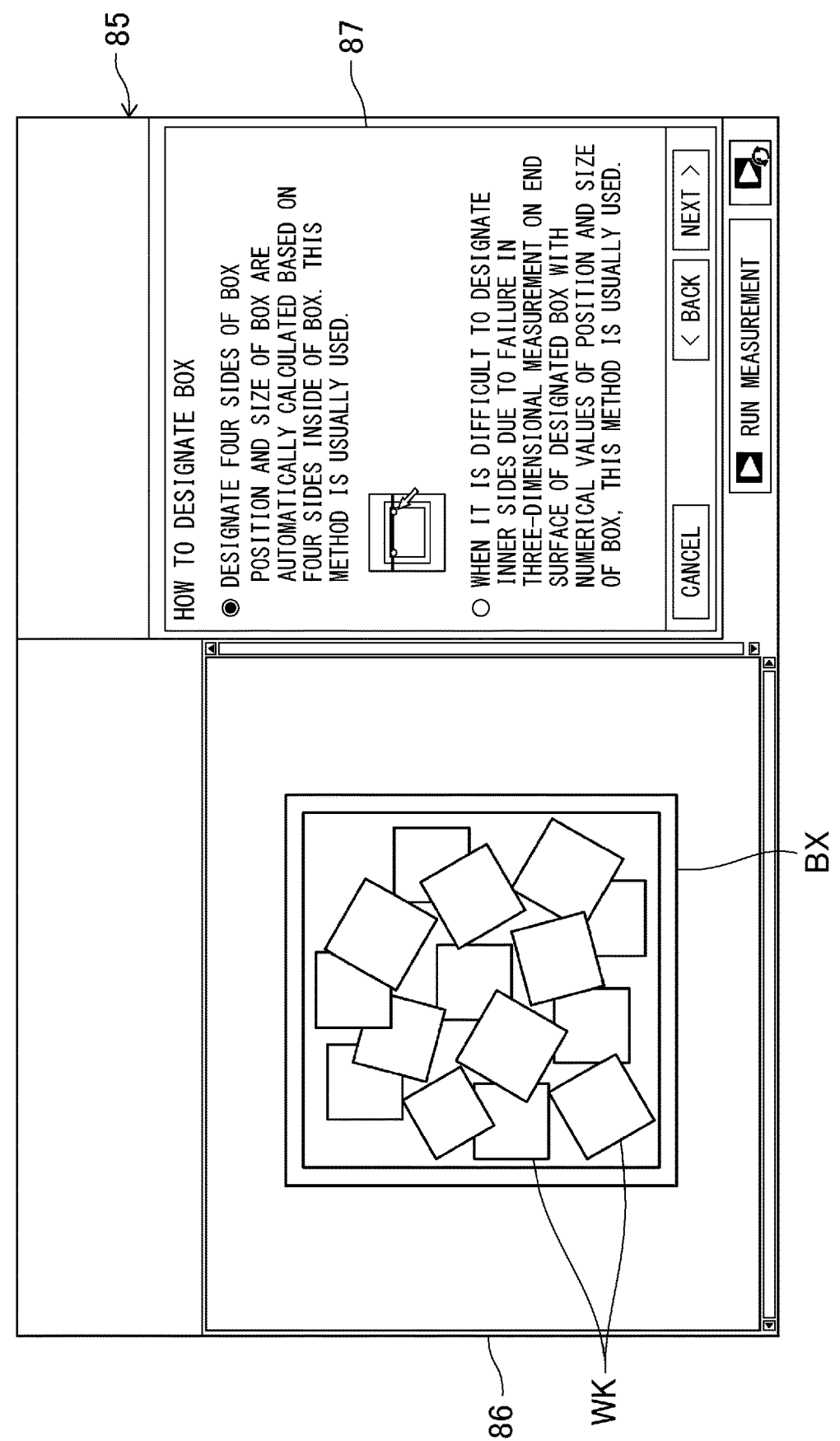
FIG. 39 is a diagram showing an example of an area designation user interface.

In step SH1 after the start, the user designates an area in plan view where the workpieces WK are stowed. According to the present embodiment, since the workpieces WK are stowed in the container BX as shown in FIG. 1, the inside of the container BX (also referred to as a box) corresponds to the area where the workpieces WK are stowed. In step SH1, a capture timing setting part 311 shown in FIG. 6 creates an area designation user interface 85 shown in FIG. 39 and displays the area designation user interface 85 on the display part 3.

The area designation user interface 85 includes an image display area 86 where an image including the container BX captured by the sensor 2 is displayed. In the image display area 86, an image processed by various image filters can be displayed. The user can check the image displayed in the image display area 86 to grasp the shape of the container BX, and can also grasp the workpiece WK when the workpiece WK exists. In the area designation user interface 85, a selection window 87 that allows the user to select a method for designating the area is further displayed.

Examples of the method for designating the area include a method for designating four sides of the container BX and a method for numerically designating the position and size of the container BX, and descriptions and explanatory diagrams of these two method are displayed on the selection window 87. The area may be designated by a method other than the above two methods, and in this case, the number of choices only needs to be increased. The selection window 87 includes a button or the like for the user to select either of the above two methods.

Figure 40:
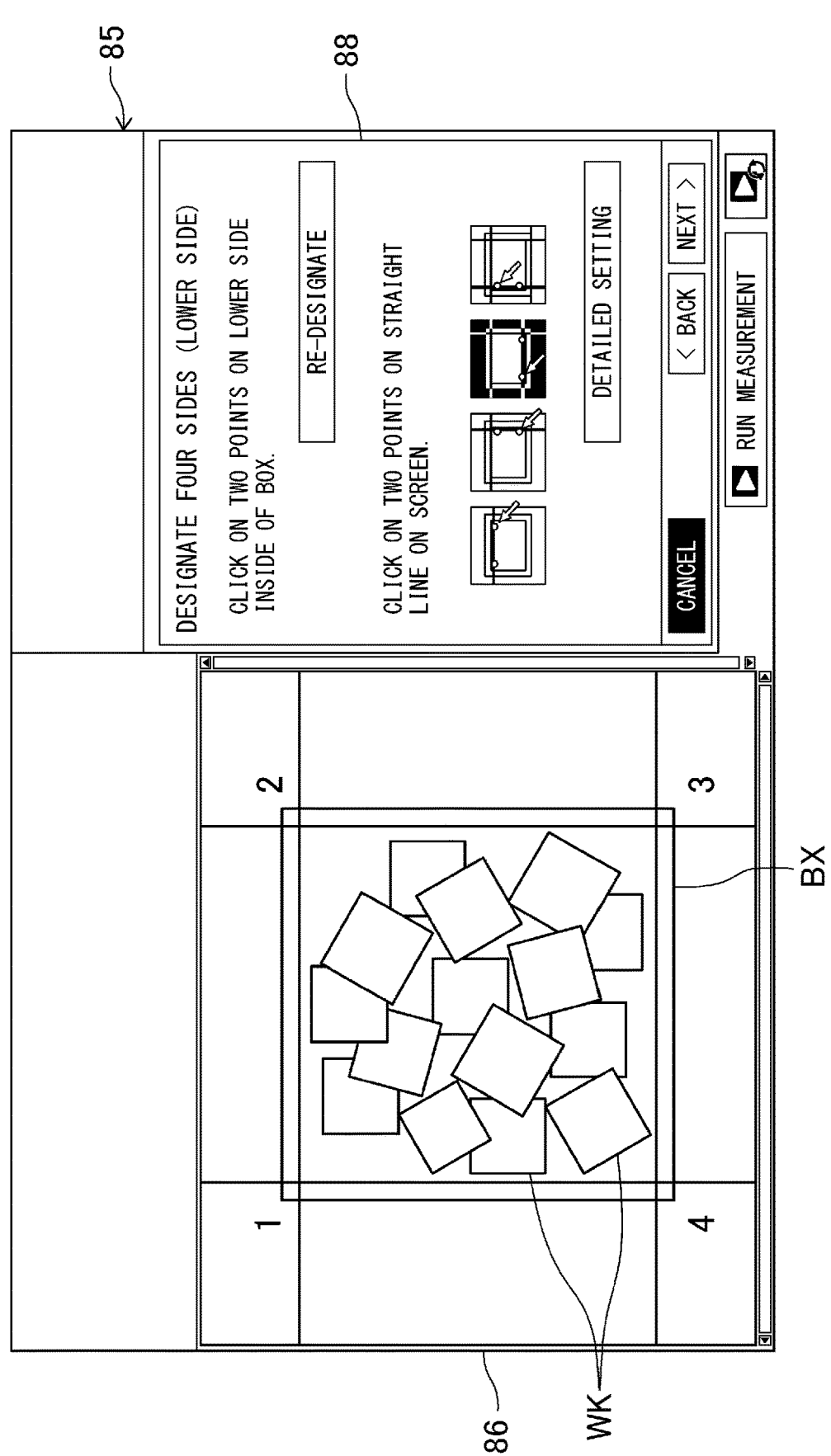
FIG. 40 is a diagram showing a display example of a window for designating four sides of a container.

Upon detection that the method for designating the four sides of the container BX has been selected, the capture timing setting part 311 creates a four-side designation window 88 where the four sides of the container BX are designated and displays the four-side designation window 88 on the area designation user interface 85, as shown in FIG. 40.

The four-side designation window 88 is a window that allows the user to designate each of the four sides of the container BX in plan view. In this four-side designation window 88, an instruction for designating two points on the first side of the container BX (corresponding to the upper side of FIG. 40), an instruction for designating two points on the second side of the container BX (corresponding to the right side of FIG. 40), an instruction for designating two points on the third side of the container BX (corresponding to the lower side of FIG. 40), and an instruction for designating two points on the fourth side of the container BX (corresponding to the left side of FIG. 40) are displayed. When the user designates the four sides as instructed, the capture timing setting part 311 draws four straight lines 1 to 4 in the image display area 86. An area surrounded by a rectangular frame 2000 (shown in FIG. 42) made up of the four straight lines 1 to 4 is designated as an area where the workpieces WK are stowed. That is, the capture timing setting part 311 receives the frame 2000 surrounding the area where the workpieces WK are stowed in plan view. The above designation may be made by a mouse click operation by the user.

The method for inputting the area where the workpieces WK are stowed is not limited to the above method, and examples of the method for inputting the area where the workpieces WK are stowed include a method for designating four vertices of the container BX by the user, a method in which coordinates of vertices that form a surface are held as fixed values, and a method for identifying the position of the container BX using a well-known search algorithm and identifying, based on the result, coordinates of four vertices of the top surface of the container BX. When the four vertices are identified, the rectangular frame 2000 having these four vertices is determined, so that the area within the rectangular frame 2000 can be identified as the area where the workpieces WK are stowed.

Figure 41:
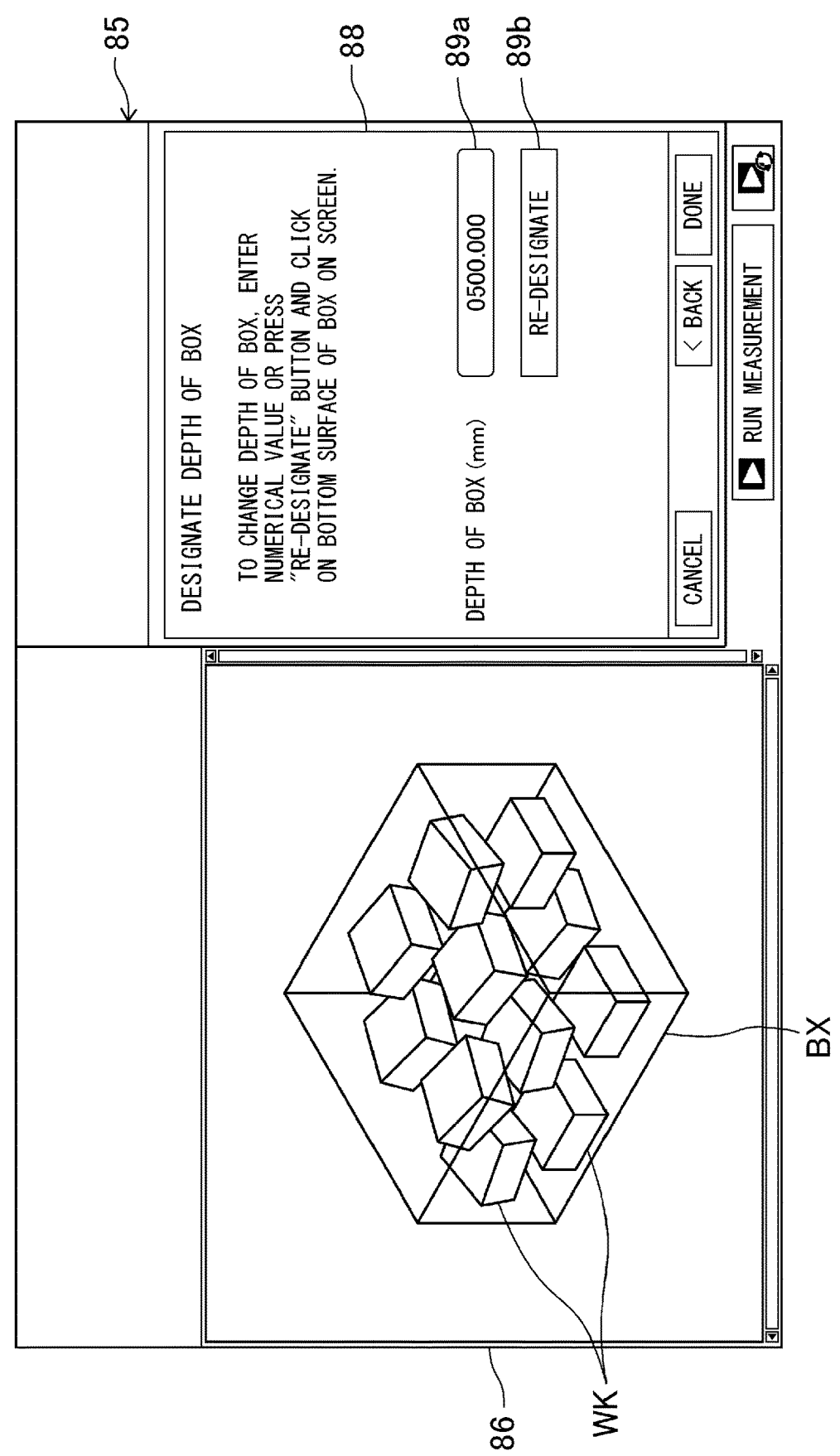
FIG. 41 is a diagram showing a display example of a window for designating a depth of the container.

When the area where the workpieces WK are stowed in plan view has been designated, a designation of a depth of the container BX is received. The capture timing setting part 311 creates a depth designation window 89 shown in FIG. 41 and displays the depth designation window 89 on the area designation user interface 85. Further, in the image display area 86, an image of the container BX viewed from obliquely above is displayed. The depth designation window 89 includes a numerical value input area 89*a* that allows the depth of the container BX to be numerically input and a re-designation button 89*b*. Upon detection that the re-designation button 89*b* has been pressed, the capture timing setting part 311 receives a designation of a bottom position of the container BX on the image display area 86. This designation is also possible by a mouse click operation or the like. When the bottom position of the container BX has been designated, the depth of the container BX can be acquired by calculating a difference from the top position of the container BX.

Figure 38:
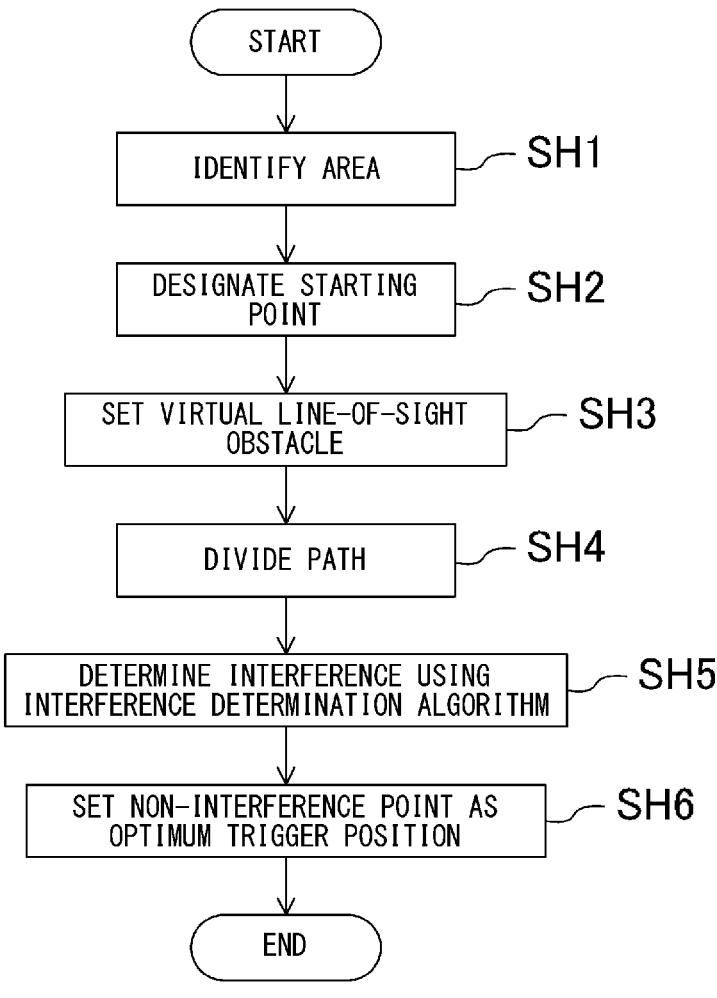
FIG. 38 is a flowchart showing an example of a method for calculating a capture trigger position.

Then, the process proceeds to step SH2 of the flowchart shown in FIG. 38. In step SH2, a designation of a starting point for an optimum trigger calculation in the path of the hand HND is received. For example, assume that the path of the hand HND is created as shown by the dashed line in FIG. 42. In this path, the coordinates can be identified in the order of a capture standby position Pw, a position over the container Pu, a holding execution position Pg, a placing position Pp, and the capture standby position Pw. When the user designates the holding execution position Pg, the coordinates of the holding execution position Pg are registered as the coordinates of the starting point. The capture timing setting part 311 calculates the earliest timing at which the robot RBT does not overlap the object to be imaged (for example, the workpiece WK or the container BX) on the path to the holding execution position Pg designated as the starting point and sets the timing to the optimum trigger timing. Since this is intended to determine the earliest timing at which the robot RBT does not overlap the object to be imaged, a point where the robot RBT overlaps the object to be imaged is usually designated as the starting point.

Figure 43:
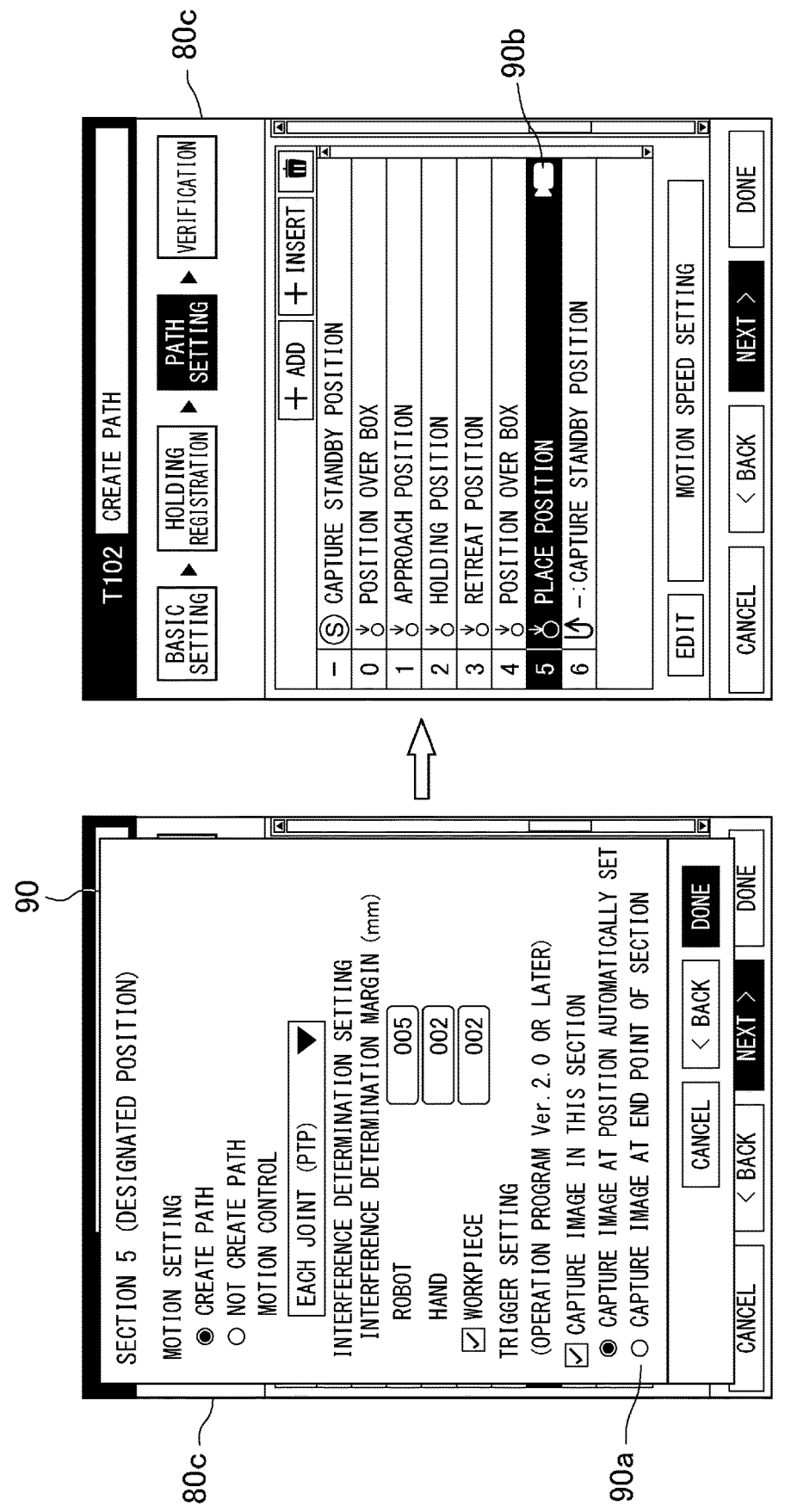
FIG. 43 is a diagram showing a procedure for designating a starting point.

The user can designate the starting point. The designation of the starting point will be described in detail with reference to FIG. 43. The order display area 80*c* shown in FIG. 43 represents the set path of the hand HND. In the order display area 80*c*, the capture standby position, the position over the box, the approach position, the holding position, the retreat position, the position over the box, and the place position are designated as the via points. The processor 300A creates a path that sequentially passes through the plurality of via points. These via points may undergo editing such as addition of a new via point or deletion of a via point already set by clicking on an add button, an insert button, or a delete button displayed in the order display area 80*c*.

The processor 300A receives a selection of any via point from among the plurality of via points set in the order display area 80*c*. For example, when the selection of the place position as the via point is received, a detailed setting window 90 for the place position can be superimposed on and displayed in the order display area 80*c*. The detailed setting window 90 may allow each of the plurality of via points set in the order display area 80*c* to be displayed. In the detailed setting window 90 superimposed on and displayed in the order display area 80*c*, motion settings, interference determination settings, and trigger settings are received. In the motion settings, it is possible to set whether to create a path. When "create path" is selected, the processor 300A creates a plurality of dividing via points through which the hand HND needs to pass between the position over the box and the place position. The path created by the processor 300A may be created such that the robot RBT or the hand HND does not interfere with any surrounding object and the movement distance between the plurality of via points listed in the order display area 80*c* becomes as short as possible, or the processor 300A may create a plurality of possible movement paths and set the shortest path among the plurality of possible movement paths as the movement path. Note that the path thus created is not limited to a path extending from the position over the box to the place position, and a path extending from the capture standby position back to the capture standby position via the plurality of via points may be created. Further, the path may be created in a range corresponding to the section selected in the order display area 80*c*. In the interference determination settings, a margin setting for a determination as to whether or not the robot RBT or the hand HND interferes with a surrounding object is received. Further, the trigger settings include a selection area 90*a* where whether or not to capture an image in this section is selected. When "capture image in this section" is selected, a mark 90b is displayed in the order display area 80c as shown on the right side of FIG. 43.

Further, when "capture image in this section" is selected, "capture image at position automatically set" and "capture image at end point of section" may be further selectable. When "capture image at position automatically set" is selected, for example, a trigger may be issued at the earliest timing when the robot RBT does not overlap the object to be imaged, or the attribute representing trigger issue timing may be added to a via point or dividing via point when the robot RBT does not overlap the object to be imaged. When "capture image at end point of section" is selected, for example, a trigger may be issued at the end point of the section associated with the window 90, or an attribute representing trigger issue timing may be added to a via point or dividing via point corresponding to the end point of the section associated with the window 90. In FIG. 43, a place position of a section 5 is selected from among the plurality of via points displayed in the list, and the section 5 is a section associated with the window 90. Further, a section end point of section 5 may be a place position.

Further, when the attribute representing trigger issue timing is added to a via point or dividing via point, the robot controller 6 determines attribute information added to the via point and the plurality of dividing via points received from the processor 300A. A configuration may be employed where creating a program associated with the attribute information in advance and executing the program in accordance with the attribute information makes it possible to dynamically follow the trigger issue timing that can vary for each picking motion without editing the program of the robot controller 6.

The starting point can also be designated automatically. For example, since it is certain that the robot RBT overlaps the container BX at the holding execution position Pg, the position may be automatically designated as the starting point.

Figure 42:
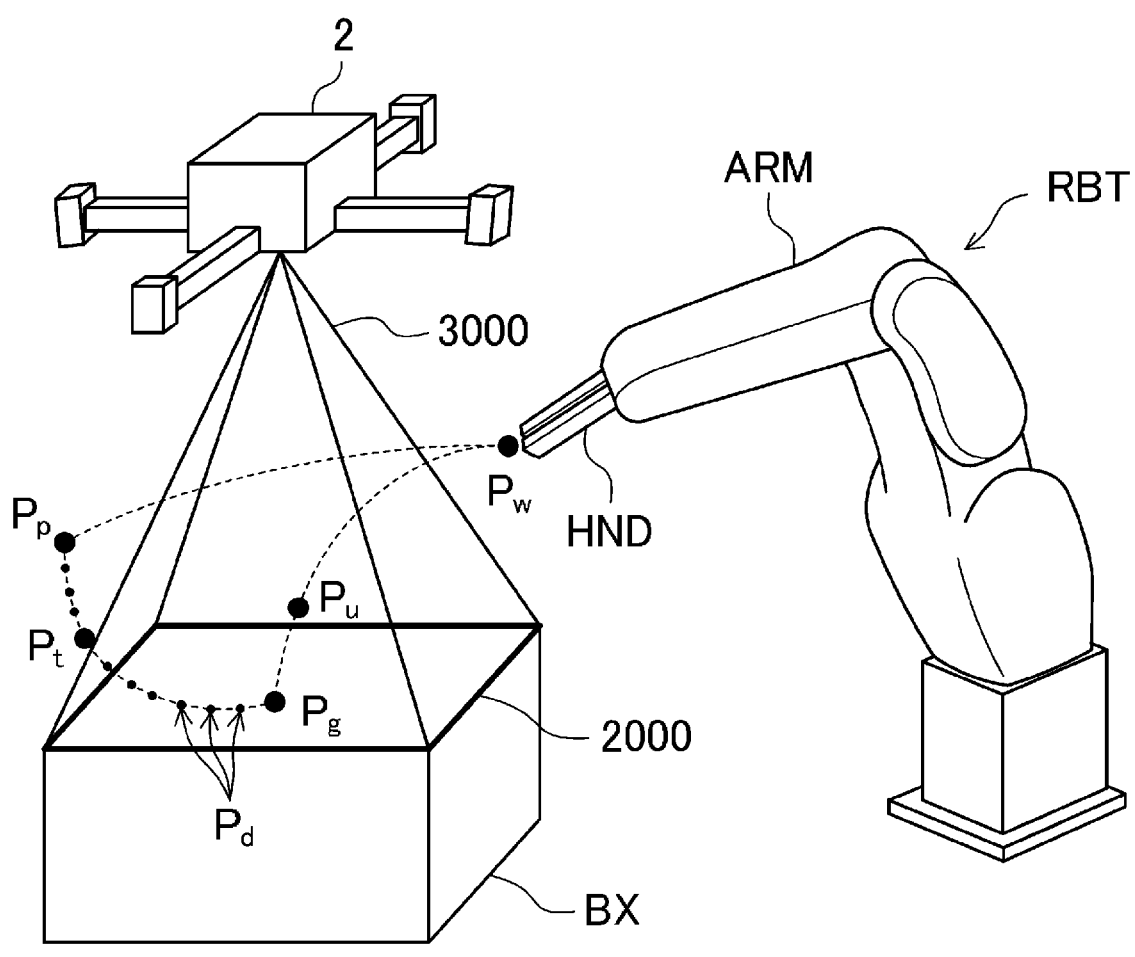
FIG. 42 is a conceptual diagram for describing a method for calculating the capture trigger position.

Then, the process proceeds to step SH3 of the flowchart shown in FIG. 38. In step SH3, the capture timing setting part 311 sets a virtual line-of-sight obstacle. According to the present embodiment, a virtual solid FIG. 3000 is set as a virtual line-of-sight obstacle as shown in FIG. 42. The virtual solid FIG. 3000 is a figure having an outer shape along the edge of the capture range of the sensor 2. A position of a bottom surface of the solid FIG. 3000 matches the position of the frame 2000. Further, a shape of the bottom surface of the solid FIG. 3000 matches the shape of the frame 2000. The solid FIG. 3000 has a shape extending from the frame 2000 toward a light receiving surface of the sensor 2. Specifically, a quadrangular pyramid made up of four virtual straight lines extending from the four vertices of the frame 2000 to the center of the light receiving surface of the sensor 2 and four straight lines making up the frame 2000 corresponds to the solid FIG. 3000. The shape of the solid FIG. 3000 is not limited to a specific shape, and may vary in a manner that depends on the shape of the container BX.

Then, the process proceeds to step SH4 of the flowchart shown in FIG. 38. In step SH4, the path having the starting point designated in step SH2 is divided into small sections. In the form shown in FIG. 42, a plurality of dividing via points Pd that divide the section from the holding execution position Pg that is a via point to the placing position Pp that is the next via point are set. At least one dividing via point Pd needs to be provided between the holding execution position Pg and the placing position Pp, but it is preferable that a larger number of the dividing via points Pd be provided in order to increase the accuracy of the interference determination.

After setting the dividing via point Pd, the process proceeds to step SH5 of the flowchart shown in FIG. 38. In step SH5, the capture timing setting part 311 detects timing at which the hand HND on the path does not interfere with the solid FIG. 3000 by using the interference determination algorithm. Specifically, at the time of the interference determination, it is determined whether or not the hand HND interferes with the solid FIG. 3000 by using the dividing via point Pd set in step SH4. When each dividing via point Pd is located within the solid FIG. 3000 and is in contact with the outer surface of the solid FIG. 3000, it is determined that the hand HND interferes with the solid FIG. 3000; otherwise, it is determined that the hand HND does not interfere with the solid FIG. 3000. The interference determination is performed in order from the dividing via point closest to the holding execution position Pg among the plurality of dividing via points Pd. As a result, it is assumed that a dividing via point Pt that does not interfere with the solid FIG. 3000 is found.

In step SH6 of the flowchart shown in FIG. 38, when the dividing via point Pt that does not interfere with the solid FIG. 3000 is found, it is determined that timing when the hand HND is located at the point Pt corresponds to timing at which the hand HND does not interfere with the solid FIG. 3000 and timing at which the hand HND moves out of the capture range of the sensor 2. As the optimum trigger position is denoted by the point Pt in FIG. 42, the optimum trigger position can be accurately determined by using the interference determination.

After determining the optimum trigger position, the output part 310 outputs the information to the robot controller 6. At this time, for example, it is assumed that the output part 310 sends the path information in the form of "a plurality of via points successively provided" as shown in the following example.

$$Pw = [J1, J2, J3, J4, J5, J6]$$

$$Pu = [J1, J2, J3, J4, J5, J6]$$

$$...$$

$$...$$

$$Pp = [J1, J2, J3, J4, J5, J6]$$

In addition to this via point information, it is possible to send information about which of the via points is a trigger via point. On the robot program side, assume that a program for tracing the via points in the order from the front via point to trace the path has been made, a program that includes a program for determining "whether the number of the via point that has been just passed is the same as the number of the trigger via point" added to the above process and in which a trigger is issued when a condition is satisfied may be made as follows.
Pseudo Code:

```
For i=0 To n-1
    Move via point [i]
    If i = t
    Issue trigger
```

-continued

```
        Endif
        Endfor
``` t denotes trigger timing information that has been sent, and in this case, it is assumed that an integer indicating the number of the trigger via point from the beginning is input. n denotes the number of via points that need to be passed and is also usually sent from the outside. via point i denotes position information on the i-th via point that needs to be passed and is usually sent from the outside.

A method other than the interference determination may be used when determining the earliest timing at which the robot RBT does not overlap the object to be imaged. For example, when light emitted from each of the four sides of the container BX is blocked, it is determined that the robot RBT overlaps the object to be imaged, and when the light is not blocked, it is determined that the robot RBT does not overlap the object to be imaged. Such a method may be referred to as ray tracing.

(Action and effect of the embodiment) As described above, according to the present embodiment, first, when the sensor 2 captures an image of the work space in accordance with a capture trigger command, the image data including the workpiece WK is output from the sensor 2 to the processor 300A. The processor 300A determines a workpiece WK to be held based on the image data output from the sensor 2 and creates a movement path of the hand HND from the workpiece WK to be held to a predetermined placing position. When the hand HND has move on this movement path, one cycle of the picking motion is done.

The hand HND moves out of the capture range of the sensor 2 on the movement path. The capture timing setting part 311 determines timing at which the hand HND moves out of the capture range. The processor 300A determines the issue timing of a trigger for causing the sensor 2 to capture the next image based on the timing at which the hand HND moves out of the capture range. Since the sensor 2 captures an image of the work space in accordance with the trigger command issued at the determined issue timing, the hand HND does not overlap any workpiece WK, and an image of workpieces WK within the capture range can be captured.

In the next cycle, the state of the workpieces WK in the work space is different from the state in the previous cycle because the number of workpieces WK has decreased. Therefore, the movement path of the hand HND is also different from the movement path in the previous cycle, and the timing at which the hand HND moves out of the capture range of the sensor 2 is also different from the timing in the previous cycle. According to the present embodiment, the image capture timing of the sensor 2 can be dynamically changed for each cycle of the picking motion, so that the trigger can be automatically issued at the optimum timing. This eliminates the need for the user to adjust a trigger position, thereby increasing convenience.

The above-described embodiments are merely examples in all respects, and should not be construed as limiting. Further, all modifications and changes within the equivalent range of the claims fall within the scope of the present invention.

As described above, the image processing device according to the present invention is applicable to control of a robot that performs a picking motion, for example.

What is claimed is:

1. An image processing device used for controlling a robot that performs, in cycles, a picking motion of holding and taking out a predetermined workpiece one by one from among a plurality of workpieces stowed in a work space, the image processing device comprising:

an imaging sensor that captures an image of the work space where the plurality of workpieces are stowed in accordance with a trigger command and outputs image data; and a processor that determines, based on the image data output from the imaging sensor, a workpiece to be held from among the workpieces stowed in the work space and sets a path of a hand extending from where the hand holds the workpiece to where the hand places the workpiece at a predetermined placing position, wherein the processor determines, based on timing at which the hand moves out of a capture range of the imaging sensor on the path, the timing being obtained by determining whether or not the hand interferes with a virtual solid figure, which represents the capture range of the imaging sensor, timing of issuing a trigger that causes the imaging sensor to capture a next image to dynamically change capture timing of the imaging sensor for each cycle of the picking motion, the processor creates a path creation result based on the timing, the path creation result including coordinates of a plurality of via points successively provided on the path, and trigger issue information specifying a coordinate of a via point among the plurality of via points as a point where the trigger needs to be issued, the processor outputs, to a robot controller that controls the robot, the path creation result.

2. The image processing device according to claim 1, wherein the path creation result includes a coordinate of a fixed via point, and an attribute information that shows an attribute of the via point, wherein the attribute information shows the attribute of the fixed via point and the attribute of the fixed via point is among an approach position of the hand, a holding execution position of the hand, and a retreat position after holding of the hand.

3. The image processing device according to claim 2, wherein the processor receives a workpiece model and information on a holding position on the workpiece model held by the hand, makes a three-dimensional measurement on the work space where the workpieces exist, searches for a holding position of a corresponding one of the workpieces stowed in the work space based on a result of the three-dimensional measurement and the workpiece model, and determines whether the hand interferes with a surrounding object when holding the holding position of the corresponding one of the workpieces searched for and determines an orientation of the hand that avoids interference with the surrounding object, generating a determination result.

4. The image processing device according to claim 2, wherein the trigger issue information is the attribute information of the point where the trigger needs to be issued showing a trigger position.

5. The image processing device according to claim 3, wherein the processor determines the plurality of via points that allow the hand to avoid interference with the surrounding object based on the determination result and creates a path of the hand to connect the via points as the path creation result.

6. The image processing device according to claim 1, wherein the processor determines timing of issuing the trigger between a holding execution position of the hand and the predetermined placing position of the workpiece and outputs a robot position corresponding to the timing as a trigger position.

7. The image processing device according to claim 1, further comprising:

an edit screen creation part that creates an edit screen that shows, when the plurality of via points are provided on the path, a passing order of the plurality of via points and allows individual editing of the plurality of via points; and a display part that displays the edit screen created by the edit screen creation part.

8. An image processing device used for controlling a robot that performs, in cycles, a picking motion of holding and taking out a predetermined workpiece one by one from among a plurality of workpieces stowed in a work space, the image processing device comprising:

an imaging sensor that captures an image of the work space where the plurality of workpieces are stowed in accordance with a trigger command and outputs image data; and a processor that determines, based on the image data output from the imaging sensor, a workpiece to be held from among the workpieces stowed in the work space and sets a path of a hand extending from where the hand holds the workpiece to where the hand places the workpiece at a predetermined placing position, wherein the processor sets a virtual solid figure having an outer shape along an edge of the capture range of the imaging sensor to determine whether the hand interferes with the virtual solid figure, and determines that timing at which the hand does not interfere with the virtual solid figure is timing at which the hand moves out of the capture range of the imaging sensor, and determines timing of issuing a trigger that causes the imaging sensor to capture a next image to dynamically change capture timing of the imaging sensor for each cycle of the picking motion based on the timing at which the hand moves out of the capture range of the imaging sensor, the processor creates a path creation result based on the timing, the path creation result including coordinates of a plurality of via points successively provided on the path, and trigger issue information specifying a coordinate of a via point among the plurality of via points as a point where the trigger needs to be issued, the processor outputs, to a robot controller that controls the robot, the path creation result.

9. The image processing device according to claim 8, wherein the processor receives a frame surrounding, in a plan view, an area where the workpieces are stowed, and sets the virtual solid figure that has a lower surface identical in shape to the frame and extends toward a light receiving surface of the imaging sensor.

10. The image processing device according to claim 8, wherein the processor sets, when determining whether or not the hand interferes with the virtual solid figure, a dividing via point that divides a section between adjacent via points among the plurality of via points provided on the path and uses the dividing via point.

\* \* \* \* \*